(12) United States Patent  
Sticht

(10) Patent No.: US 6,494,432 B1  
(45) Date of Patent: Dec. 17, 2002

(54) CONTROL ELEMENT, ESPECIALLY A PNEUMATIC VALVE

(76) Inventor: Walter Sticht, Karl-Heinrich-Waggerl-Strasse 8, A-4800 Attnang-Puchheim (AT)

( * ) Notice: Subject to any disclaimer, the term of this patent is extended or adjusted under 35 U.S.C. 154(b) by 0 days.

(21) Appl. No.: 09/601,752

(22) PCT Filed: Feb. 4, 1999

(86) PCT No.: PCT/AT99/00030

§ 371 (c)(1),
(2), (4) Date: Sep. 22, 2000

(87) PCT Pub. No.: WO99/40352

PCT Pub. Date: Aug. 12, 1999

(30) Foreign Application Priority Data

Feb. 6, 1998 (AT) .................................................. 220/98

(51) Int. Cl.[7] .............................................. F16K 31/00
(52) U.S. Cl. ............................................................ 251/11
(58) Field of Search ........................................... 251/11

(56) References Cited

U.S. PATENT DOCUMENTS

| 3,756,083 | A | * | 9/1973 | Tatsutomi et al. ...... 236/101 A |
| 3,961,606 | A | * | 6/1976 | Wong ...................... 123/41.12 |
| 3,989,058 | A | * | 11/1976 | Jackson et al. ............. 137/269 |
| 3,990,418 | A | * | 11/1976 | Nohira et al. .......... 123/568.31 |
| 4,036,433 | A | * | 7/1977 | Wagner et al. ......... 137/625.26 |
| 4,114,645 | A | * | 9/1978 | Pauliukonis ........... 137/596.17 |
| 4,966,194 | A | | 10/1990 | Nakatsukasa et al. |
| 5,143,287 | A | | 9/1992 | Jardinier |

FOREIGN PATENT DOCUMENTS

| DE | 33 16 258 | 11/1984 |
| EP | 0 150 576 | 11/1984 |
| FR | 2 428 195 | 6/1978 |

* cited by examiner

Primary Examiner—Henry C. Yuen
Assistant Examiner—David A Bonderer
(74) Attorney, Agent, or Firm—Collard & Roe, P.C.

(57) ABSTRACT

The invention relates to a control element for media, for instance, a pneumatic valve or a hydraulic valve, comprising a valve body in which one or several channels are arranged, at least one moving element arranged in a channel and means for carrying out a relative movement of and/or deforming the moving element. The means are directly arranged on and/or directly act upon the moving element.

32 Claims, 28 Drawing Sheets

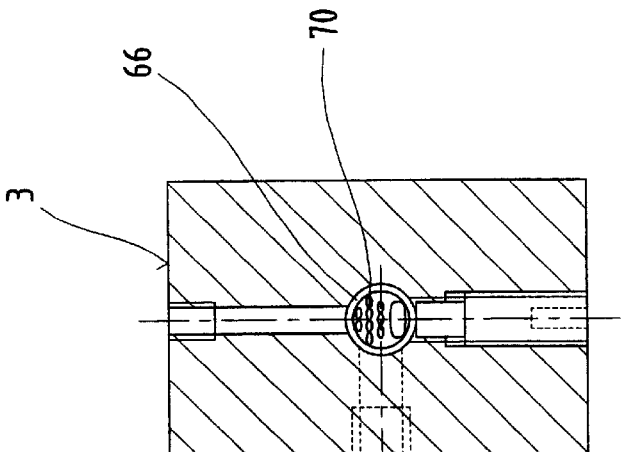
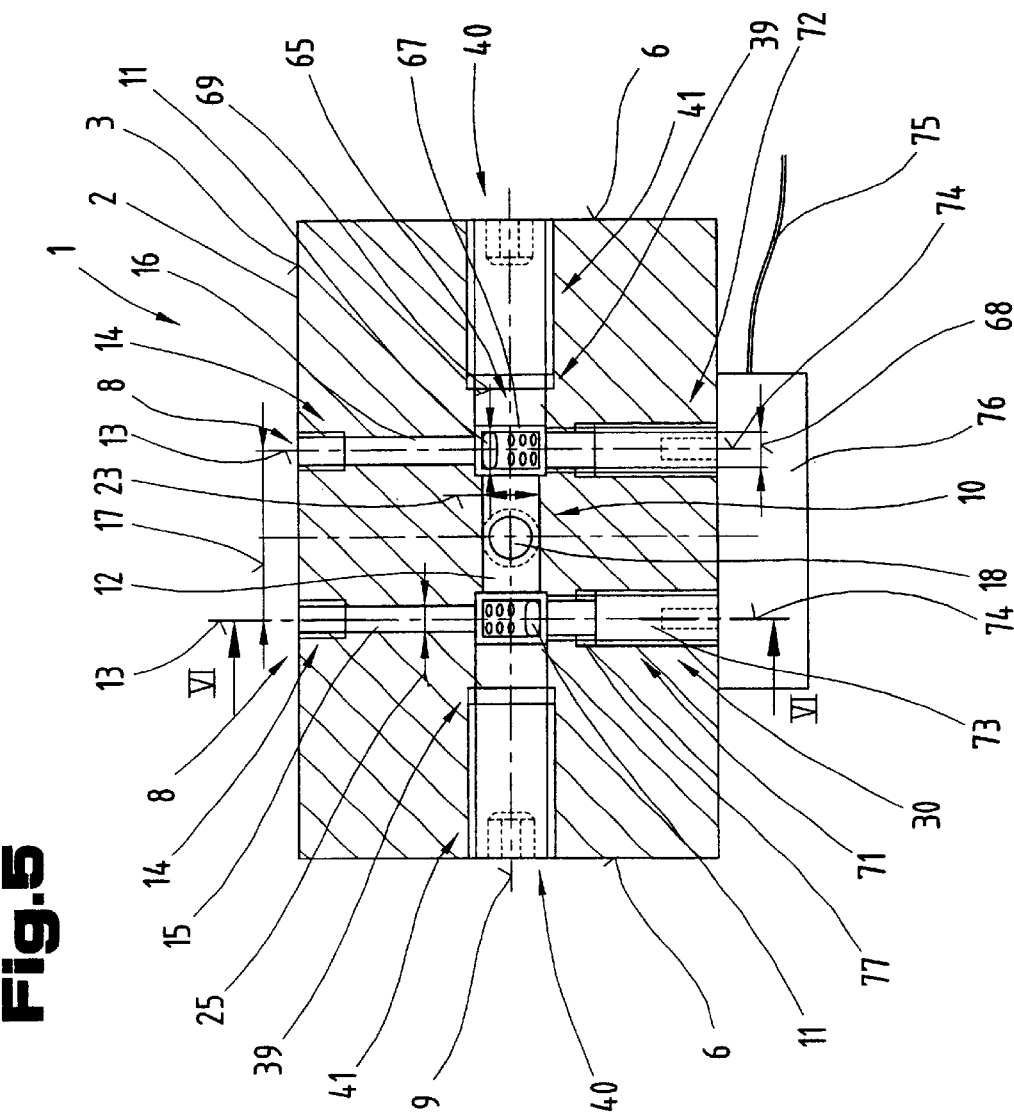

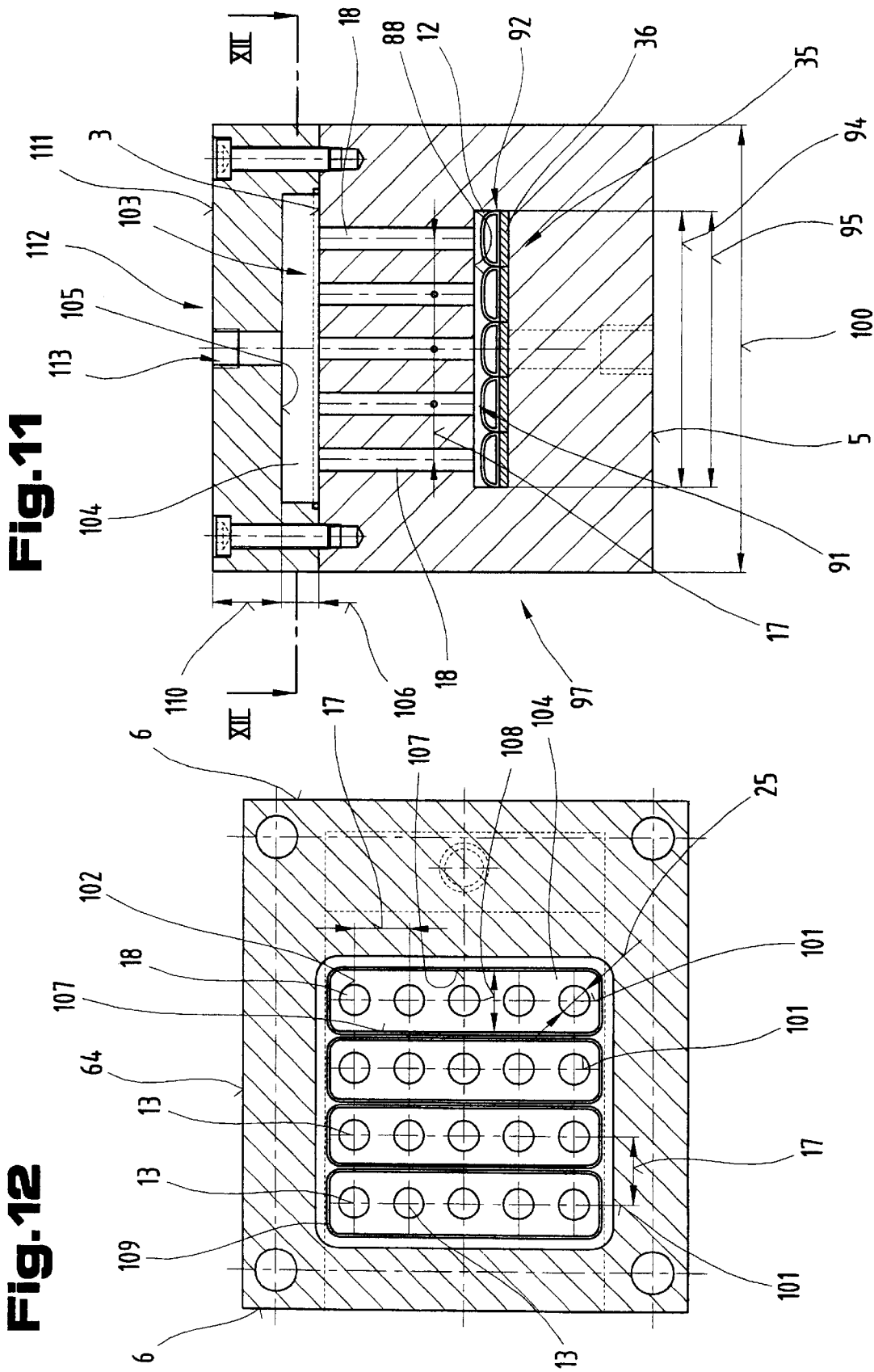

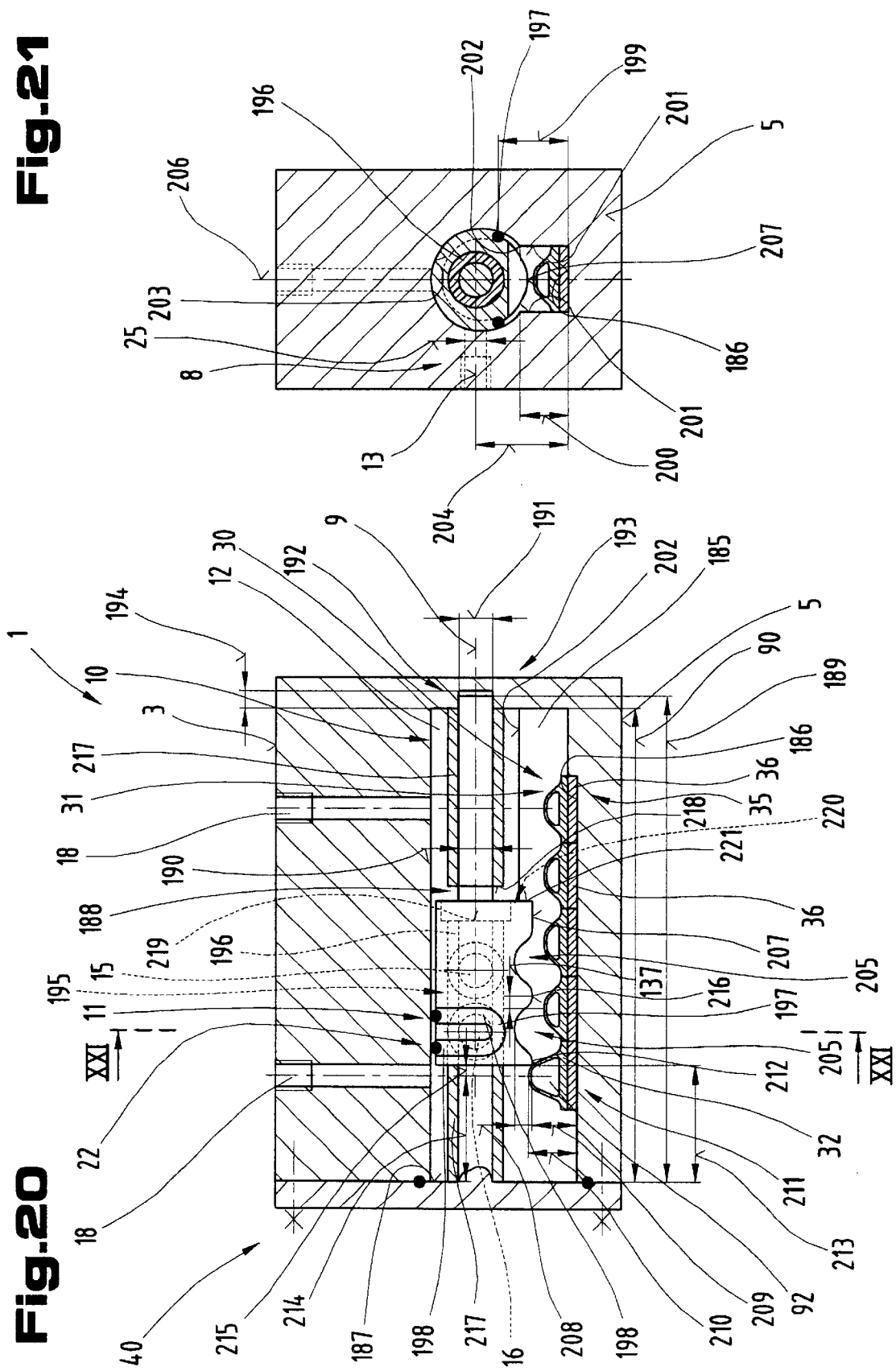

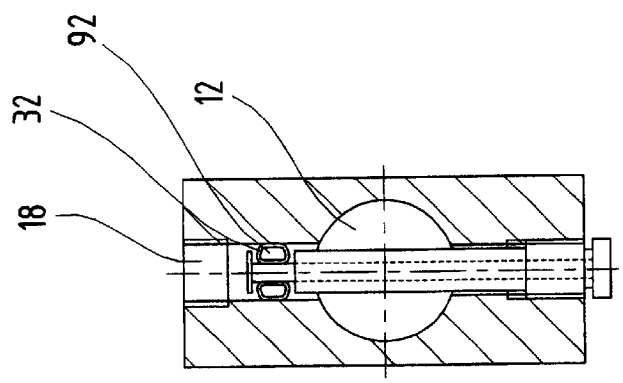
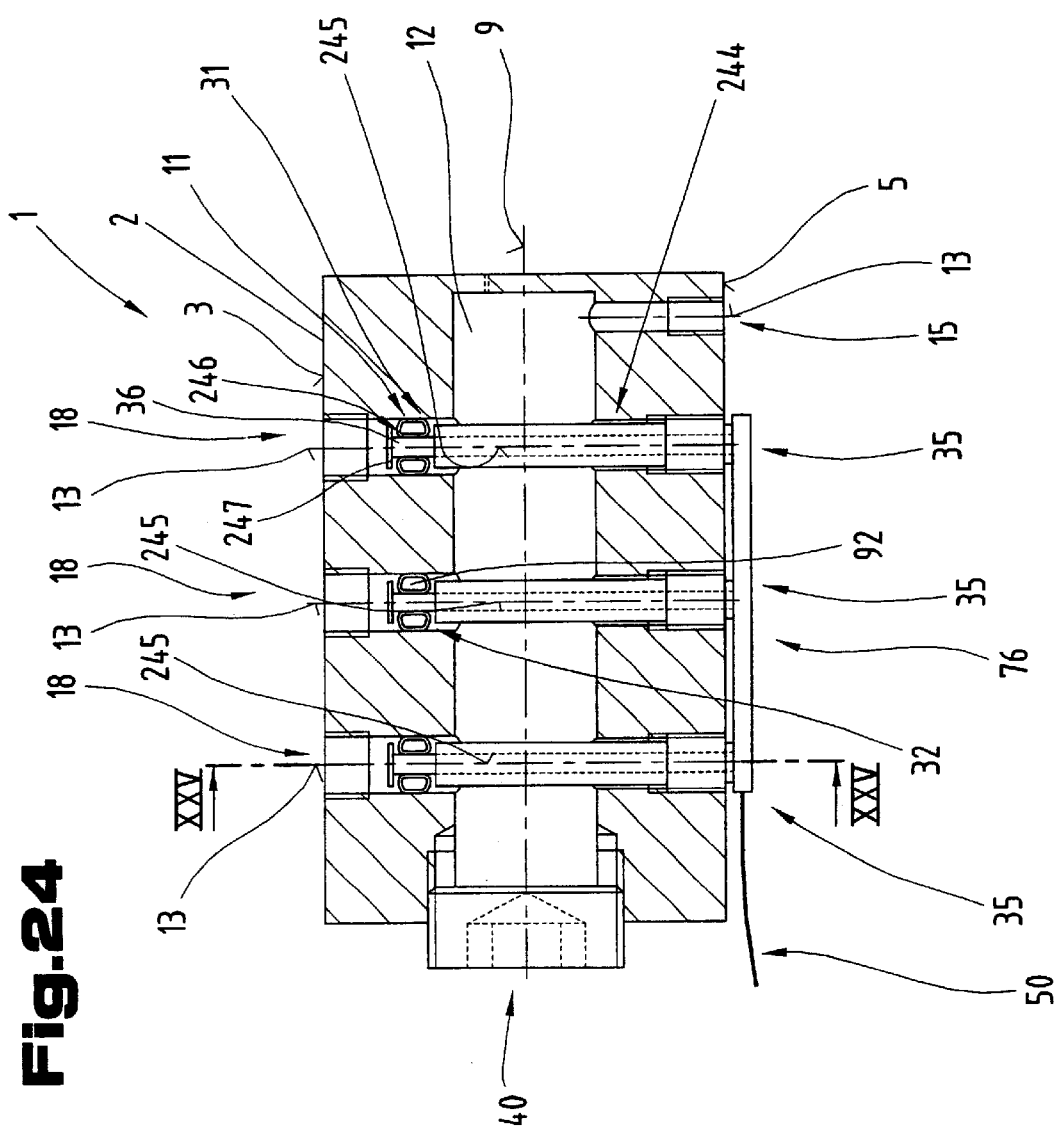

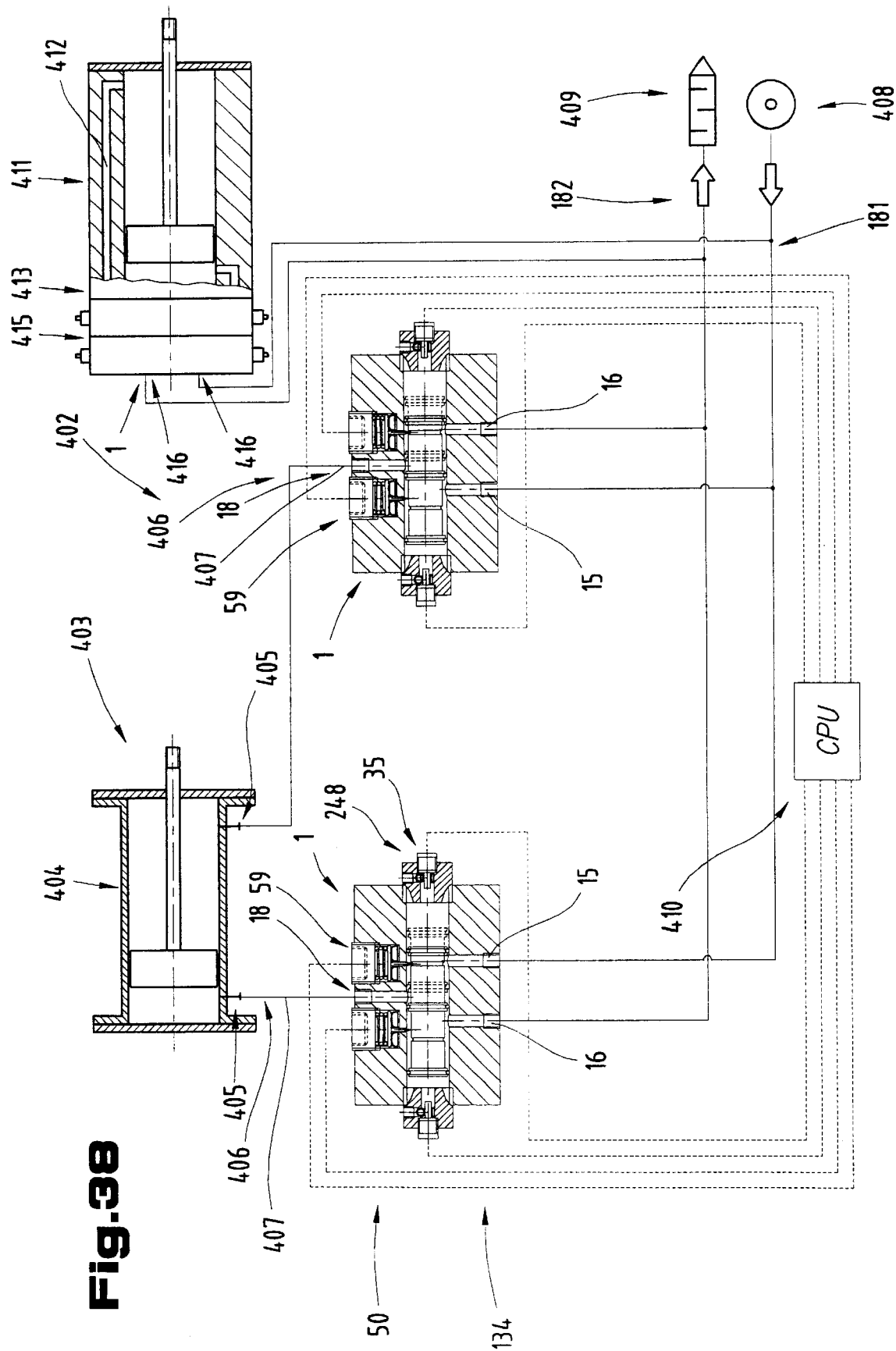

CONTROL ELEMENT, ESPECIALLY A PNEUMATIC VALVE

CROSS REFERENCE TO RELATED APPLICATIONS

Applicant claims priority under 35 U.S.C. §119 of Austrian application No. A 220/98, filed on Feb. 6, 1998. Applicant also claims priority under 35 U.S.C. §120 of PCT/AT99/00030, filed on Feb. 4, 1999. The international application under PCT article 21 (2) was not published in English.

BACKGROUND OF THE INVENTION

1. Field of the Invention

The invention relates to control elements.

2. The Prior Art

Control elements for media are known in many varieties, in particular pneumatic valves which consist of a valve body that has a plurality of openings and bores or channels. A control element is located in at least one bore or channel, which releases or closes one or several bores or channels depending on the switching position. Such a control element is linearly and relatively movably controlled in a channel and has an armature that projects from the body of the valve into a driving device. Such a means for the relative movement of moving elements consists of a coil, to which current is admitted, and which by means of magnetic force moves the armature and thus the moving element in the bore or the channel. In addition to the drawback that such a structure comprises a multitude of individual components, which has a negative effect on the manufacture and assembly of such control elements, the high component of moving mass is an additional drawback, which in particular increases the switching time of such control elements. This in turn leads to unfavorable or uneconomical cycle times especially in connection with automated assembly installations.

The invention, furthermore, also relates to means for the relative movement between a moving element and a valve body.

Such means, which are known, are formed by coils, which are manufactured by winding a thin conductor on a cylindrical body. The body has a bore, with a cylindrical armature arranged therein. Said armature is connected with the moving element via a connecting element. The coil, i.e. the body provided with the winding of a thin conductor, and the part of the armature projecting into the bore of said body, are mounted in this connection outside of a control element. The drawback of such a means is substantiated by the fact that the increased mass of the moving element, such mass being increased by the armature, also prolongs the time required for the relative movement. If one wants to reduce in connection with such a means the required time, this can be achieved only by increasing the energy, which has an adverse effect on the operating costs and the useful life of such means.

The invention, however, also concerns a moving element.

Such moving elements are usually formed by pistons, which permit short switching times by virtue of their mass.

Finally, the invention also concerns a method of producing a relative movement between a moving element and a valve body, whereby known methods effect such a relative movement by exerting a tensile force or a force of pressure on the moving element, such forces being produced by generating electromagnetic forces acting on an intermediate element, which disadvantageously increases the switching times because of the mass of the intermediate elements.

SUMMARY OF THE INVENTION

Therefore, an object of the invention is to provide a control element that comprises a low number of individual components; a means for the relative movement between a moving element and a valve body; a moving element for a control element; and a method of generating a relative movement, which permit the shortest possible switching times and which can be realized with the smallest possible dimensions.

The object of the invention is achieved by the present invention. The surprising advantage in this connection is that the switching time and the kinetic energy are reduced by the arrangement and design of the means as defined by the invention, through which a substantially reduced cycle time and lower operating costs are realized especially in connection with automated manufacturing installations.

Advantageous is in this connection a further development of the invention, by which the operating costs and in particular the energy costs are reduced.

However, advantageous is also an embodiment, through which it is made possible to provide the control element with a small structural size.

A design variation offers the advantage that the structural size of the control element can be reduced further, as well as the possibility of actuating the control element in a rapid manner.

However, possible are also the variations, through which components of the control element are saved and the manufacturing costs of the control element are consequently reduced accordingly.

Favorable, however, is also a further development of the invention, by which media are prevented from exiting from the transmission element.

A design variation is advantageous because the generation of kinetic energy is facilitated in this manner in a simple way.

A design variation is advantageous because it permits building the control element in a compact form.

A further development of the invention offers the advantage that standard elements can be used for the structure of the control element, so that the manufacturing costs of the control element can be substantially reduced.

Favorable, however, is also a design variation because it makes it possible to individually, i.e. separately control the actors that are actuated by the control element or control elements.

Possible is also a further development, through which wear is reduced in a simple way and the manufacturing and maintenance costs are consequently reduced.

A design variation is advantageous because the moving element can be positioned with greater accuracy, and precise coordination of the switching times in the switching routes is facilitated.

A design variation is advantageous in that it is characterized by high flexibility with respect to the individual switching possibilities of the control element.

The further development offers the advantage that media are prevented from circulating when the moving element is in its closing position.

A further possibility is described, through which the structural size of the control element can be reduced further.

Advantageous is also a design variation, through which a double functionality of the control element is achieved with respect to the control of the flow and in regard to exact positioning possibilities.

It describes an advantageous variation that permits even more positioning accuracy of the control element or moving element.

Possible is also a further development of the invention, which provides a line connection with stop means which, when energy is admitted, exert an electromagnetic force on the moving element and thereby lock the latter in a predetermined position.

The design variation offers the advantage that line connections can be installed that will not obstruct the relative movement of the moving element.

In the embodiment, a line connection to the means is established in a simple way.

Favorable, however, is also a further development of the invention, through which it is possible to prevent an undesireable relative movement of the moving element resulting from pressure admission.

The features specified facilitate the installation of the control element in an advantageous way.

Advantageous, however, is also a design variation, through which a spring effect is achieved, so that additional means for the relative movement can be saved.

The further development of the invention represents advantageous measures, through which the structural size of the control element can be minimized further.

It describes a favorable variation through which any unintentional relative movement of the moving element is prevented.

A further development is advantageous in that free mobility of the moving element is assured in the released state of the holding and/or locking device.

It describes an advantageous design variation through which the energy requirement of the holding and/or locking device is reduced by controlling the heating elements in a way occurring in the form of a star.

Favorable embodiments are described, through which the volume of the flow passing through the control element can be varied in a simple way.

Possible, however, is also a variation, through which a corresponding transmission element can be associated with each heating element, and the control element can be easily installed in this way.

An embodiment is advantageous in that a line connection can be made in a simple way, and in that the installation or removal of the control element is facilitated further in this manner.

Advantageous in this connection is a further development, through which the manufacture of the control element is facilitated further.

The tightness and the centering of the moving element are assured in a simple manner by the design variation.

Favorable design variations are described, through which automatic resetting of the moving element is achieved when the volume of the cover changes.

However, possible is also a further development of the invention, through which a multitude of switching possibilities are created that are independent of each other, and moving elements are not influenced by means for other moving elements.

Advantageous is a variation, through which any unintentional axial movement of the moving element is prevented.

Advantageous in this connection is an embodiment, through which elastic resetting of the holding and/or locking device is achieved.

Another favorable variation is achieved, through which the holding and/or locking device can be reset by means of current.

The embodiment provides for a desirable elastic deformation of the holding and/or locking device, which makes locking or cancellation of the lock easy.

However, the object of the invention is achieved also by the features described. The advantage in this connection is that no additional elements have to be mounted on the outside of the control element, which means the dimensions and structural sizes of such means or control elements can be reduced.

The object of the invention, however, is achieved also by the features described. The surprising advantage gained in this connection is that the moving element has only a low amount of mass, which means switching positions can be changed in the shortest possible time.

Advantageous is in this connection the design variation, through which an over-dead point position of the moving element is created and any automatic change of the switching position is prevented.

The further development of the invention is advantageous in that good tightness is assured in the respective switching position.

Favorable further developments of the invention are described, which assure movement of the moving element with low energy expenditure.

Finally, the object of the invention is achieved also by the features described. It is advantageous in this connection that the kinetic force can be generated directly within the zone of the moving element, the result being a reduction of switching times.

Advantageous is in this connection also a design variation, through which switching times can be reduced further.

Advantageous is a further development of the invention in that it reduces the energy expenditure.

Possible is finally a design variation, through which it is possible to achieve exact positioning of the moving elements.

BRIEF DESCRIPTION OF THE DRAWINGS

The invention is described in greater detail in the following with the help of the exemplified embodiments shown in the drawings, in which:

FIG. 5 shows another design variation of a control element as defined by the invention, shown by a sectional face view.

FIG. 6 shows the control element as defined by the invention cut along lines VI—VI in FIG. 5.

FIG. 11 shows the control element with a section along lines XI—XI in FIG. 10.

FIG. 12 shows the control element with a section along lines XII—XII in FIG. 11.

FIG. 20 shows another design variation of the control element as defined by the invention, by a sectional face view.

FIG. 21 shows the control element as defined by the invention with a section along lines XXI—XXI in FIG. 20.

FIG. 24 shows a sectional face view of another design variation of the control element as defined by the invention.

FIG. 25 shows the control element with a section along lines XXV—XXV in FIG. 24.

FIG. 38 is a schematic representation of a controlling device with a medium-actuated consumer.

Figure 1:
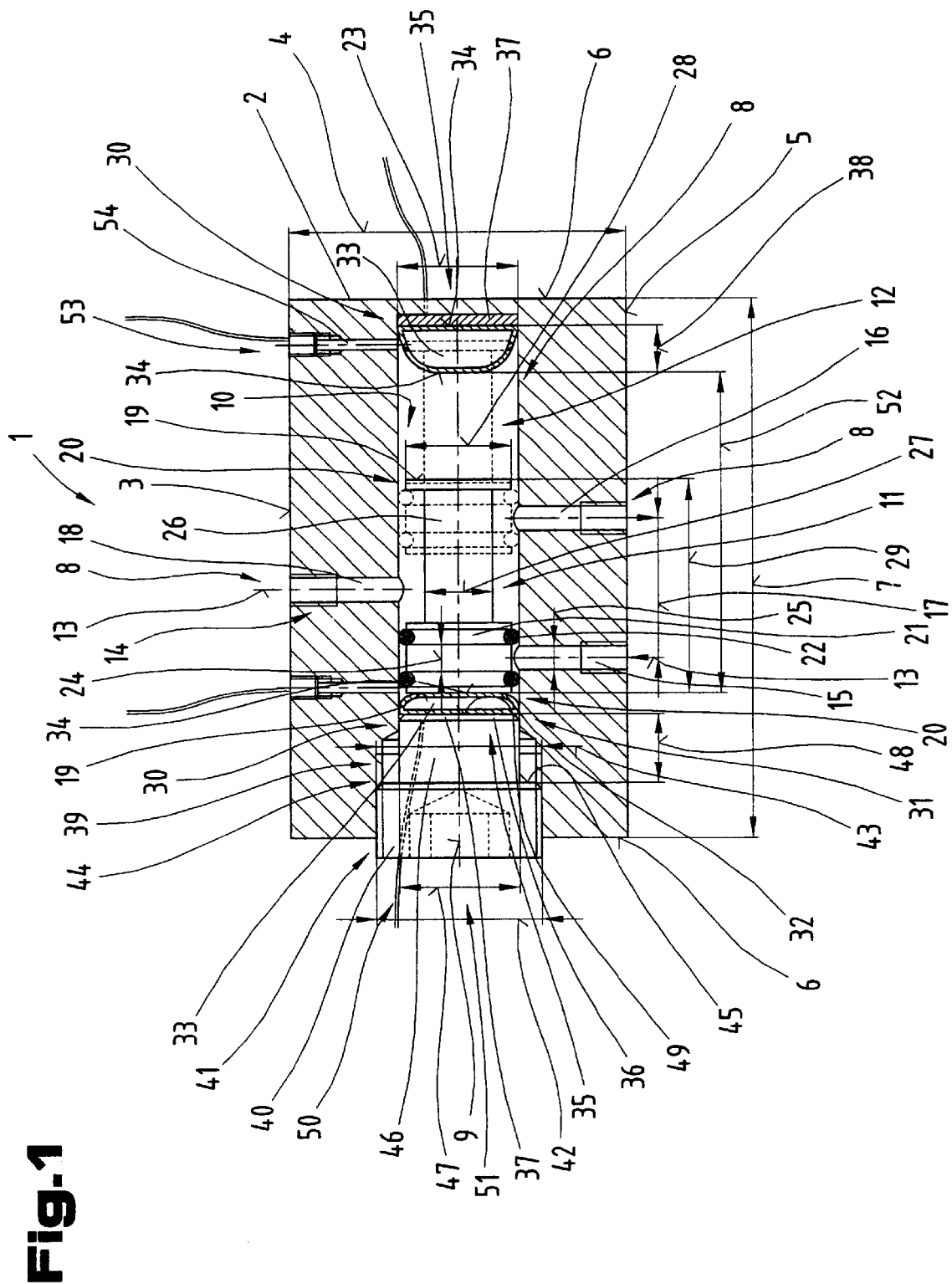
FIG. 1 shows a sectional face view of a control element as defined by the invention.

It has to be noted here that identical parts in the various embodiments of the invention are denoted by the same reference numerals or the same component designations, whereby the disclosures contained in the entire description can be applied within the same meaning to identical parts with identical reference numerals or identical component designations. Furthermore, individual features of the different exemplified embodiments shown may also in and by themselves represent independent solutions as defined by the invention.

DETAILED DESCRIPTION OF PREFERRED EMBODIMENTS

FIG. 1 shows a control element 1 for pressure media, in particular for a pneumatic valve 2. Said pneumatic valve is made of, for example metal or plastic and designed in the form of a square building stone. It has a preferably plane top side 3, a bottom side 5 extending parallel with the top side and spaced from the latter by a height 4, as well as the side surfaces 6 extending at right angles in relation to said top and bottom sides, whereby the two side surfaces 6 opposing each other and facing away from each other are spaced from one another by a length 7 measured at right angles in relation to the height 4. The control element 1 preferably has a plurality of channels 8.

At least one channel 8 is designed with a center axis 9 as the guiding device for at least one moving element 11, said axis extending parallel with the top side 3 and/or bottom side 5. Said channel 8 forming the guide device 10 is preferably designed in this connection as a distribution channel 12 for the medium. The bore axes 13 extend in the centers of the cylindrical channels 8, for example at right angles in relation to the top side 3 and/or the bottom side 5. The channel 8 extending from the top side 3 up to the distribution channel 12 is connected with a cylinder not shown, for example a pneumatic cylinder, for example via a connection thread 14 and hose connections not shown. From the bottom side 5, two channels 8, for example, project up to the distribution channel 12, whereby a channel 8 is designed as a feed channel 15 and another channel 8 as an exhaust channel 16. Said channels are spaced from each other by a spacing 17, which is, for example halved by a secondary channel 18 forming a channel 8 reaching from the bore axis 13 from the top side 3 up to the distribution channel 12.

The moving element 11 is limited in the direction parallel with the center axis 9 by the faces 19 extending at right angles in relation to said center axis. A sealing element 22 designed, for example in the form of a sealing layer or sealing ring extending concentrically around the center axis 9, is defined in this connection by an inside diameter 23 extending concentrically around the center axis 9, the latter defining the distribution channel 12. If two sealing elements 22 are used, such elements are spaced in the direction of the center axis 9 by a spacing 24, which, for example, has the same size as a channel diameter 25 of a channel 8, such channel diameter extending concentrically in relation to the bore axis 13.

Now, when the medium present in the pneumatic cylinder, for example the compressed air is to be exhausted from said cylinder via the secondary channel 18, which is connected, for example with a pneumatic cylinder not shown, the collar 20 having the sealing elements 22 is in the shown closing position, in which the connection between the feed channel 15 and the distribution channel 12 and/or the secondary channel 16 is blocked by the sealing elements 22. With the moving element 11 in said position, a connection is simultaneously established between the secondary channel 18 and the exhaust channel 16.

For reducing flow resistances, the two collars 20 are connected via an intermediate element 26 that has a diameter 27 extending concentrically around the center axis 9, said diameter being smaller than a collar diameter 28 measured parallel with said diameter 27. The collars 20 are spaced by the intermediate element 26 to such an extent that the faces 19 are spaced by a spacing 29 measured parallel with the center axis 9. With the moving element in the position in which it closes the feed channel 15, a face 19 is preferably in a position in which it abuts a means 30 for the relative movement between the moving element 11 and the valve body, said means being arranged adjacent to the feed channel 15.

Said means 30 is arranged in the valve body and is formed in the present exemplified embodiment by a transmission element 31 that has an elastically deformable cover 32, which completely encloses an interior space 33. The cover 32 has the outer surfaces 34 that are facing away from the interior space 33, whereby one outer surface 34 is, in the shown closing position of the moving element 11, in a position in which it abuts the face 19 of a collar 30. A heating device 35 is located on another outer surface 34 or in the interior space 33, said heating device preferably being formed by one or by a plurality of heating elements 36, in particular the heating resistors 37. Electrically generated heating energy is transmitted via said heating device 35, which can form a means 30 as well, to the transmission element 31, in particular to rapidly evaporating liquid that is located in the interior space 33. With a light change in temperature, said liquid changes its state preferably from the liquid to the gaseous state and thereby causes the interior space 33 to increase its volume.

Said state is shown in the present exemplified embodiment in connection with a means 30 that is also located in the distribution channel 12 adjacent to the drain channel 16. It can be seen in connection with said means, which is realized in the form of a transmission element 31 as well, that the outer surfaces 34 of the cover 32, said outer surfaces extending approximately at right angles in relation to the center axis 9 and approximately parallel with each other, are spaced from each other by a distance 38 measured approximately parallel with the center axis 9. Said distance 38 is greater than the distance 38 of the outer surfaces 34 of a cover 32 whose rapidly evaporating liquid located in the interior space 33 did not undergo any change in its state due to the action of thermal energy. This other means 30, too, has a heating device 35 preferably formed by the heating resistors 37, said heating device heating the rapidly evaporating liquid located in the interior space 33 and causing a change in the state of said liquid.

With rapidly evaporating liquids, said change in the state takes place in such a way that at the instant at which the state is changing, i.e. when with an increase in the volume of the interior space 33, cooling takes place and the change in the state from liquid to gaseous is thus reversed, the distance 38 is reduced again and the interior space 33 is caused to assume again its original volume. The brief change in volume causes a pulse to act on the face 19 of the moving element 11, causing the latter to be displaced in the distribution channel 12 that forms the guide device 10 for the moving element 11. The oppositely arranged means 30, which is not acted upon, then forms a damping device for the moving element 11.

The distribution channel 12 is designed, for example in the form of a blind hole and, in a zone disposed adjacent to the side surface 6, has a receiving element 39 for receiving a closing element 40. Said closing element has, for example a threaded section 41 having an outside diameter 42 extending concentrically around the center axis 9, said outside diameter being larger than the inside diameter 23 of the distribution channel 12 and approximately corresponding with a core diameter 43 of an inside thread 44 of the receiving element 39. A surface 45 of the closing element 40, said surface facing the distribution channel 12 and extending at a right angle in relation to the center axis 9 and defining the thread section 41 is overtopped by a preferably cylindrically shaped projection 46 in the direction of the distribution channel 12, said projection having a projection diameter 47 extending concentrically around the center axis 9, and a projection length 48 measured at a right angle in relation to said projection diameter. Said projection length spaces apart a front surface 49 extending at a right angle in relation to the center axis 9. Now, the heating element described above, which is supplied with electrical current via a line 50, is located on said front surface 49 and extends outwards in the projection 46 and within the zone of the threaded section 41.

Furthermore, the thread section 41 has, for example a hexagon receptacle 51 shown by dashed lines, which makes it possible to more or less insert the closing element 40 with its projection 46 in the guide device 10, i.e. in the distribution channel 12 and to thereby change a spacing 52 of the outer surfaces 34 of two transmission elements 31, said outer surfaces facing each other. This, in turn, makes it possible to exactly adapt the closing or the opening position of the moving element 11 to the channels 8 and to prevent in this way incorrect distribution of the medium to the different channels 8. Furthermore, the control element may have the monitoring elements 53, as shown by way of example, which are realized, for example in the form of the inductive approximation switches 54 that monitor the position of the moving element 11.

Figure 2:
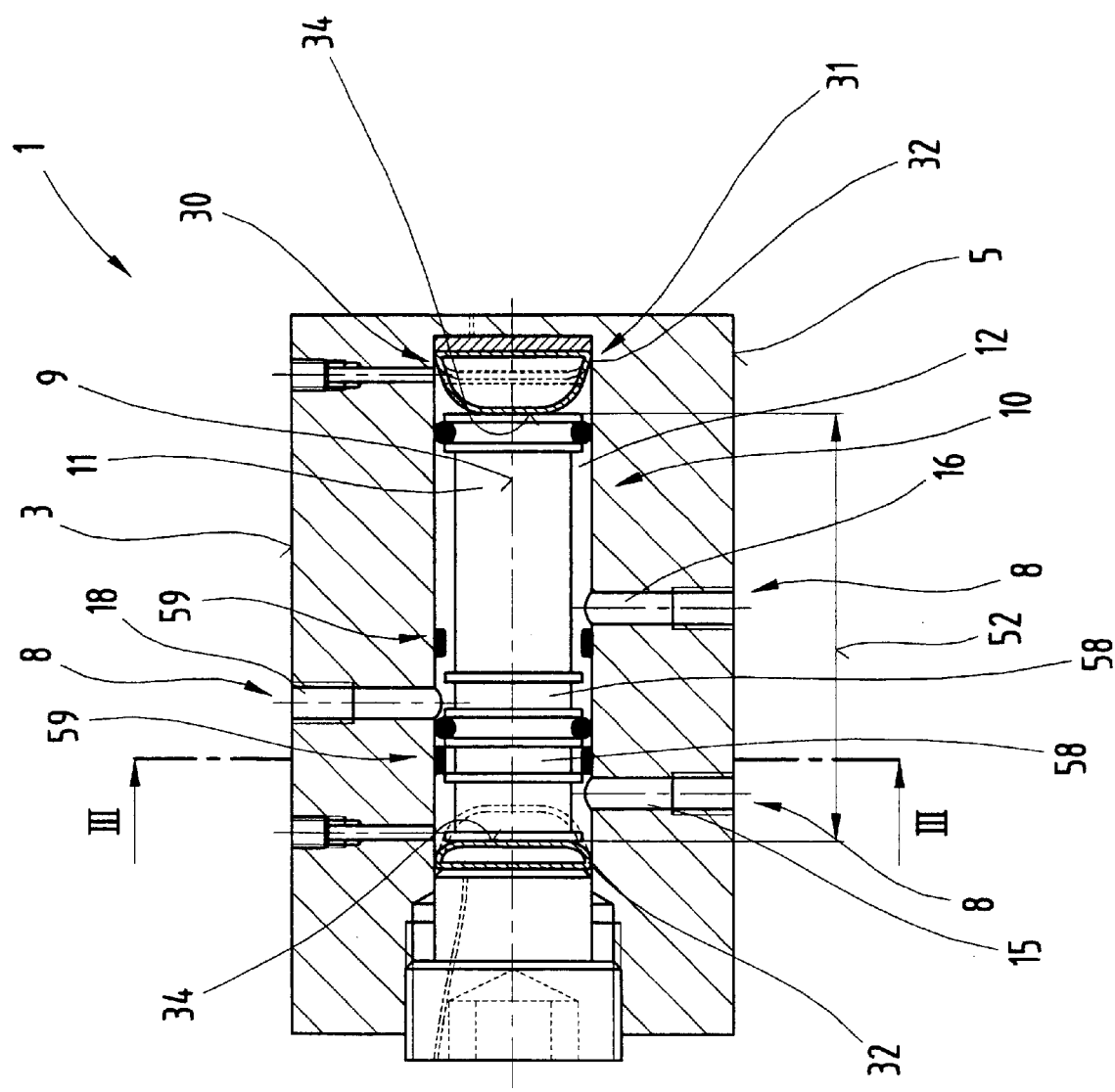
FIG. 2 is a sectional face view of another design variation of a control element as defined by the invention.
Figure 4:
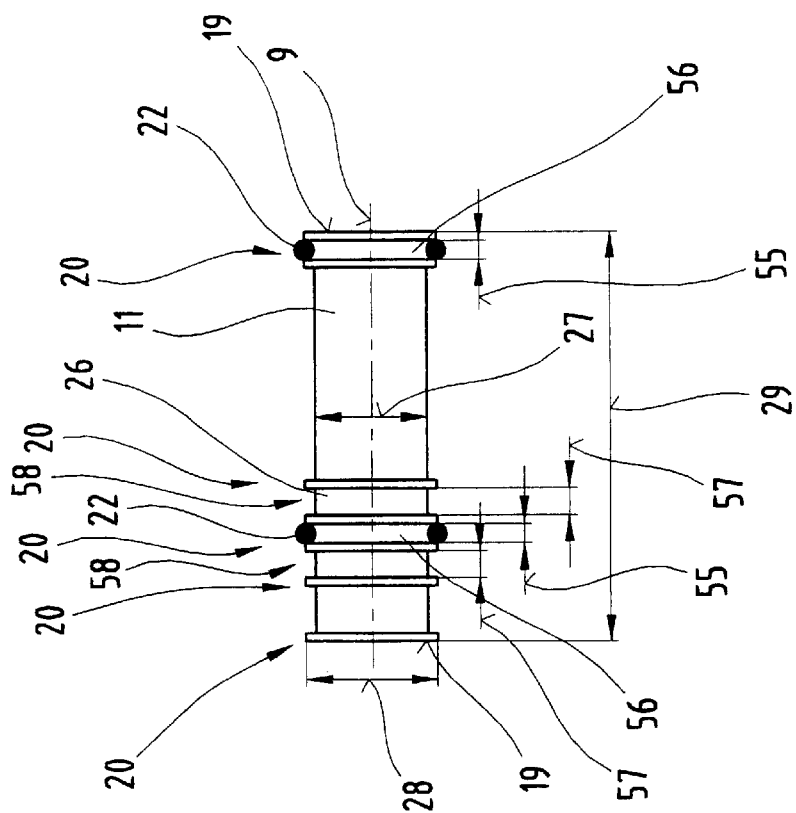
FIG. 4 shows a face view of a moving element of the control element as defined by the invention.
Figure 3:
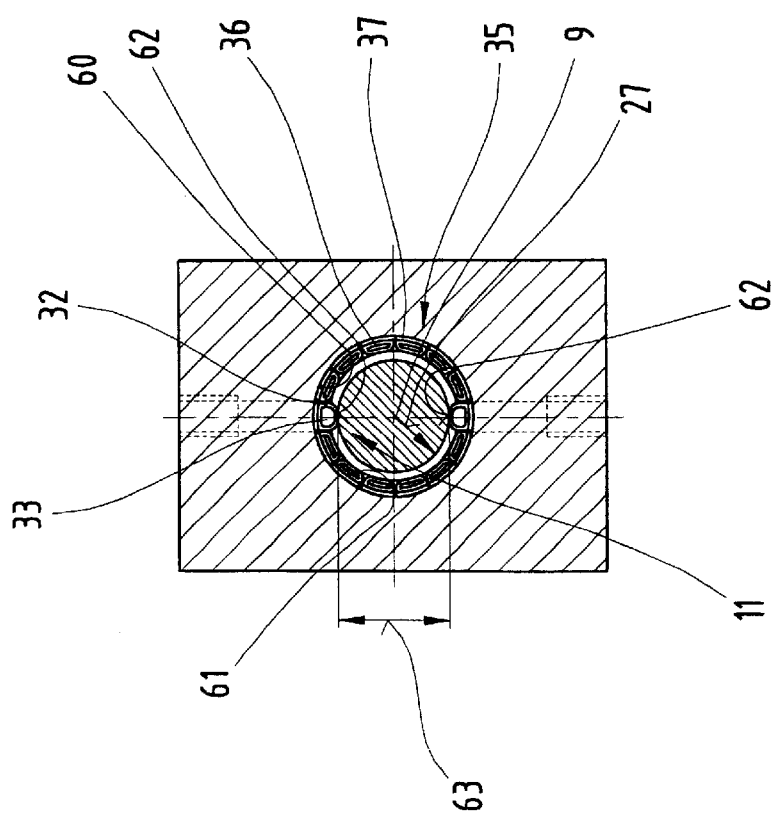
FIG. 3 is a sectional view of the control element cut along the lines III—III in FIG. 2.

The jointly described FIGS. 2 to 4 show another design variation of a control element 1 as defined by the invention. The control element 1 has in the distribution channel 12—which is designed as the guide device 10—the moving element 11. The moving element 11, which is shown in greater detail in FIG. 4, has the two faces 19 that are facing away from each other and define the moving element in the direction of the center axis 9, said faces 19 being spaced from one another by the spacing 29.

The moving element 11 has a plurality of collars 20 that are spaced from one another in the direction of the spacing 29. Each two collars 20 are spaced from one another by a distance 55, which is measured parallel with the spacing 29. The collars 20 have a collar diameter 28 that is measured concentrically around the center axis 9. The collars 20 spaced from each other by the distance 55 form a receiving groove 56 for the sealing-elements 22. Additional collars 20 are located spaced from the collars 20 of a receiving groove 56 by a spacing 57, said additional collars forming the holding grooves 58 for a holding and/or locking device that is shown in greater detail in FIG. 3. Collars 20 are located also in the end zones of the moving element 11 that are spaced from each other by the spacing 29, whereby collars may form a receiving groove 56 for a sealing element 22 as well. The outer surfaces 34 of the covers 32 of the means 30 designed as the transmitting elements 31 are spaced from each other by the spacing 52, which in the present exemplified embodiment corresponds with the spacing 29.

The control element 1 in turn has a plurality of channels 8, whereby a channel 8 projecting from the top side 3 to the distribution channel 12 is designed as a secondary channel 18, whereas a channel 8 projecting from the bottom side 55 to the distribution channel 12 is designed as a feed channel 15, and another channel as an exhaust channel 16. In the distribution channel 12, the above-mentioned holding and/or locking device 59 is located both in the intermediate zone between the feed channel 15 and the secondary channel 18, and between the exhaust channel 16 and the secondary channel 18.

Figure 33:
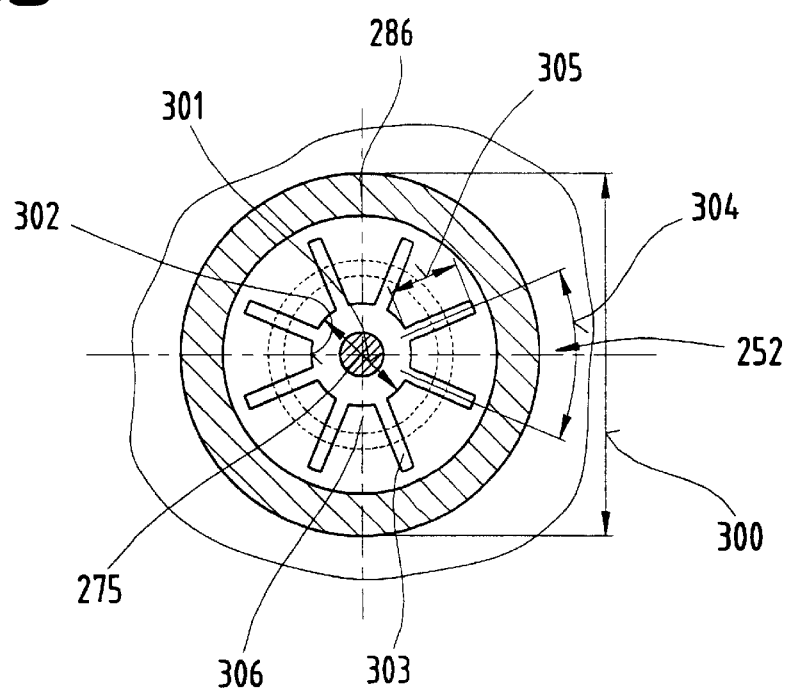
FIG. 33 shows the holding and/or locking device with a section according to lines XXXIII—XXXIII in FIG. 32.

Said holding and/or locking device is shown in detail in FIG. 33 and has a heating device 35 concentrically extending around the center axis 9. Said heating device is structured from a plurality of heating elements 36 that are arranged on an inner surface 60 defining the distribution channel 12 in the direction of the center axis 9. Said heating elements are successively arranged in the circumferential direction of the inner surface 60 and are formed, for example by the heating resistors 37. The moving elements 11 are located on an inner side 61 defining the heating elements 36 in the direction of the center axis 9, whereby one moving element 1 is preferably associated with each heating element 36. Said moving elements 11 have the covers 32 defining the inner spaces 33 in which a readily evaporating liquid is located.

Now, when thermal energy is admitted to a moving element 11 by means of the heating element 36, the liquid contained in the inner space 33 evaporates and the cover 32 expands, whereby said process takes place, for example simultaneously with two moving elements 11 opposing each other diametrically. In the expanded condition, the surfaces 62 of the moving elements 11 opposing each other diametrically, said surfaces 62 facing each other, are spaced from one another by a spacing 63 that is greater than the diameter 27 of the intermediate elements 26 of the moving element 11 shown in FIG. 4, which are spaced from each other by the collars 20. However, the spacing 63 is smaller than the collar diameter 28, so that for example two moving elements 11 opposing each other diametrically as shown in FIG. 3 engage the holding groove 58 and in this way prevent the moving element 11 shown in FIG. 4 from axially moving in the direction of the center axis 9.

Since the expansion of the cover 32 takes place for just a moment, the moving elements 11 arranged over the inner circumference of the inner side 61 of the heating device 35, i.e. the heating elements 36 associated with said moving elements are successively controlled, so that for example only two covers 32 opposing each other diametrically expand for a short time. However, due to such successive control, two of the covers 32 opposing each other are always expanded, so that the piston-shaped moving element 11 shown in FIG. 4 is always locked without the risk of any thermal destruction of the moving elements 11 or their covers 32 shown in FIG. 3. The holding and/or locking devices 59 a re arranged in the distribution channel 11 with such a spacing from each other that when the piston-shaped moving element 11 is in a position in which it prevents flow connection between the feed channel 15 and the secondary channel 18, a holding and/or locking device 59 engages a holding groove 58, whereas when the piston-shaped moving element 11 is in a position in which it prevents flow connection between the exhaust channel 16 and the secondary channel 18, another holding and/or locking device engages another holding groove 58 of the piston-shaped moving element 11.

The jointly described FIGS. 5 and 6 show another design variation of a control element 1 for media, in particular a pneumatic valve 2. The latter has a distribution channel 12 that has the center axis 9 and which is defined by the inside diameter 23 extending around the center axis 9.

The control element 1 has a plurality of channels 8, whereby one channel 8 is designed as a feed channel 15 and another channel 8 extending parallel with said channel is designed as an exhaust channel 16. Said channels have the bore axes 13, which extend parallel with each other and at right angles in relation to the center axis 9 and with a spacing 17 that is measured parallel with said center axis. Furthermore, said channels extend from the top side 3 up to the distribution channel 12 and, within the zone of the top side 3, have the connection thread 14. The secondary channel 18 extends by about the spacing 17 at right angles in relation to the center axis 9 and the bore axes 13, from a back side 64 extending at a right angle in relation to the top side 3, also up to the distribution channel 12. For example two moving elements 11 are located in the distribution channel 12, whereby one moving element 11 is associated with the feed channel 15 and one moving element 11 with the exhaust channel 16. In the present exemplified embodiment, the moving elements 11 are formed by drops of liquid, which are forcibly guided in a cage-like housing 65.

The housing 65 consists of a jacket 66 concentrically extending around the center axis 9 and the preferably plate-like face parts 67 extending at right angles in relation to the center axis 9, said face parts being spaced from each other by a width 68 that is measured parallel with the center axis 9. Said width is equal to or greater than the channel diameter 25 of the feed channel 15 and/or the exhaust channel 16 and approximately forms a width 69 of the drop-shaped moving element 11. The housing 65, and particularly the jacket 66 and the face parts 67 have the openings 70 permitting the medium to flow through. The means 30 for the relative movement and/or deformation of the moving element 11 are arranged opposite the feed channel 15 and/or the exhaust channel 16. In the present exemplified embodiment, said means are realized in the form of the wave energy sources 71 and/or the wave generators 72, in particular in the form of the microwave generators 73.

Said microwave generators have the axes 74 extending parallel with each other and preferably are arranged aligned with the bore axes 13 of the feed channel 15 and the exhaust channel 16. Now, if, for example, the exhaust channel 16 is to be blocked, i.e. if a flow passage is to be made available from the feed channel 15 to the secondary channel 18, a microwave generator 73 is acted upon, for example via a central connection line 75 and a plug 76. The moving element 11 is lifted off by the wave energy and moved in the direction of the exhaust channel 16, which is closed thereby. It is, of course, possible also to use instead of the moving element 11 a transmission element 31 as described in FIG. 1, of which the volume is changed by admitting microwave energy, and which thereby closes one of several of the channels 8.

The wave energy sources 71 are screwed into a threaded bore 77. In the present exemplified embodiment, the distribution channel 12 is realized in the form of a passage opening, whereby the receiving elements 39 for receiving the closing elements 40 are arranged within the zone of the side surfaces 6. Said receiving elements have the threaded sections 41 via which the closing elements 40 are screwed into the receiving elements 39. The present design variation offers the advantage that both the feed channel 15 and the exhaust channel 16 can be closed simultaneously.

Figure 7:
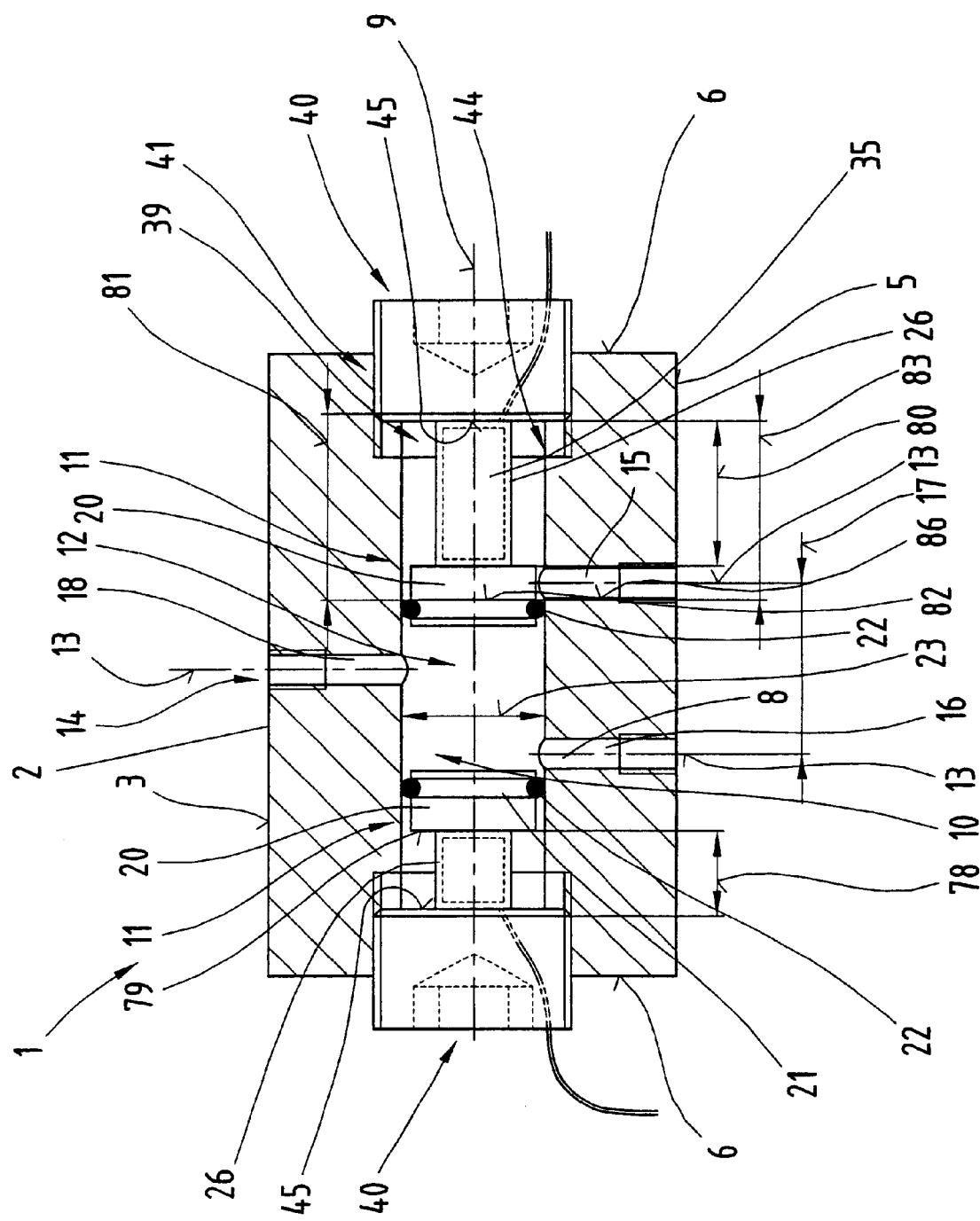
FIG. 7 shows another design variation of the control element as defined by the invention, by a sectional view.

FIG. 7 shows another variation of the control element 1 as defined by the invention, in particular of the pneumatic valve 2. Said pneumatic valve is defined by the top side 3, the bottom side 5 extending parallel with said top side, facing away from the latter, and by the side surfaces 6 extending parallel with each other. The center axis 9 extends parallel with the top aside 3 or bottom side 55, and the inside diameter 23 of the distribution channel 12, which is realized as a guide device 10, is concentrically arranged around said center axis 9. The secondary channel 18 extends with the bore axis 13 from the top side 3, extending at a right angle in relation to the center axis 9, said secondary channel having the connection thread 14 within the zone of the top side 3. The channels 8 extend, for example from the bottom side 5 with the bore axes 13 at right angles in relation to the center axis 9, whereby one channel 8 is realized as the feed channel 15 and another channel 8 as the exhaust channel 16. The feed channel 15 is spaced from the exhaust channel 16 by the spacing 17 that extends parallel with the center axis 9.

For example two moving elements 11 are located in the distribution channel 12, said moving elements each having a collar 20. The collar 20 has a deepening 21 serving the purpose of holding the sealing element 22 that concentrically extends around the center axis 9. Connected with the collar 20 via the intermediate element 26, the closing element 40 is arranged immovably in the distribution channel 12, said closing element being detachably arranged with the threaded section 41 in the inside thread 44 of the receiving element 39. The means 30 for the relative movement and/or the deformation of the moving element 11 is arranged, for example in or on the moving element 11, the latter being formed by the collar 20 and the intermediate element 26. Said means again may be formed by the heating device 35. The moving element 11 may be made of metal and/or plastic material and may have different coefficients of thermal expansion by sections, so that by heating the intermediate element 26, the length of the latter is changed in the direction of the center axis 9.

In the undeformed condition, the intermediate element 26 has in this connection a length 78 that is limited by the surface 45 of the closing element 40 and by a back surface 79 of the collar 20, said back surface extending parallel with the surface 45, facing the latter. Now, when energy is admitted to the heating device 35, the intermediate element 26 changes its expanse and reaches a final length 80 that is greater than the length 78. In said extended position, a spacing 81 of the surface 45 up to a deepening edge 82 of the deepening 21, said edge extending at a right angle in relation to the center axis 9, is greater than the distance 83, which is measured from the surface 45 up to a jacket line 86 located in the feed channel 15 adjacent to the exhaust channel 16, so that the direction of flow-through from the feed channel 15 to the secondary channel 18 is blocked by the sealing element 22. In the undeformed condition of the intermediate element 26, the direction of flow-through from the secondary channel 18 to the exhaust channel 16 is clear and the collar 20 with the sealing element 22 is spaced from the exhaust channel 16 in the opposite direction to the feed channel 15.

Figure 9:
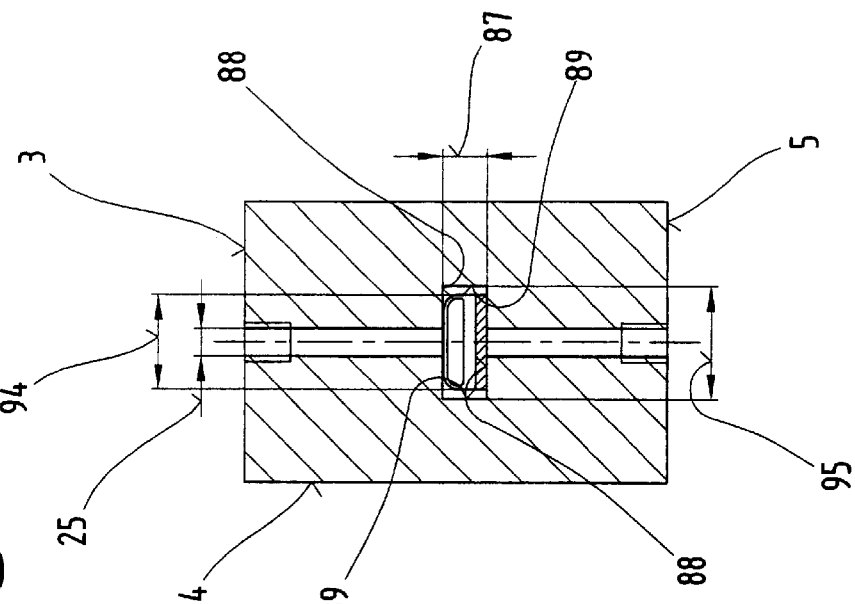
FIG. 9 shows the control element with a section along lines IX—IX in FIG. 8.
Figure 8:
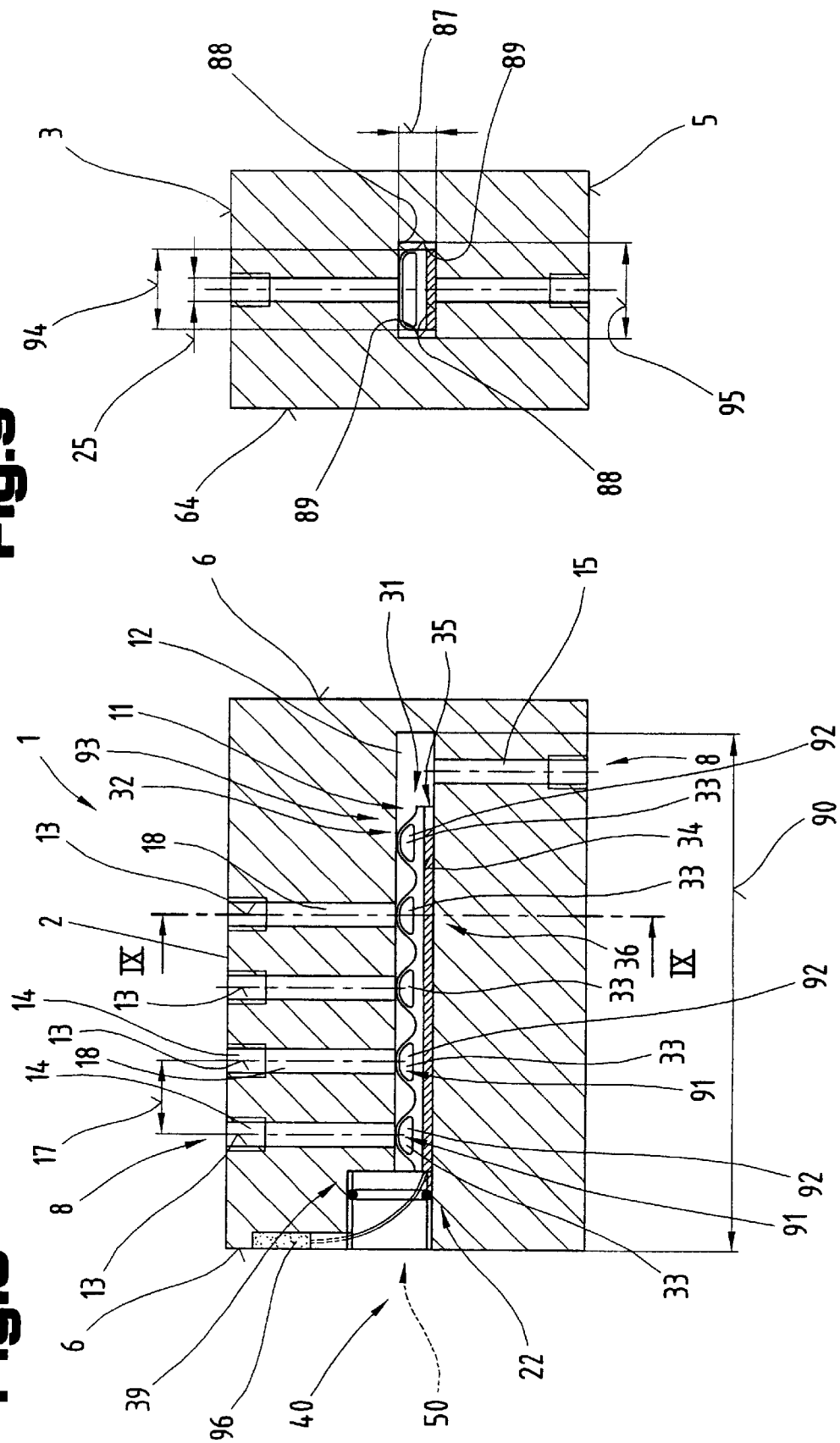
FIG. 8 shows another design variation of the control element as defined by the invention, by a sectional face view.

Another design variation of the control element 1 as defined by the invention is shown in the jointly described FIGS. 8 and 9. Said control element has the distribution channel 12, which is defined by the surfaces 88 extending parallel with the top side 3 and the bottom side 5, said surfaces being spaced from each other by a channel height 87, and by the side surfaces 89 facing each other, said side surfaces extending parallel with the back side 64. An about rectangular cross section of the distribution channel 12 is formed in this way, which has a length 90 from the side surface 6 in the direction of another side surface 6 that is facing away from the former and extending parallel with the former. The pneumatic valve 2 again has a plurality of channels 8, whereby a channel 8 extending from the bottom side 5 to the distribution channel 12 and in parallel with the side surface 6 is realized as the feed channel 5, and the other channels 8 reach from the top side 3 to the distribution channel 12 and are realized as the secondary channels 18. In the present exemplified embodiment, the control element 1 has the four secondary channels 18 that each are provided with a connection thread 14. Said secondary channels also extend parallel with the side surfaces 6, whereby the bore axes 13 of the, secondary channels 18 are spaced by the spacing 17.

The moving element 11 is located arranged in the distribution channel 12 and has a plurality of inner spaces 33 that are spaced in the direction of the length 90 and surrounded by at least one cover 32. Said inner spaces are filled with a readily evaporating liquid. Within the zone of intersection with the distribution channel 12, the secondary channels 18 form the openings 91, whereby a chamber 92 forming the inner space is associated with each opening 91. The moving element 11 is formed in this connection by the transmission element 31.

The heating device 35 is arranged in the zone between the surface 88 and the outer surface 34 of the moving element 11 facing said surface, whereby a heating element 36 is associated with each chamber 92. Preferably, however, the moving element 12 has more chambers 92 than secondary channels 18 are present, so that a chamber 92 is arranged also in the zone located between the feed channel 15 and the secondary channel 18 arranged adjacent to said feed channel, so that a main blocking element 93 is created in this way. As shown in FIG. 9, the moving element 11, i.e. the cover 32, in the undeformed state, has a width 94 measured parallel with the top side 3 that is greater than the channel diameter 25 of the secondary channel 18 and smaller than the width 95 spacing the side surfaces 89 apart. This creates between the cover 32 and the side surface 89 an intermediate space through which the medium can flow in the expanded state, so that each individual secondary channel 18 can be blocked separately. However, the width 94 of the main blocking element 93 can be realized in such a way that it corresponds in the expanded state with the width 95 and the last-mentioned intermediate space in the zone of the main blocking element 93 thus can be avoided.

Within the zone of the face 6, the control element 1 again has the receiving element 39 for receiving the closing element 40 which, for example is joined with the heating device 35 as one single part. Said closing element 40, furthermore, has at least one sealing element 22 and a line 50 that can be connected to further lines or to a central connection line, for example by way of a bus-plug 96.

Figure 10:
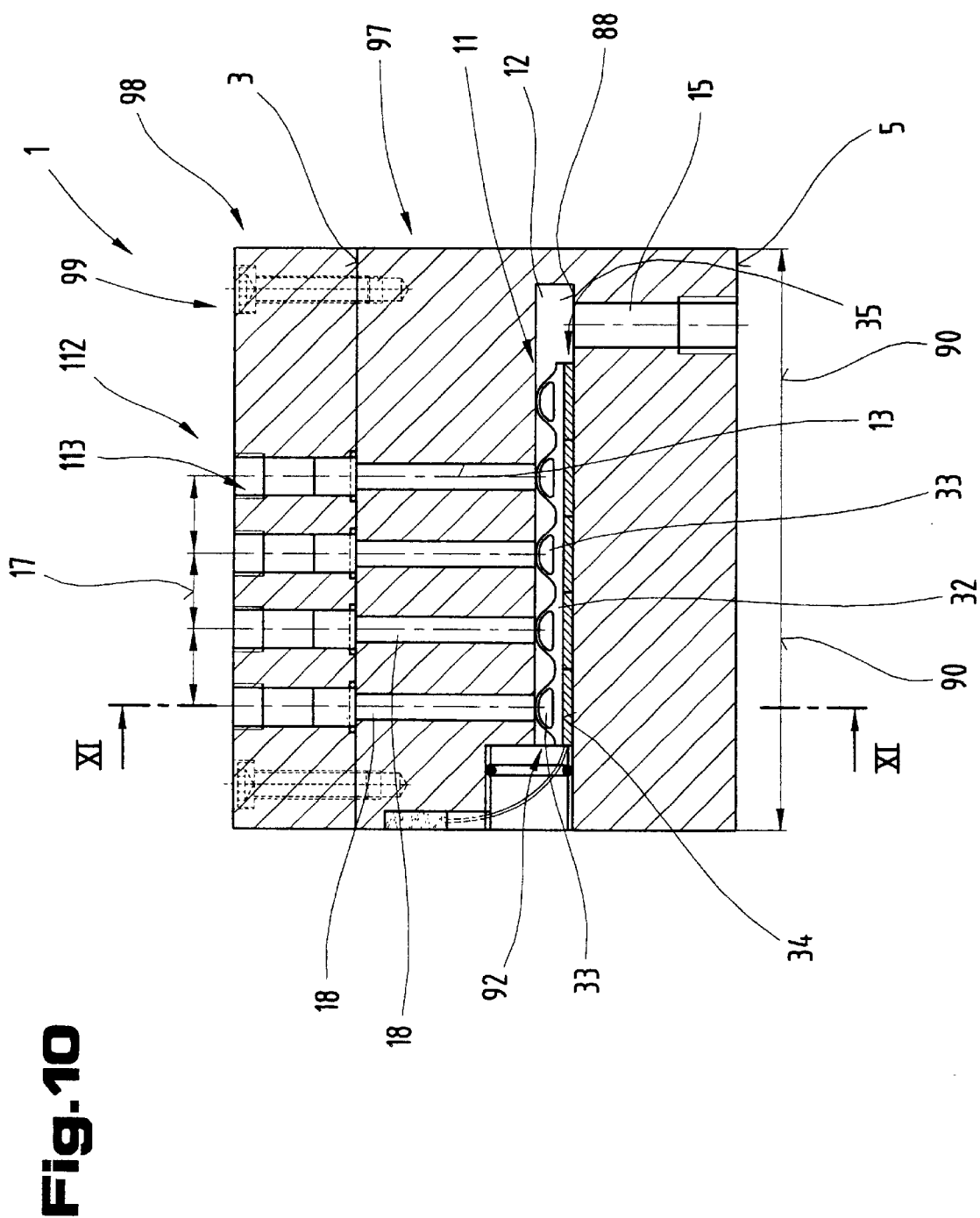
FIG. 10 shows another design variation of the control element as defined by the invention, by a sectional face view.

Furthermore, another design variation of the control element 1 as defined by the invention is shown in the FIGS. 10 to 12. Said control element consists of a basic body 97 and an additional body 98 that is arranged on the top side 3 of the basic body, forming a collecting element 99 for the medium. The basic body 97 has the distribution channel 12 as well as a feed channel 15 projecting from the distribution channel 12 up to the bottom side 5. Several secondary channels 18, which are spaced from each other by the spacing 17, extend from the top side 3, with their bore axes 13 extending at right angles in relation to the top side 3. The moving element 11 is located in the distribution channel 12 and again has a plurality of inner spaces 33 that are spaced apart in the direction of the length 90 of the basic body 97, said inner spaces being defined by at least one cover 32. The inner spaces 33 are filled with a readily evaporating liquid. The heating device 35 is arranged in the zone between the surface 88 of the distribution channel 12 associated with the bottom side 5, and the outer surface 34 of the moving element 11 or the cover 32 facing said surface.

The basic body 97 has a width 100 measured at a right angle in relation to the length 90, said width 100 being greater than a width 95 of the distribution channel 12 measured parallel with said width 100. The width 95 is realized in such a way that the basic body 97 has a plurality of secondary channels 18 also in the direction of the width 100, such secondary channels also being spaced from each, for example by the spacing 17. Said secondary channels reach from the top side 3 up to the surface 88 of the distribution channel 12 associated with said top side, and form the openings 91 in the zone of said surface 88. A chamber 92 of the moving element 11 forming the inner space 33 is associated with each opening 91 and a heating element 36 of the heating device 35 is associated with each chamber 92.

The secondary channels 18 of the basic body 97 are therefore arranged in the form of a grid, whereby for example five secondary channels 18, i.e. in particular their bore axes 13 are disposed in each case in a transverse plane 101 extending in parallel with the side surface 6, and the transverse planes are spaced from each other, for example by a spacing 17. Four of the secondary channels 18, i.e. their bore axes 13 are disposed for example in each case in a longitudinal plane 102 extending at right angles in relation to the transverse plane 101, said longitudinal planes extending parallel with the back side 64 of the basic body 97 and being spaced from each other, for example by the spacing 17 as well. This results in a grid-like arrangement of the secondary channels 18.

The moving element 11, which has a plurality of chambers 92 both in the direction of the length 90 and also in the direction of the width 95, has a width 94 that corresponds with the width 95 in the present exemplified embodiment. The openings 103 are formed in the zone of intersection of the secondary channels 18 with the top side 3, whereby the openings 103 of the secondary channels 18 disposed, for example in a transverse plane 101, feed into a groove-like deepening 104.

Said deepening has an inner surface 105 facing the top side 3, said inner surface being spaced from the top side 3 in the opposite direction towards the bottom side 5 by a groove depth 106. The deepening 104 is defined by two inside surfaces 107 extending at right angles in relation to the inner surface 105, and parallel with the side surface 6, said inside surfaces 107 being spaced from one another by a groove width 108 measured at a right angle in relation to the side surface 6. Said groove width is at least as large as the channel diameter 25 of the secondary channels 18. The deepenings 104 are bound in a plane extending parallel with the top side 3 by at least one sealing element 109. A connection opening 112 with a connection thread 113 projecting from the outer side 111 in the direction of the inner surface 105 extends from the inner surface 105 up to a outer side 111 spaced from said inner surface 105 by a height 110 in the opposite direction toward the top side 3. In the present exemplified embodiment, the additional body 98, i.e. the collecting element 99 is realized in such a way that five secondary channels 18 feed in each case into a deepening 104 having a connection opening 112. It is, of course, possible also that the deepening 104 extends not parallel with the side surface 6 but at a right angle in relation to the latter, so that for example four secondary channels 18 disposed in each case in a longitudinal plane 102 feed into a deepening 104 and thus into a connection opening 112.

Now, by closing one or several secondary channels 18 with the moving element 11 it is made possible by the present design variation to exactly adapt the amount of the medium passing through to a defined requirement and to combine, for example a multitude of the channels 8 to form one path of flow.

Figure 13:
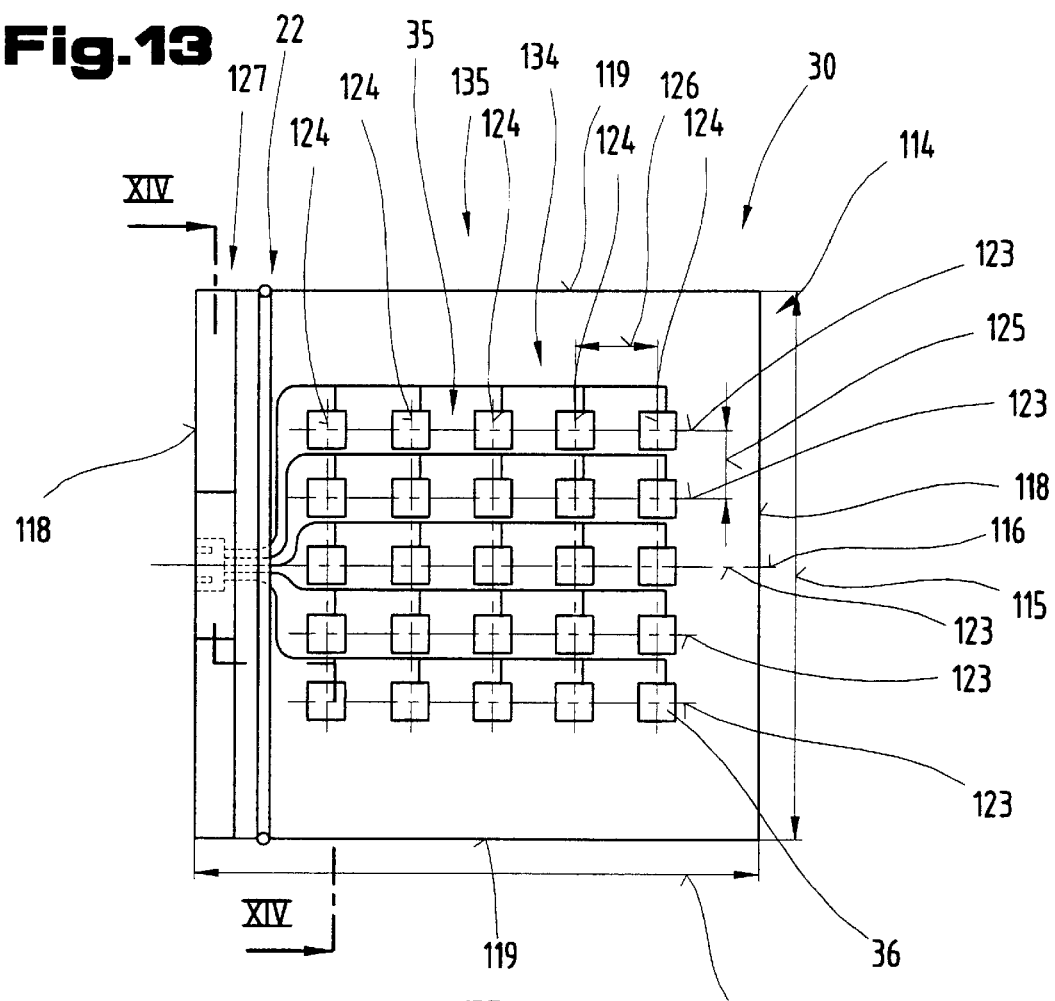
FIG. 13 shows a top view of a means for the relative movement.
Figure 14:
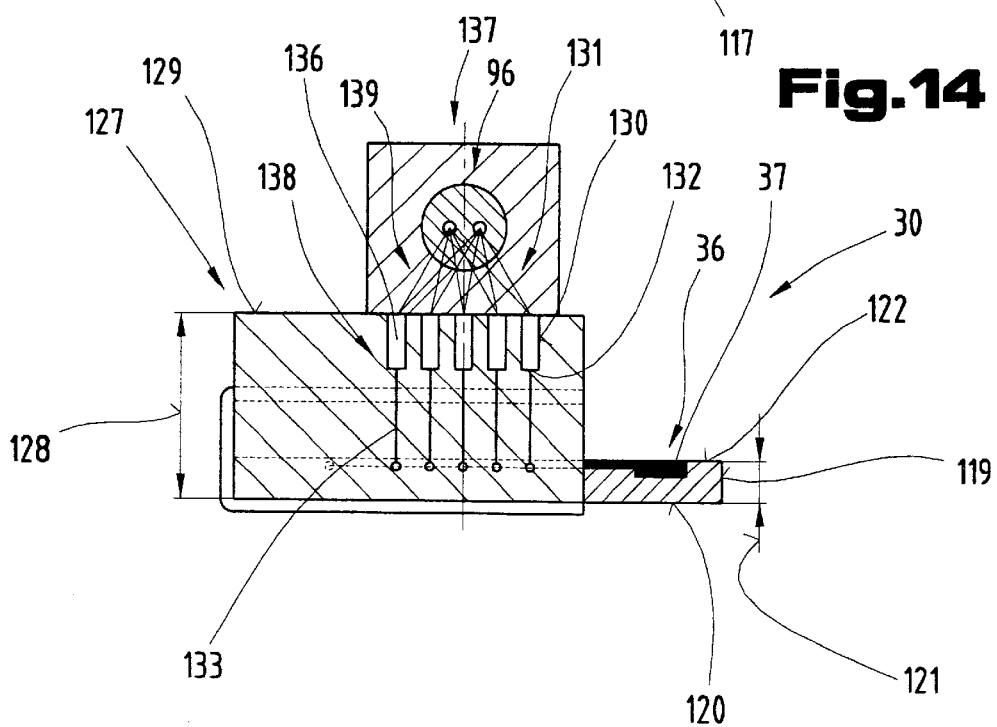
FIG. 14 shows the means with a section along lines XIV—XIV in FIG. 13.

Now, the jointly described FIGS. 13 and 14 show a means 30 for the relative movement and/or deformation of one or a plurality of moving elements 11, which are not shown. The means 30, which is forming a heating device 35, consists in this connection of a, for example rectangular basic plate 114 that has a width 116 which is halved by a longitudinal plane 116 extending at a right angle in relation to said width. Parallel to the longitudinal plane 116, the basic plate 114 has a length 117. Said length spaces apart two transverse side surfaces 118 extending parallel with the width 115 and at right angles in relation to the longitudinal side surfaces 119, the latter being spaced from each other by the width 115 and being arranged parallel with the longitudinal plane 116. Furthermore, the basic plate 114 is defined by a bottom side 120 extending at a right angle in relation to the longitudinal side surface 119, and by a top side 122 spaced from said bottom side by a height 121 and extending parallel with said bottom side.

A multitude of heating elements 36 which, for example, are realized in the form of the heating resistors 37, and which by their totality form a heating device 35, are located on the top side in the form of a grid. The heating elements 36 are arranged in this connection in such a way that five of the heating elements 36, for example, have in each case a longitudinal plane 123 extending parallel with the longitudinal plane 116, and for example five heating elements 36 have in each case a transverse plane 124 extending at a right angle in relation to said longitudinal plane 123 as well as in relation to the longitudinal plane 116. The longitudinal planes 123 are spaced in each case by a spacing 125 measured parallel with the width 115, and the transverse planes 124 are spaced by a spacing 126 measured at a right angle in relation to the spacing 125. The spacings 125, 126 can be realized in such a way that they correspond with the spacing 17 of the secondary channels 18 shown in FIG. 10.

The basic plate 114 has a face element 127 that has a face height 128 measured parallel with the height 121, said face height 128 being greater than the height 121. It spaces a face 129 from the bottom side 120, said face 129 extending parallel with the top side 122. The coupling receptacles 130 of a coupling device 131 are located in the face 129, said coupling receptacles projecting from the face 129 in the direction of the bottom side 120. Said coupling receptacle are realized, for example in the form of the plug sockets 132, from which the lines 133 lead in the direction of the bottom side 120 and subsequently to the heating elements 36. The lines 133 can be preferably realized in the zone of the top side 122 in the form of the conducting paths 134, so that the means 30 can be realized in the form of an integrated circuit or of a pc motherboard 135.

The coupling projections 136 are associated with the coupling receptacles 130 and arranged in a coupling element 137 located on the face 129. Said coupling element 137 has, for example a bus plug 96 that are, via the lines 139, in line connection with the coupling projections 136 which, for example, are realized in the form of the plug elements 138. Now, this makes it possible to control the coupling device 131 via a bus line and the bus plug 96 and, furthermore, via the lines 139, and furthermore to control individual heating elements 36 of several of the heating elements 36 via the lines 133 or the conductor paths 134. Furthermore, the means 30 has a sealing element 22. The heating elements 36 are arranged on the top side 122 in such a way that they are associated with the individual chambers 92 of a moving element 11 shown in FIGS. 10 and 11.

Figure 15:
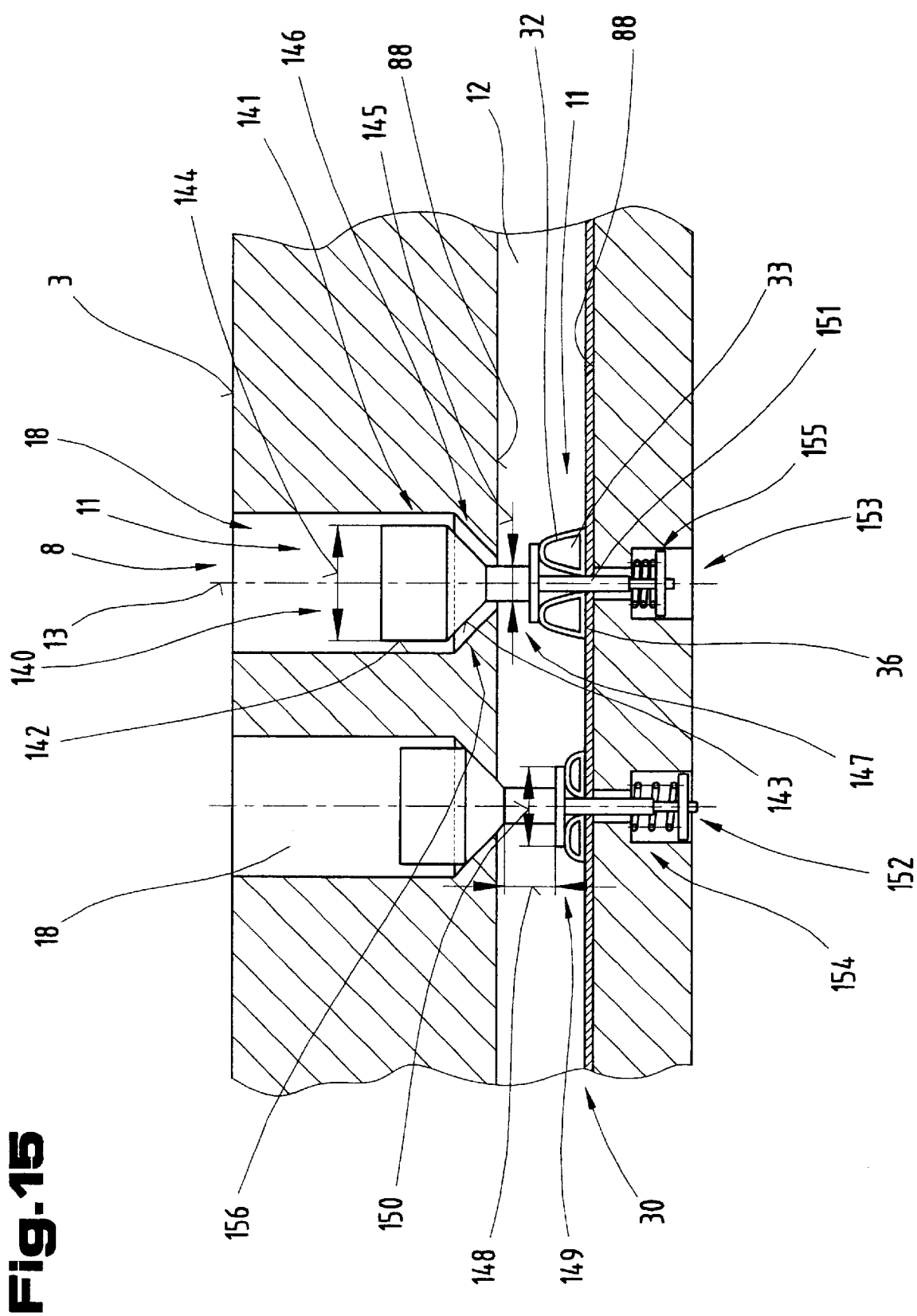
FIG. 15 shows a means and a moving element by a sectional face view.

FIG. 15 shows another variation of a moving element 11, which is realized, for example in the form of a lifting piston 140 that is arranged in a channel 8, in particular in the secondary channel 8. The lifting piston 140 has a sealing section 141 that is formed by a cone jacket 143 extending from a cylinder jacket 143—which is arranged cylindrically around the bore axis 13—in the direction of the distribution channel 12, whereby the cylinder jacket 142 has a jacket diameter 144 that is larger than a diameter 145 of a bar 147 extending from a cone part 146—which is bound by the cone jacket 143—in the direction of the distribution channel 12. In the opposite direction toward the cylinder jacket 142, the bar 147 has a collar 149 spaced at a spacing 148 from the cone part 146. Said collar 149 has a collar diameter 150 that is larger than the diameter 145 of the bar 147. Adjoining the collar 149, a tie rod 151 extends in the opposite direction toward the sealing section 141, said tie rod having a threaded section 152 in an end zone facing away from the sealing section 141.

The tie rod 151 is bound by a moving element 11 which, as described above, is formed by a cover 32. Said cover encloses an inner space 33 in which again a high-boiling liquid is contained. In the zone between the cover 32 and the surface 88 of the distribution channel 12, the means 30 is present, for example at least in the form of a heating element 36. The tie rod 151 projects in this connection through the heating element 36 as well as through the surface 88 and projects into an opening 153, in which a spring element 154 is arranged. A dish element 155 is screwed to the threaded section 152. Within the zone of the surface 88 associated with the top side 3, the secondary channel 18 has a seal seat 156 extending conically tapering in the direction of the distribution channel 12, with the cone jacket 143 of the lifting piston 140 being associated with said seal seat 156.

Now, when no thermal energy is admitted to the cover 32, the spring element 154 applies a spring force to the dish element 155 that is detachably or undetachably connected with the tie rod 151, and thereby causes the cone jacket 143 of the lifting piston 140 to be pressed against the sealing seat 156, which interrupts the passage of flow from the distribution channel 12 into the secondary channel 18. Now, if said passage of flow is to be opened, thermal energy is admitted into the cover 32 via the heating element 36, which causes the high-boiling liquid contained in the inner space 33 to evaporate, and the cover 32 to be expanded. This causes a force of pressure directed against the spring force to be applied to the collar 149, and the lifting piston 140, i.e. the cone jacket 143 is lifted from the sealing seat 156 and the spring element 154 is tensioned, which, upon termination of the action of thermal energy and when the liquid contained in the inner space 33 changes its state from the gaseous to the liquid state, causes the lifting piston 140 to be automatically forced into the closing position by spring force.

Figure 16:
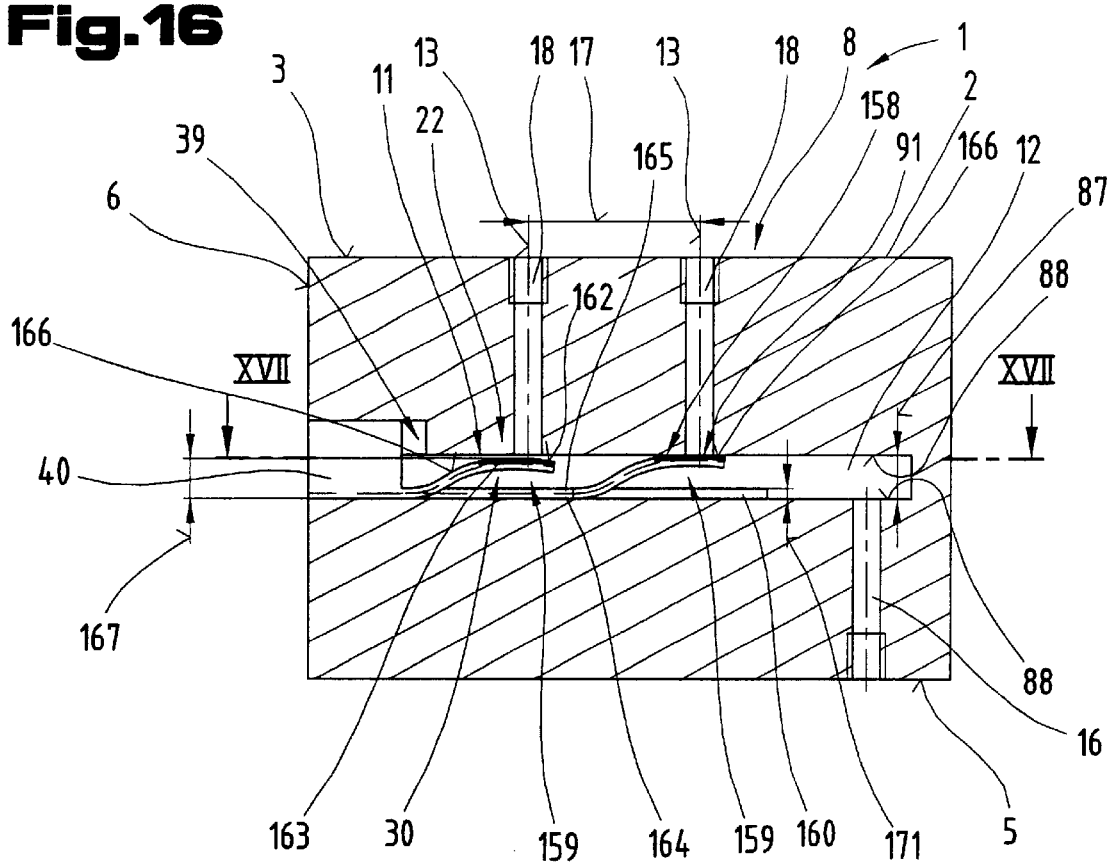
FIG. 16 shows another design variation of the control element as defined by the invention, by a sectional face view.
Figure 17:
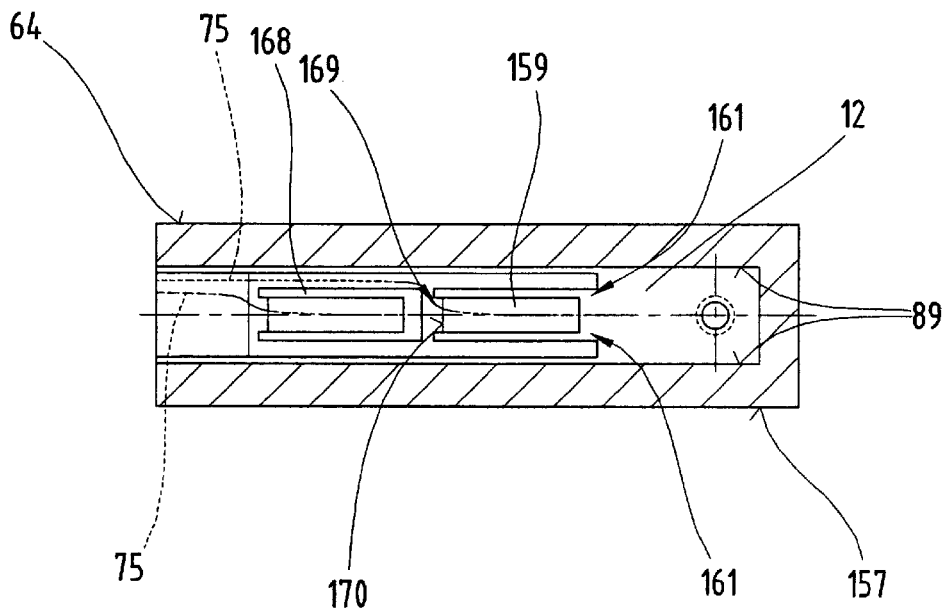
FIG. 17 shows the control element with a section along lines XVII—XVII in FIG. 16.

The jointly described FIGS. 16 and 17 show another exemplified embodiment of a control element 1 as defined by the invention, in particular a pneumatic valve 2. The distribution channel 2 has the surfaces 88 extending parallel with the top side 3 and/or the bottom side 5, said surfaces facing each other and being spaced apart by the channel height 87. Furthermore, the distribution channel 12 is defined in the direction of the back side 64 and a front side 157 extending parallel with said back side by the side surfaces 89 facing each other. For example the two secondary air channels 18 extending parallel with each other and in relation to the side surface 6, reach from the top side 3 up to the distribution channel 12, with their bore axes 13 by spaced apart by the spacing 17. The exhaust channel 16, for example, which extends parallel with the side surface 6 and in relation to the secondary air channels 18, reaches from the bottom side 5 up to the distribution channel 12.

The moving element 11 and/or the means 30 for the relative movement and/or the deformation of the moving element 11 are formed by a multi-layer element 158 that has the elastically deformable, tongue-shaped elements 159 conforming to the channels 8 to be closed. Said elements project over a base plate 160 of the multi-layer element 158, said base plate abutting, for example the surface 88 disposed adjacent to the bottom side 5. The tongue-shaped elements 159 are in this connection at least in sections defined by the slot-like recesses 161 arranged in the base plate 160, and have the sealing elements 22 on the top side 162 facing the secondary air channels 18, said sealing elements each being formed, for example by an elastic sealing layer 163.

The multi-layer element 158, in particular the base plate 160 and the tongue-shaped elements 159 are structured, for example in two layers, whereby a first layer 164 disposed adjacent to the bottom side 5 is formed by a metallic or non-metallic material which, upon admission of electrical current or upon application of a voltage is deformed in the opposite direction toward the bottom side 5. A layer 165 disposed adjacent to the top side 3 is formed by a material not having the properties of the layer 164, which results in a resetting effect.

The tongue-shaped elements 159 or the sealing elements 22 arranged on said elements 159 are defined in the direction of the top side 3 by a sealing surface 166 which, in the undeformed state of the tongue-shaped elements 159, is, in a zone or curvature that is disposed closest to the top side 3, spaced from the surface 88 arranged adjacent to the bottom side 5 in the opposite direction toward the bottom side 5, by a spacing 167 that is smaller than the channel height 87 of the distribution channel 12.

Now, when a voltage or an electrical current is applied to the tongue-shaped element 159, the latter is deformed and moved in the direction of the top side 3, so that the spacing 167 corresponds with the channel height 87 and the opening 91 of the secondary channel 18 is therefore closed by the sealing element 22, in particular by the sealing layer 163. In this way, only the air conducted via the second secondary channel 18 into the distribution channel 12 is discharged via the exhaust channel 16, for example from a pneumatic driving device. In order to realize the mobility of the tongue-shaped elements 159, the base plate 160 has the release positions 168 that space the tongue-shaped elements 159 from the base plate 160. This, however, also creates in each case for one tongue-shaped element 159 a deformation zone 169, for example in the form of a bending edge 170.

A base plate thickness 171 measured parallel with the channel height 87 is not greater than the channel height 87. One or several connection lines 75 extend in or on the base plate 160 and/or the tongue-shaped elements 159, said lines serving the purpose of admitting electrical current or voltage to the tongue-shaped elements 159. Furthermore, the pneumatic valve 2 again has the receiving element 39 in which the closing element 40 is arranged, the latter preferably being connected with the base plate 160 in the form of one single piece. However, instead of being formed by a multi-layer element 158, the moving element 11 and/or the means 30 can be formed also by an element that is produced from a so-called memory metal which, when acted upon by energy, is moved into the sealing position, and which, upon termination of the admission of energy, is automatically reset to its original position because of the memory effect.

Figure 18:
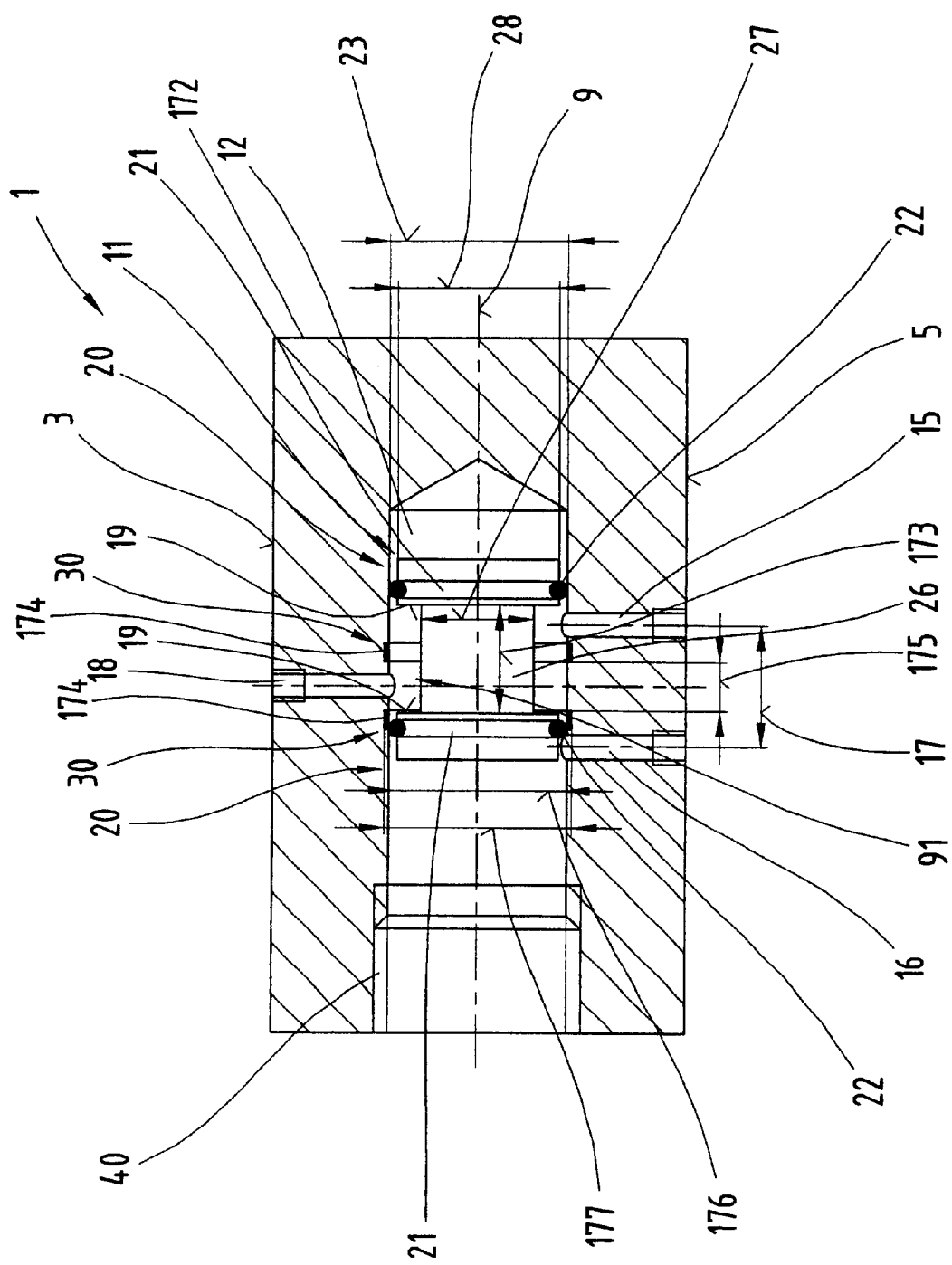
FIG. 18 shows another design variation of the control element as defined by the invention, by a sectional face view.

FIG. 18 shows another embodiment of the control element 1 as defined by the invention, for example in the form of a hydraulic valve 172. The latter has the feed channel 15 and the exhaust channel 16. Said channels project from the bottom side 55 into the distribution channel 12 and are spaced from one another by the spacing 17. The secondary channel 18 extends from the top side 3 to the distribution channel 12. The moving element 11 is located in the distribution channel 12 and has the two collars 20 extending at right angles in relation to the center axis 9. Each of said collars has at least one deepening 21 for the sealing elements 22. The collars are connected via the intermediate element 26 and are defined by the faces 19 facing each other, said faces being spaced from each other by an intermediate element length 173. The diameter 27 of the intermediate element 26 its smaller than the collar diameter 28 of the collars 20.

The distribution channel 12 realized in the form of a bore has the means 30 for the relative movement of the moving elements 11. Which are realized, for example in the form of the electrically operated coils 174. Said coils are spaced from each other by a spacing 175 measured parallel with the center axis 9. Said coils, furthermore, have an inside diameter 176 measured at a right angle in relation to the center axis 9 and an outside diameter 177 measured parallel with said inside diameter, whereby the inside diameter 176 corresponds with the inside diameter 23 of the distribution channel 12. The outside diameter 177 is larger than the inside diameter 176.

The opening 91 of the secondary channel 18 is located, for example in the zone of the spacing 175. Now, if the path of flow shown in FIG. 18 from the feed channel 15 into the secondary channel 18 is to be changed in such a way that the secondary channel 18 is connected in terms of flow with the exhaust channel 16, the coil 174 disposed adjacent to the exhaust channel 16 is switched to currentless and current is admitted to the coil 174 disposed adjacent to the feed channel 15, which then causes the collar 20 disposed adjacent to the feed channel 125 to be moved by the electromagnetic force in the direction of the exhaust channel 16, which moves the sealing element 22 into a position located between the feed channel 15 and the secondary channel 18, which blocks this flow path and the flow path from the secondary channel 18 to the exhaust channel 16 is released in this way, i.e. the collar 20 disposed adjacent to the exhaust channel 16, or the sealing element 22 arranged on said collar is moved into a position spaced from the exhaust channel 16 in the opposite direction in relation to the exhaust channel 16. The hydraulic valve 172 again has the closing element 40 that closes the distribution channel 12.

Figure 19:
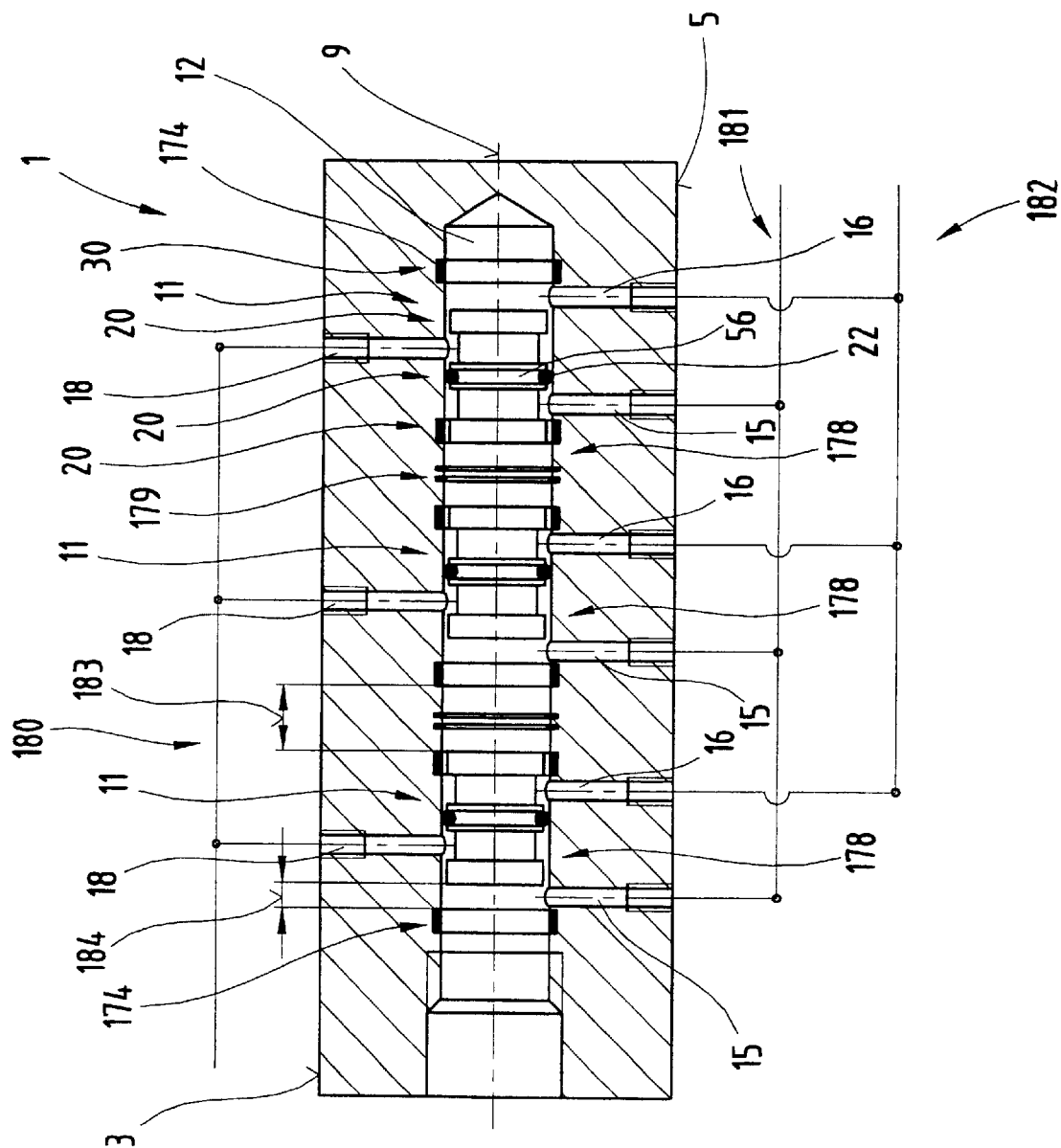
FIG. 19 shows another sectional face view of another design variation of the control element as defined by the invention.

FIG. 19 shows another design variation of the control element 1 as defined by the invention. Said control element has a plurality of the moving elements 11 arranged in the distribution channel 12, whereby the distribution channel 12 is divided in the distribution sections 178, so that a sealing partition 179 is arranged between two adjacent distribution sections 178. The moving element 11 has a plurality of collars 20 concentrically extending around the center axis 9, whereby two collars 20 form a receiving groove 56 for the sealing-element 22, with additional collars 20 being spaced from said two collars in directions opposing each other.

The means 30 for the relative movement, said means being realized in the form of the coils 174, are arranged in the distribution channel 12. A collar 20 of the moving element 12 is associated in each case with one of the two coils 174 arranged in a distribution section 178, so that when a coil 174 is acted upon, the collar 20 associated with that coil is attracted in the direction of said coil 174 and the moving element 12 is displaced in that way along the center axis 9. Several secondary channels 18 are arranged on the top side 3, such channels being combined, for example in one common medium main line 180. Several feed channels 15 are located on the bottom side 5, said channels being combined, for example in one common medium feed line 181. Several exhaust channels 16, which are arranged on the bottom side 5 as well, are combined in a common medium exhaust line 182 as well. It is now possible in this way to supply medium-actuated consumers with a larger volume of medium and to furthermore vary said volume.

The coils 174 are arranged in the distribution channel 12 in such a way that each two adjacent coils 174 of two adjacent distribution sections 178 are spaced from one another by a distance 183 that is greater than a parallel measured spacing 184 of a coil 178 from a collar 20 of a moving element 11 that is associated with such a coil but spaced from it, such moving element being located in a distribution section 178. The coil 174 of a distribution section 178 is prevented in this way from influencing the moving element 11 of an adjacent distribution section 178.

Another design variation of a control element 1 as defined by the invention is shown in the jointly described FIGS. 20 and 21. Said control element has two secondary channels 18 reaching from the top side 3 to the distribution channel 12, as well as two channels 8 extending at right angles in relation to said secondary channels, with one of said channels 8 being a feed channel 15 and another an exhaust channel 16. The distribution channel 12 is realized in the form of a cylindrical bore which, in a zone adjacent to the bottom side 5, has a groove 185 with a groove bottom 186 extending parallel with the bottom side 5. The transmission element 31 and/or the means 30 are arranged in said groove 185. The distribution channel 12 is closed by a plate-like closing element 40, which, in an inside surface 187 facing the distribution channel 123, has a cylinder-shaped bolt 188 projecting beyond said inside surface at a right angle.

Said bolt has a bolt length 189 measured parallel with the center axis 9 and at a right angle in relation to the inner surface 187, said bolt length preferably being greater than the length 90 of the distribution channel 12 measured parallel with said bolt length. The bolt 188 has a bolt diameter 190 measured at a right angle in relation to the bolt length 189, said bolt diameter 190 being equal to or smaller than a recess diameter 191 of a recess 192, the latter being arranged in an end zone 193 of the control element 1, said end zone being arranged in the opposite direction in relation to the closing element 40. A depth 194 of the recess 192 measured parallel with the bolt length 189 is selected in this connection in such a way that when added with the length 90 it is greater than the bolt length 189. The bolt 188 forms the guide device 10 for the moving element 11, which is arranged in the distribution channel 12. Provision can be made in this connection between the bolt 188 and the moving element 11 for a longitudinal guide that prevents a radial movement of the moving element 11.

The moving element 11 has one or several bearing elements 195 extending concentrically around the center axis 9. Said bearing elements are particularly realized in the form of the sliding bearing bushes 196, in which the bolt 188 is inserted. The moving element 11 has at least one sealing element 22 that is preferably realized as one single piece and that has two transverse bridges 197 as well as two peripheral bridges 198 extending approximately at right angles in relation to said transverse bridges. The transverse bridges 197 extend parallel with the center axis 9 and they are spaced from the groove bottom 186 in the opposite direction toward the bottom side 5 by a height 199, the latter being greater than a width 200 of the groove sides 201 extending parallel with each other, facing each other, and at right angles in relation to the groove bottom 186, said width 200 being measured parallel with said height 199. The width 200 is defined in this connection by the groove bottom 186 and an intersection edge 202, which is formed by the groove sides 201 and s cylindrical surface 203 of the distribution channel 12 that extends concentrically around the center axis 9. However, the height 199 is smaller than an axis spacing 204 measured parallel with said height, said distance 204 spacing the bore axis 13 of the feed channel 15 and/or the exhaust channel 16 from the groove bottom 186. The axis spacing 204 corresponds in this connection at least with the height 199 plus half of the channel diameter 25 of the feed channel 15 and/or the exhaust channel 16.

In a zone facing the groove bottom 186, the moving element 11 has the concave moldings 205 extending at right angles in relation to the center axis 9. Said moldings project beyond a surface line 207 in the direction of the center axis 9 by a molding depth 208, said surface line defining the moving element 11 in the direction of the groove bottom 186 and being disposed in a plane of symmetry extending through the center axis 9 and being located at right angles in relation to the inner surface 187 and to the top side 3. The surface line 207 is removed from the groove bottom 186 by a spacing 209, which is smaller than a height 210 of a segment 211 of the cover 32 of the transmission element 31, whose chamber 92 is in the expanded condition. And end edge 212 of the moving element 11, said end edge being disposed adjacent to the closing element 40, is spaced from the inner surface 187 by a spacing 213, which, in a final position of the moving element 11 closing the exhaust channel 16, is greater than a spacing 214 of a surface zone of an expanded segment 211 from the inner surface 187, said surface zone being disposed closest to the center axis 9. In this connection, the end edge 212 is spaced from the surface zone of the segment 211 disposed closest to the center axis 9 by a lateral offset 215 measured parallel with the center axis 9.

Now, when the moving element 11 has to be moved in the opposite direction to the closing element 40, the segment 211 of the transmission element 31 disposed adjacent to the closing element 40 is expanded, which causes the cover 32 to apply pressure to the adjacent end edge 212 and to exert in this way on the moving element 11 a component of axial force extending parallel-with the center axis 9. This causes another end edge 216 defining the first molding 205 at the opposite end to reach a position in which said end edge also has the lateral offset 215 in relation to the surface zone of the further segment 211 of the transmission element 31 that is disposed closest to the center axis 9. Now, when said further segment 211 then expands, the moving element 11 carries out a farther-leading axial movement in accordance with the described procedure.

The axial movement of the moving element 11 is limited by a sleeve-like stop 217, which is arranged extending concentrically around the bolt 188. Said stop 217 has a ring-shaped stop surface 218 that faces the moving element 11 and that extends parallel with the face 219 of a recess 220 of the moving element 11. When the moving element 11 is in a position in which the feed channel 15 is sealed by the means of the sealing elements 22, the stop surface 218 and the face 219 are in abutting positions.

Now, when the moving element 11 is to be moved in the direction of the closing element 40, i.e. into a position in which it seals the exhaust channel 16, a component of an axial force is applied to an end edge 221 that limits the moving element 11 in the opposite direction in relation to the closing element 40, such component of an axial force being generated by a expanding segment 211 associated with said end edge 221. For the axial movement it is furthermore necessary that the segments 211 are not expanded simultaneously, but in each case in a successive sequence, so that when one segment 211 is expanded, the segments 211 adjacent to such expanded segment and preferably all other segments are in the relieved state. The expansion of the segments 211, which in the chambers 92 again have a rapidly evaporating liquid, is caused by admitting heat to the segments 211 by means of the above-described heating device 35 consisting of the individual heating elements 36, whereby a heating element 36 is associated with each of the segments 211, and whereby each segment 211 can be supplied with electrical current independently of the other heating segments 36. For the purpose of limiting the axial movement in the direction of the closing element 40, a stop 217 is concentrically arranged around the bolt 188 as well.

Figure 23:
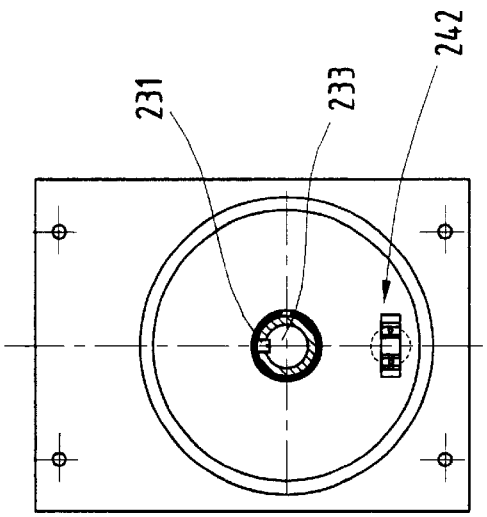
FIG. 23 shows the closing piece by a section along lines XXIII—XXIII in FIG. 22.
Figure 22:
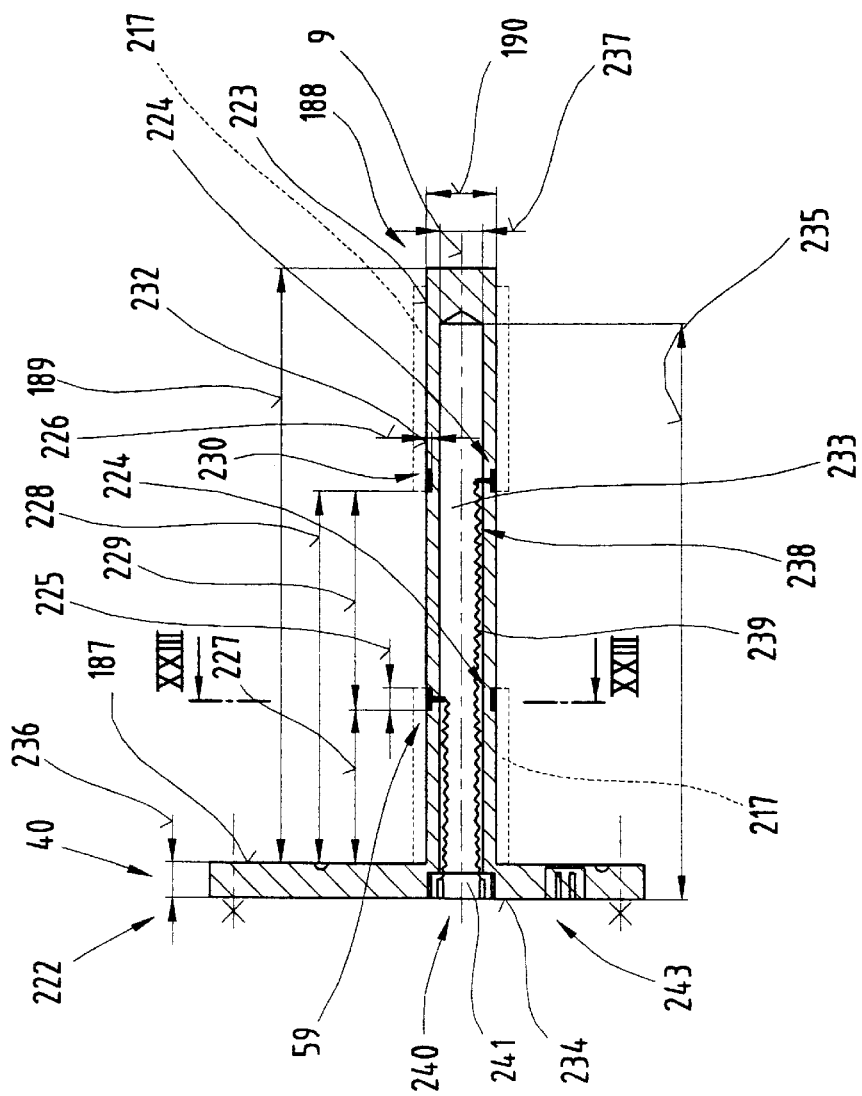
FIG. 22 shows a closing piece of the control element as defined by the invention, by a sectional side view.

The jointly described FIGS. 22 and 23 show a closing element 40 of the control element 1 as defined by the invention that is shown by way of example in FIGS. 20 and 21. Said closing element has the bolt 188, which is connected with a flange plate 222 preferably in the form of one single piece. The bolt 188 projects in this connection beyond the inner surface 187 of the flange plate 222 by a bolt length 189 and has the bolt diameter 190. The bolt 188, in particular an outer surface 223, is arranged rotation-symmetrically around the center axis 9 and has, for example 2 deepening grooves 224 extending concentrically around the center axis 9, said grooves 224 having a groove width 225 measured parallel with the center axis 9, and a groove depth 226 projecting from the outer surface 223 in the direction of the center axis 9. The deepening groove 224 disposed adjacent to the flange plate 222 is spaced from the inner surface 187 by a spacing 227. The deepening groove 224 arranged in the opposite direction from said deepening groove 224 toward the flange plate 222 is spaced from the inner surface 187 by a distance 228. A spacing 229 between the two deepening grooves 224 results from the difference between the distance 228 and the spacing 227.

The contact elements 230 are located in the deepening grooves 224. Each of said contact elements has a contact bridge 231 projecting beyond a groove bottom 232 in the direction of the center axis 9, said groove bottom being spaced from the outer surface 223 in the direction of the center axis 9 by the groove depth 226. Furthermore, the bolt 188 has an inner bore 233 extending from an outer surface 234 of the flange plate 222, said outer surface facing away from the inner surface 187 and extending parallel with said inner surface, up to a bore depth 235 that is greater than the sum of the distance 228, the groove width 225 and a flange thickness 236 spacing the outer surface 234 from the inner surface 187. The inner bore 233 has a bore diameter 237 that is smaller than the bolt diameter 190.

The contact bridges 231 are realized in such a way that they project up into the inner bore 233, and they are line-connected via the line elements 238, for example the flexible lines 239, with a coupling device 240, for example a multiple plug 241, arranged in the flange plate 222. This makes it possible to admit electrical current to the contact elements 230 via the coupling device 240. On the inner surface 187, the flange plate 222 has the additional contact elements 242 that may be connected to the multiple plug 241 of another coupling device 243, and serve for contacting, for example the means 30 shown in FIG. 20, in particular the heating device 35. The contact elements 230 arranged in the bolt 188 form in this connection the holding and/or locking device 59 to the extent that the stops 217 shown by the dashed lines generate an electromagnetic force as well when electrical current is admitted to a contact element 230 and electromagnetism is generated in that way, and thereby retain the moving element 11 shown in FIG. 20, for example on the face 219 of said moving element. It is prevented in this way that the moving element 11 is automatically moved by the pressure conditions prevailing in the distribution channel 12.

The jointly described FIGS. 24 and 25 show another design variation of a control element 1 as defined by the invention, in particular a pneumatic valve 2, which has the distribution channel 12 extending parallel with the top side 3 or the bottom side 5, with for example three secondary channels 18 extending from said distribution channel to the top side 3, and with a feed channel 15 extending to the bottom side 5. The bore axes 13 are again arranged at right angles in relation to the center axis 9. Concentric receiving openings 244 extend with their axes aligned with the bore axes 13 from the distribution channel 12 up to the bottom side 5. The heating devices 35 are inserted in said receiving openings. The heating device 35 projects in this connection through the receiving opening 244 and the distribution channel 12 and into the secondary channel 18, whereby a device axis 245 of the heating device 35 extends at a right angle in relation to the center axis 9. Within the zone of the secondary channel 18, the heating device 35 has a cylinder-shaped projection 246 that forms the heating element 36. Said heating element is limited in the direction of the top side 5 by a collar 247. The transmission element 31 forming the moving element 11 is concentrically arranged around the projection 246, said transmission element 31 being formed by the cover 32 having the chamber 92. A rapidly evaporating liquid is again contained in the chamber 92, by which the cover 32 is expanded when the temperature is increased by means of the heating element 36 and the liquid in the chamber 92 is evaporated, and thereby seals the secondary channel 18. The heating devices 35 are controlled individually, for example via the common plug 76 and the line 50 which, for example, is realized in the form of a bus-line. The distribution channel 12 is again sealed by the closing element 40.

Figure 26:
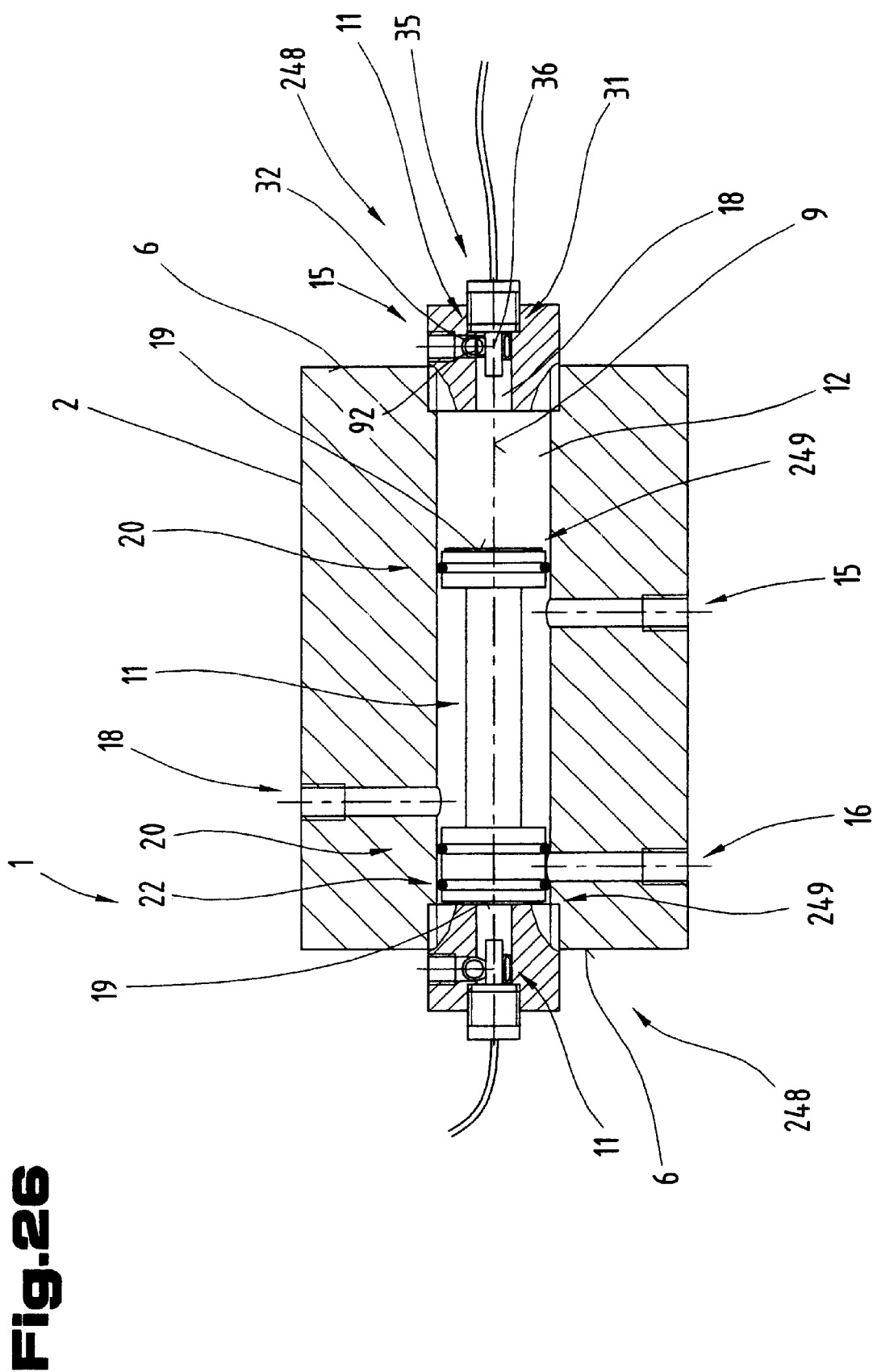
FIG. 26 shows another design variation of the control element as defined by the invention, by a sectional face view.

FIG. 26 shows another embodiment of the control element 1 as defined by the invention, in particular a pneumatic valve 2 with a secondary channel 18, a feed channel 15, and an exhaust channel 16. The moving element 11, which again has the sealing elements 22 on the collars 20, is pneumatically actuated in this connection via the further control elements 1, in particular via the pre-control valves 248. The damping elements 249 are located arranged on the faces 19 of the collars 20.

The pre-control valve 248 is inserted, in particular screwed into the distribution channel 12 from the side surface 6, and has a feed channel extending, for example at a right angle in relation to the center axis 9, and a secondary channel 18 extending with its axis aligned with the center axis 9. A heating device 35 is inserted in said secondary channel, said heating device having a bolt-shaped heating element 36 around which the moving element 111 in the form of a transmission element 31 is concentrically arranged. Said moving element 11 consists of a cover 32 with a chamber 92, in which again a rapidly evaporating liquid is contained which, in the expanded state, seals the feed channel 15 and/or the secondary channel 18.

Figure 27:
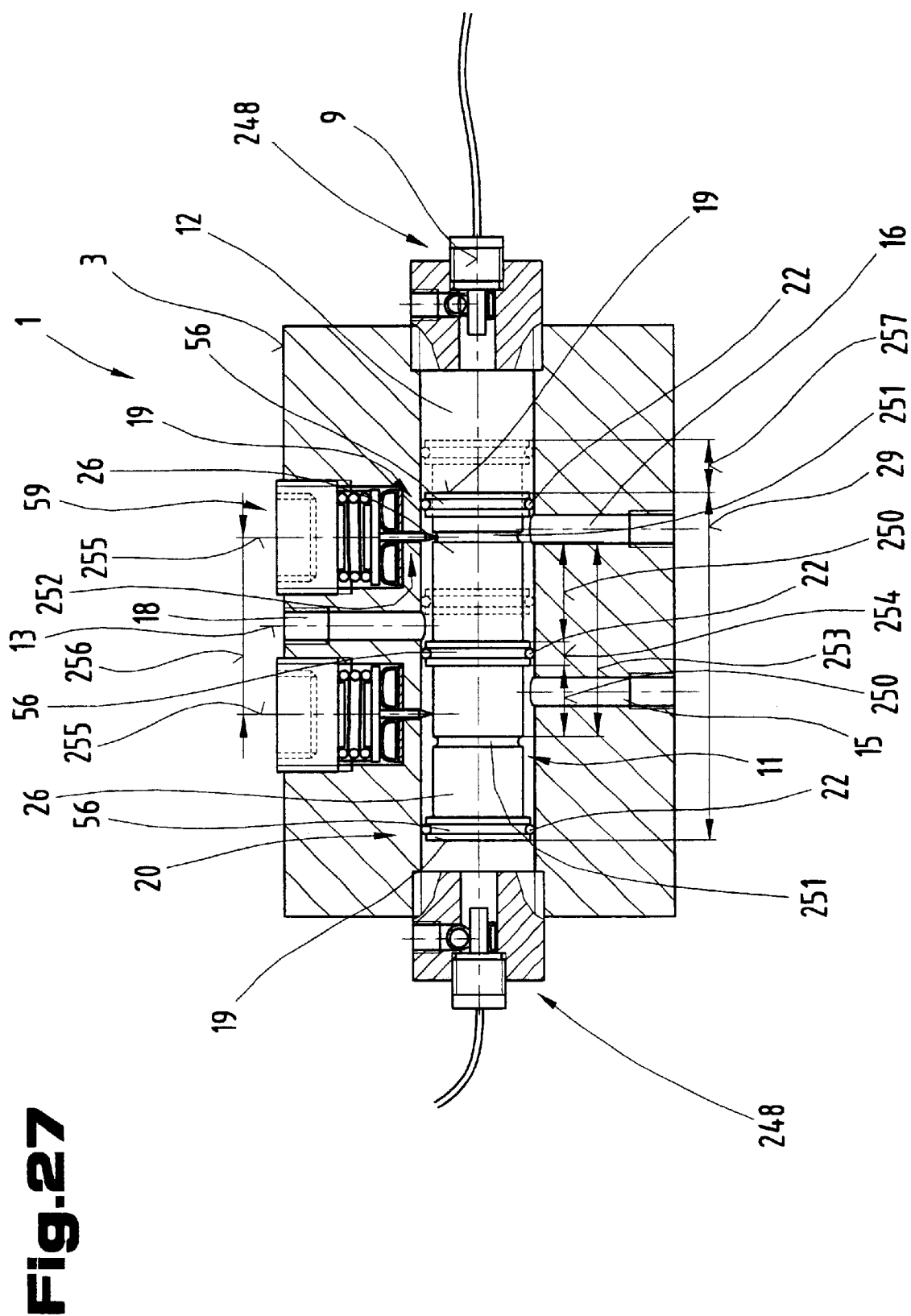
FIG. 27 shows another design variation of the control element as defined by the invention, by a sectional face view.

FIG. 27 shows another design variation of the control element 1 as defined by the invention. The moving element 11 arranged in the distribution channel 12 again has a plurality of collars 20 forming or defining the receiving grooves 56 for the sealing elements 22. One sealing element 22 is in each case arranged adjacent to a pre-control valve 248 as it was described by way of example in connection with FIG. 26. The moving element 11, in particular two faces 19 facing away from each other, are spaced from one another by the spacing 29, whereby another receiving groove 56 for a sealing element 22 is arranged at about half of the spacing 29, said additional sealing element 22 establishing either a flow connection between the secondary channel 18 and the feed channel 15, or between the secondary channel 18 and the exhaust channel 16.

Spaced from the collars 20 defining said receiving groove 56 by, for example an identical spacing 250, the moving element 11, in particular the intermediate elements 26 have the locking grooves 251 that concentrically extends around the center axis 9. For example in each switching position of the moving element 11 in which a flow connection is established between the secondary channel 18 and the exhaust channel 16, a locking element 252 of a holding and/or locking device 59 is in engagement with the locking groove 251 located adjacent to the exhaust channel 16, thereby preventing the moving element 1 from carrying out an automatic relative movement due to the different pressure conditions in the distribution channel 12. The locking grooves 251 are spaced from one another by a distance 253 measured parallel with the center axis 9, said distance being formed by the sum of twice the distance 250 and a width 254, by which the collars 20 of a receiving groove 56 are spaced from each other.

The holding and/or locking devices 59 have the center axes 255 extending at right angles in relation to the center axis 9 and at right angles to the top side 3, said center axes 255 being spaced from each other by a width 256 that is halved, for example by the bore axis 13 of the secondary channel 18. The width 256 is dimensioned in this connection in such a way that it approximately corresponds with the distance 253 of the two locking grooves 251 less a height of lift 257 of the moving element 11.

Figure 28:
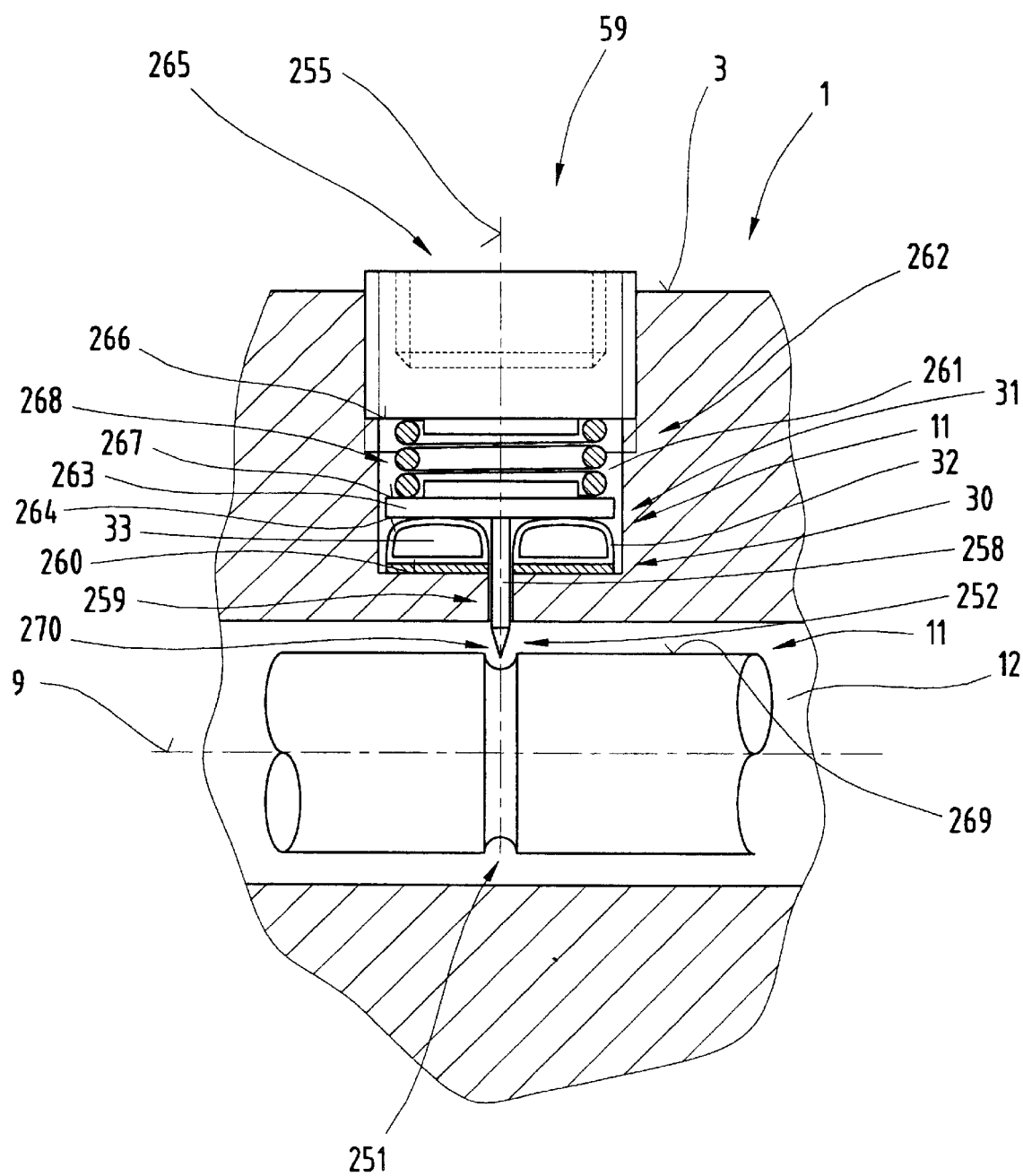
FIG. 28 shows a sectional face view of a holding and/or locking device of the control element.

A holding and/or locking device 59 is shown in greater detail in FIG. 28. As described above, the moving element 11 has one or several locking grooves 251 that can be engaged by the locking element 252 of the holding and/or locking device 59. The locking element 252 has a cylindrical locking pin 258 that projects through a bore 259 arranged in the control element 1, and reaches up into the distribution channel 12. Said bore 259 extends from a plane surface 260 of a recess 261 that extends concentrically around the center axis 255, said recess reaching from the top side 3 up to the plane surface 260 and has an inside thread 262 within the zone of the top side 3. The locking pin 258 is preferably joined as one single piece with a plate 263 extending concentrically around the center axis 255, said plate being arranged in the recess 261. A transmission element 31 and a means 30 are located in the zone between a face 264 facing the plane surface 260 and extending parallel with the latter, and the plane surface 260. The transmission element 31 has a cover 32 enclosing the locking pin 258, said cover enclosing an inner space 33 containing a high-boiling liquid. The means 30 is located in this connection between the cover 32 and the plane surface 260. A closing element 265 is screwed into the inside thread 262 and has a face 266 extending concentrically around the center axis 255, said face 266 facing a face 267 of the plate 264 that extends parallel with the face 264 of the plate 263 and is facing away from said face 264.

A spring element 268 is located in a zone that is defined by the face 266 of the closing element 265 and the face 267 of the plate 263. In the direction of the moving element 11 arranged in the distribution channel 12, said spring element exerts a spring force on the plate 263 and thus on the locking element 252, so that the latter is pressed either into the locking groove 251 or against a surface 269 of the moving element 11 arranged in the distribution channel 12. Now, if the locking element 252 abuts the surface 269 and when the moving element 11 arranged in the distribution channel 12 is displaced along the center axis 9, the locking pin 258 engages the locking groove 251 and the moving element 11 is preventing from an automatic relative movement.

Now, when the mobility of the moving element 11 is to be restored, the high-boiling liquid contained in the interior space 33 of the cover 32 is heated via the means 30, which causes the volume of the liquid to increase and the cover 32 to expand, so that a force of pressure is then exerted on the face 264 of the plate 263 and the latter is moved in the direction of the closing element 265 against the force of the spring element 268. The relative movement of the moving element 11 results in a lateral offset between the locking pin 258 and the locking groove 251. Since the volume of the cover 32 is increased only for a very short time, the locking pin 258 is pressed against the surface 269 when the volume of the high-boiling liquid contained in the inner space 33 is reduced, i.e. when said liquid cools, and in this process causes the surface 269, i.e. the moving element 11 from sliding off the locking pin 258, in particular off a point 270.

Figure 29:
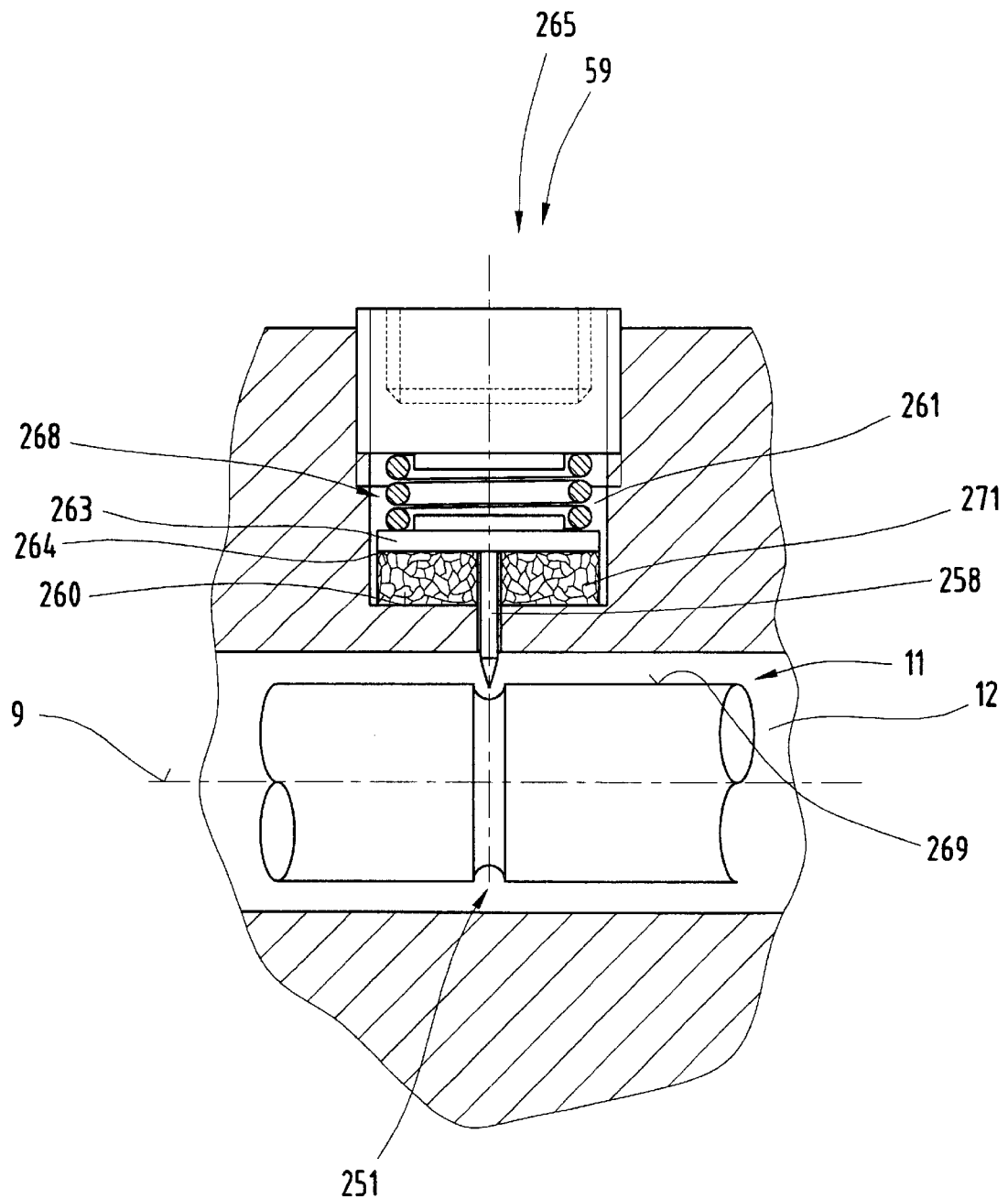
FIG. 29 shows another embodiment of the holding and/or locking device by a sectional face view.

FIG. 29 shows another design variation of the holding and/or locking device 59. Instead of the transmission element 31 with the cover 32 shown in FIG. 28, said holding and/or locking device has a piezo-element 271 that is arranged between the plane surface 260, the recess 261 and the face 264 of the plate 263 and is connected with an energy source.

Now, when the locking pin 258 is to be removed from the locking groove 251, an electric voltage is applied to the piezo-element 271, which causes the volume of said piezo-element to change and the plate 263 to be moved against the spring force of the spring element 268 in the direction of the closing element 265. When the piezo-element 271 is dead, it assumes again its original volume and the locking element 258 is moved via the spring element 268 either against the surface 269 of the moving element 11 arranged in the distribution channel 12, or into the locking groove 251. When the locking pin 258 rests against the surface 269 and when the moving element 11 is moved in the distribution channel 12 along the center axis 9, the locking pin 258 is caused by the spring element 268 to engage the locking groove 251 and the moving element 11 is retained in the desired position.

Figure 30:
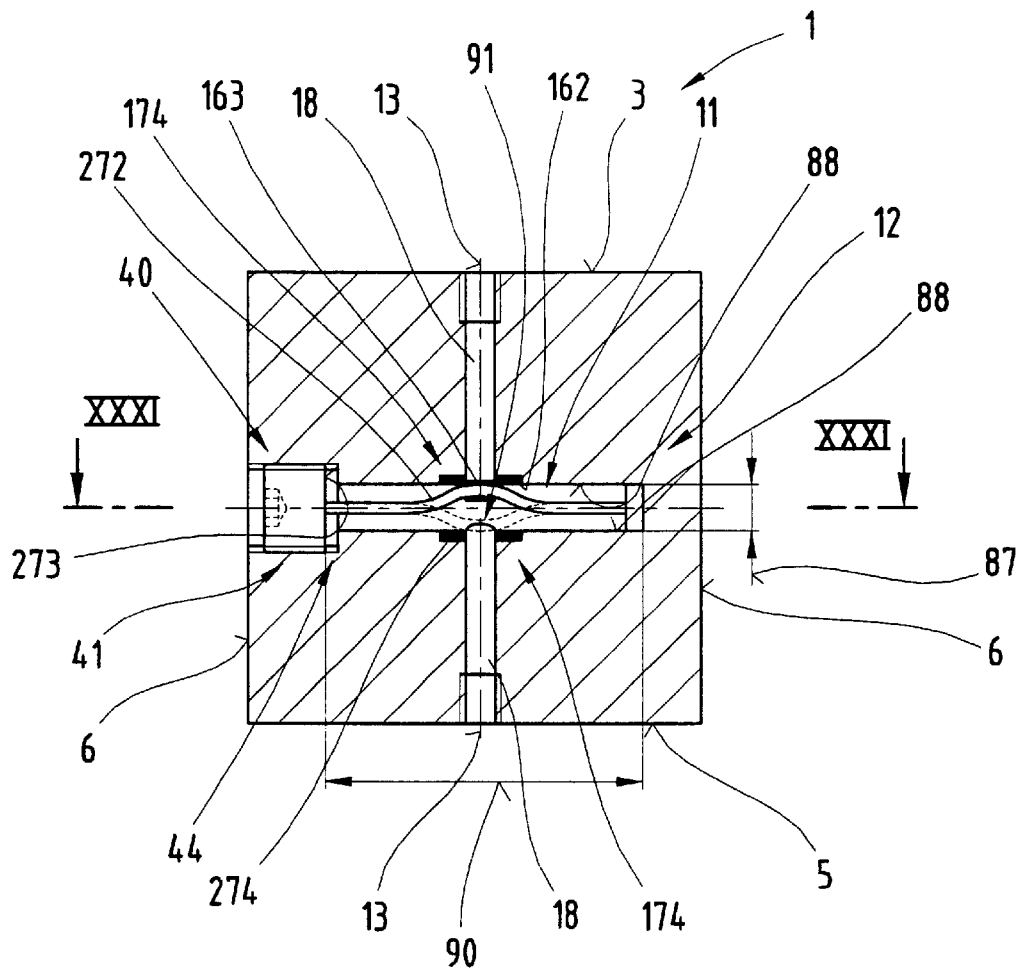
FIG. 30 shows another design variation of the control element as defined by the invention, by a sectional face view.
Figure 31:
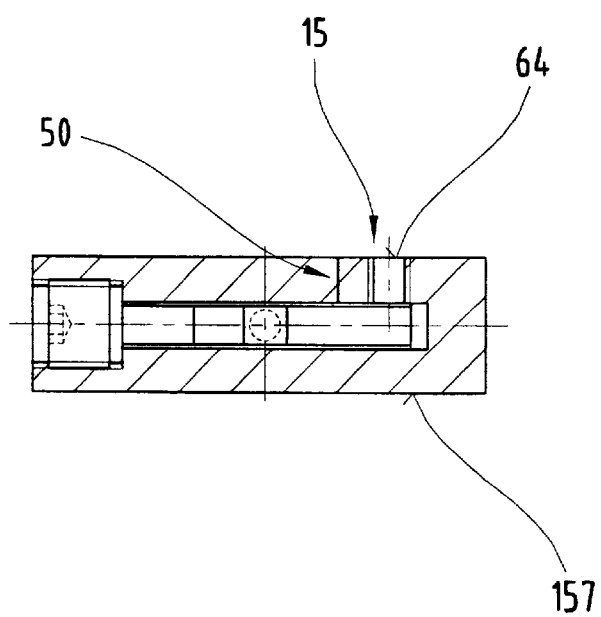
FIG. 31 shows the control element with a section according to lines XXXI—XXXI in FIG. 30.

FIGS. 30 and 31 show another embodiment of the control element 1 as defined by the invention, which is defined by the top side 3, the bottom side 5, the side surfaces 6, the back side 64 and the front side 157. A secondary channel 18 with a bore axis 13 extends from the top side 3 in the direction of the bottom side 5. Said bore axis 13 may be aligned with, for example another bore axis 13 of another secondary channel 18 that extents from the bottom side 5 in the direction of the top side 3. Both secondary channels 18 feed into a distribution channel 12 that has a surface 88 that extends at a right angle in relation to the bore axes 13 and parallel with the top side 3 or the bottom side 5. Another surface 88 is located spaced from said first surface 88 in the direction of the top side 3 by the channel height 87. A feed channel 15 extends from the back side 64 up to the distribution channel 12. A moving element 11 is present in the distribution channel 12. Said moving element is realized in the form of an elastically deformable diaphragm 272 having, for example the sealing layers 163 on the top sides 162 facing the surfaces 28. The openings 91 of the secondary channels 18, which are located in the zone of the surfaces 88, are associated with the top side 162 and the sealing layers 163. The diaphragm 272 is connected with a closing element 40 preferably in a torsionally rigid manner, and said closing element has a threaded section 41 that is arranged in a female thread 44. Furthermore, the closing element 40 has a face 273 extending parallel with the side surface 6. The diaphragm 272 has a stretched length measured from the face 273 parallel with the surface 88 that is greater than the length 90 of the distribution channel 12 measured from the face 273 parallel with said length.

The coils 174, which are realized, for example in the form of the flat coils 274, are located in the distribution channel, in particular in the zone of the surfaces 88. Said flat coils have the lines 50 that extend, for example from the distribution channel 12 to the back side 64 of the control element 1. Furthermore, the flat coils 274 have the openings 274' that preferably extend concentrically with the bore axes 13 and with the openings 91, so that a flow path is made available by the flat coils 274.

Now, when one of the two flat coils 274 is supplied with current via the line 50, the diaphragm 272 is deformed in the direction of the flat coil 274 to which current is admitted, whereby the sealing layer 163 effects a sealing of the respective secondary channel 18, which causes the medium—which has not to be limited only to air—to be passed on from the feed channel 15 to the other secondary channel 18. Due to the fact that the stretched length of the diaphragm 272 is greater than the length 91, the elasticity of the diaphragm 272 generates a component of force in the direction in the direction of the opening 91, against which the sealing layer 163 is pressed and thus seals said opening. Now, when the other opening 91 is to be sealed, high-intensity current or high voltage is admitted briefly to the other flat coil 274. This generates a magnetic force or an electrostatic force that is directed against the original component of force, and the diaphragm 272 is moved in the direction of the other opening 91. Since the stretched length is greater than the length 90, the diaphragm 272, upon exceeding a dead point, snaps to the other opening 91 and seals the latter with the sealing layer 163. As mentioned before, it is of course possible to use also other media instead of air.

Figure 32:
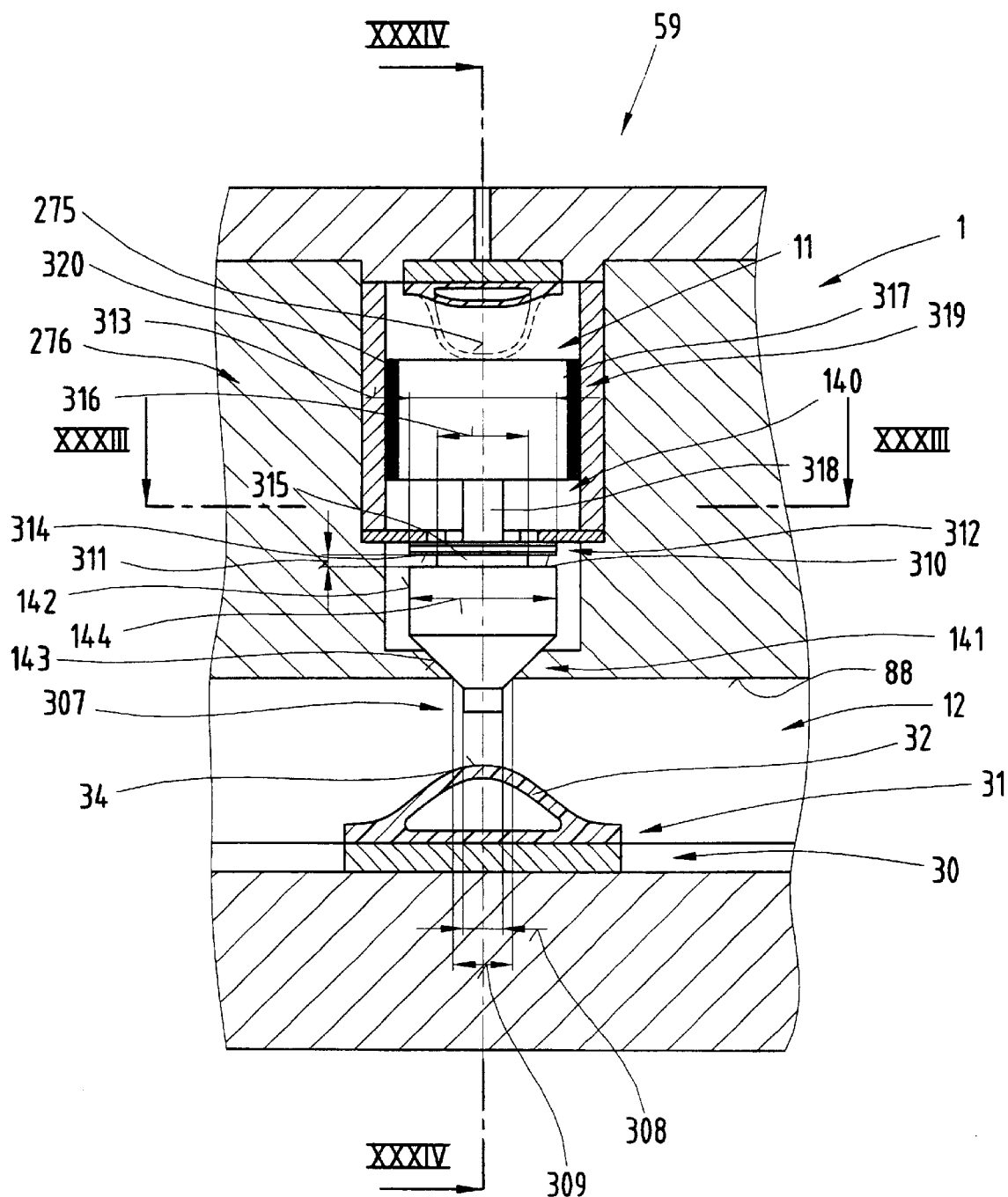
FIG. 32 shows a sectional face view of another design variation of the holding and/or locking device.
Figure 34:
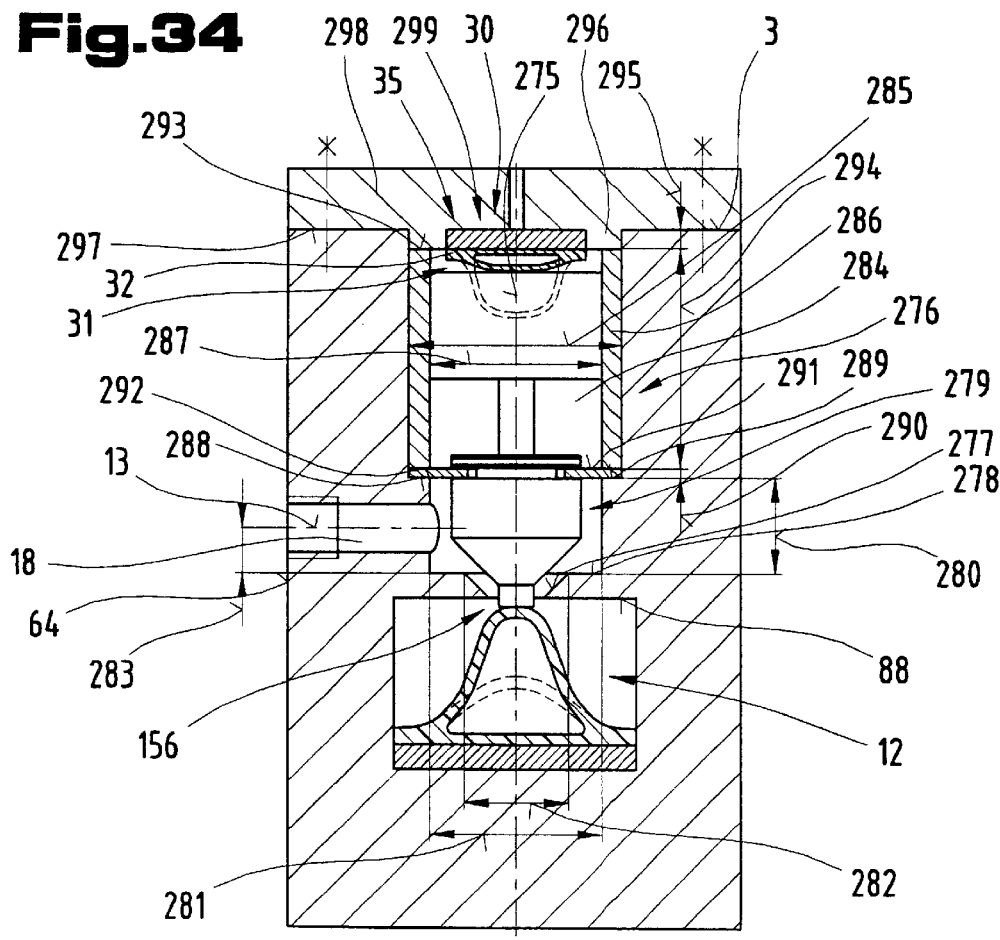
FIG. 34 shows the holding and/or locking device with a section according to lines XXXIV—XXXIV in FIG. 32.

Another design variation of the holding and/or locking device 59 is shown in the jointly described FIGS. 32 to 34. The moving element 11 is realized here in the form of a lifting piston 140 that is arranged in a lifting piston receptacle 276 that is arranged in the control element 11 and extends preferably cylindrically around a lifting piston axle 275. The lifting piston axle 275 extends in this connection, for example at a right angle in relation to the surface 88 of the distribution channel 12. Within the zone of the surface 88, the lifting piston receptacle 276 has a seal seat 156 that has a sealing surface 277 extending in the form of a truncated cone. Said sealing surface extends rotation-symmetrically around the lifting piston axle 275 and is arranged conically tapering in the direction of the surface 88 from a plane surface 278 of a lifting piston bore 279 extending cylindrically around the lifting piston axle 275, said plane surface 278 extending parallel with the surface 88.

The lifting piston bore 279 extends from the plane surface 278 in the opposite direction to the surface 88 up to a height 280 with a diameter 281 that is larger than a sealing diameter 282 of the sealing seat 156 disposed in the plane surface 278. The secondary channel 18 extends at a right angle in relation to the lifting piston axle 275 from the lifting piston bore 279 to the back side 64. The bore axis 13 of said secondary channel is spaced from the plane surface 278 by a spacing 283, said spacing, for example, being smaller than the height 280. A guide bore 284 extends cylindrically around the lifting piston axle 275 from the height 280 to the top side 3 of the control element 1. Said lifting piston axle 275 has a bore diameter 285 that is larger than the diameter 281 of the lifting piston bore 279. A guide sleeve 286 is arranged in the guide bore 284, said guide sleeve having an inside diameter 287—measured parallel with the bore diameter 285—that is smaller than the bore diameter 285 and, for example smaller than the diameter 281.

A locking element 252 is arranged in the zone located between the guide sleeve 286 and the lifting piston bore 279. A bottom side 288 of the locking element 252 facing the plane surface 278 is flatly abutting an annular surface 289 extending parallel with the plane surface 275, said annular surface being formed by the guide bore 284. The bore diameter 285 of the latter, as mentioned before, is greater than the diameter 281 of the lifting piston bore 279. An ring surface 292 defining the guide sleeve 286 in the direction of the distribution channel 12 is abutting a top side 291 of the locking element 252, said top side facing away from the bottom side 288 and being spaced from said bottom side by a thickness 290 in the opposite direction to the surface 88. Said ring surface 292 is spaced from a ring surface 293 of the guide sleeve 286 by a sleeve height 294 in the Opposite direction to the distribution channel 12, said ring surface 293 facing away and extending parallel with said ring surface 293. The ring surface 293 is spaced from the top side 3 by a depth 295 in the direction of the distribution channel 12.

A projection 296 extending cylindrically around the lifting piston axle 275 engages a cylindrical zone formed by the depth 295 and the bore diameter 285. Said projection protrudes beyond an inner side 297 of a cover plate 298 in the direction of the distribution channel 12, said inner side facing the top side 3. The projection 296 has an inward molding 299 in which the means 30, in particular the heating device 35 is arranged, the latter being connected with torsional strength with a transmission element 31 formed by the cover 32. The cover 32 projects in this connection beyond the heating device 35 or the ring surface 293 of the guide sleeve 286 in the direction of the distribution channel 12. The locking element 252 has an outside diameter 300 that corresponds with the bore diameter 285 of the guide bore 284. Said locking element furthermore has an inside diameter 301 that is smaller than the outside diameter 300. The inside diameter 301 defines an inner face 302 extending concentrically around the lifting piston axle 275. The slots 303 arranged in the form of a star around the lifting piston axle 275 extend from the inner face 302. Said slots are spaced from one another by an angular offset 304. The slots 303 have a slot depth 305 measured from the inner face 302 in the direction of the guide sleeve 286. Said slot depth is selected in such a way that the sum of twice slot depth 305 and the inside diameter 301 is not greater than the outside diameter 300 of the locking element 252. The slots 303 form the spring projection 306 that are thus arranged around the lifting piston axle 275 in the form of a star as well.

In a zone associated with the distribution channel 12, the lifting piston 140 has a part in the form of a truncated cone, with a cone jacket 143 extending rotation-cylindrically around the lifting piston axle 275, and with a cylinder jacket 142 that is arranged in the opposite direction from said cone jacket in the direction of the distribution channel 12. A cylindrical projection 307 extends from the cone jacket 143 in the direction of the distribution channel 12. Said projection 307 has a projection diameter 308 that is smaller than the sealing diameter 309 that defines the sealing surface 277 in the zone of the surface 88. The cylinder jacket 142 has a jacket diameter 144 that is larger than the sealing diameter 282, but smaller than the diameter 281 of the lifting piston bore 279. The cylinder jacket 142 is defined in the opposite direction to the distribution channel 12 by a plane surface 310. Spaced from said plane surface 310 by a width 311 measured parallel with the lifting piston axle 275 in the opposite direction to the distribution channel 12, the lifting piston 140 has a locking collar 312 extending concentrically around the lifting piston axle 272. Said locking collar is defined by a collar diameter 313 that corresponds, for example with the jacket diameter 144. Within the zone of the width 311, a connecting element 315 extends between the plane surface 310 and a collar surface 314 facing said plane surface. Said connecting element has a diameter 316 that is smaller than the collar diameter 313 and the inside diameter 301 of the locking element 252.

Furthermore, the lifting piston 140 has a guide piston 317 extending cylindrically around the lifting piston axle 272. Said guide piston is connected with the locking collar 312 via an intermediate element 318, and said guide piston has on an outer side 319 a sliding element 320 that slides off along the inner side of the guide sleeve 286. A transmission element 31 formed by the cover 32 is again located in the distribution channel 12. Thermal energy can be admitted to said transmission element via a means 30. Now, when a flow connection has to be established between the distribution channel 12 and the secondary channel 18, the transmission element 31 arranged in the distribution channel 12 and formed by the cover 32 is thermally acted upon and expands, which causes the outer surface 34 of the cover 32 to come into contact with the projection 307, and the lifting piston 140 to be moved in the opposite direction to the distribution channel 12. In this process, the cone jacket 143 moves away from the sealing surface 277, which opens a flow channel in the zone of the surface 88, said flow channel being formed by the difference between the sealing diameter 309 and the projection diameter 308. The locking collar 312 is simultaneously pressed against the bottom side 288 of the locking element 252, which causes the spring projections 306 to be elastically pressed in the opposite direction to the distribution channel 12 until the inside diameter 301 has reached the size of the collar diameter 313 and the locking collar 312 is sliding off on about the inner face 302 of the locking element 252 in the opposite direction to the distribution channel 12 until the collar surface 314 is spaced from the ring surface 292 in the opposite direction to the distribution channel 22.

Once the lifting piston 140 has reached said position, the spring projections 305 spring back into their original positions and the top side 291 of the locking element 252 is approximately located in one plane with the collar surface 314. This prevents an automatic relative movement of the lifting piston 140 in the direction of the distribution channel 12. Now, when the flow channel between the distribution channel 12 and the secondary channel 18 has to be closed, the heating device 35 located in the projection 296 is heated, so that the transmission element 31 formed by the cover 32 and connected with the heating device 35 is expanded and presses the guide piston 317 in the direction of the distribution channel 12, which causes the locking collar 312 to be forced in the direction of the distribution channel 12, with the effect that the spring projections 306 are moved in the direction of the distribution channel 12 and the cone jacket 143 will finally sealingly rest against the sealing surface 277.

Figure 35:
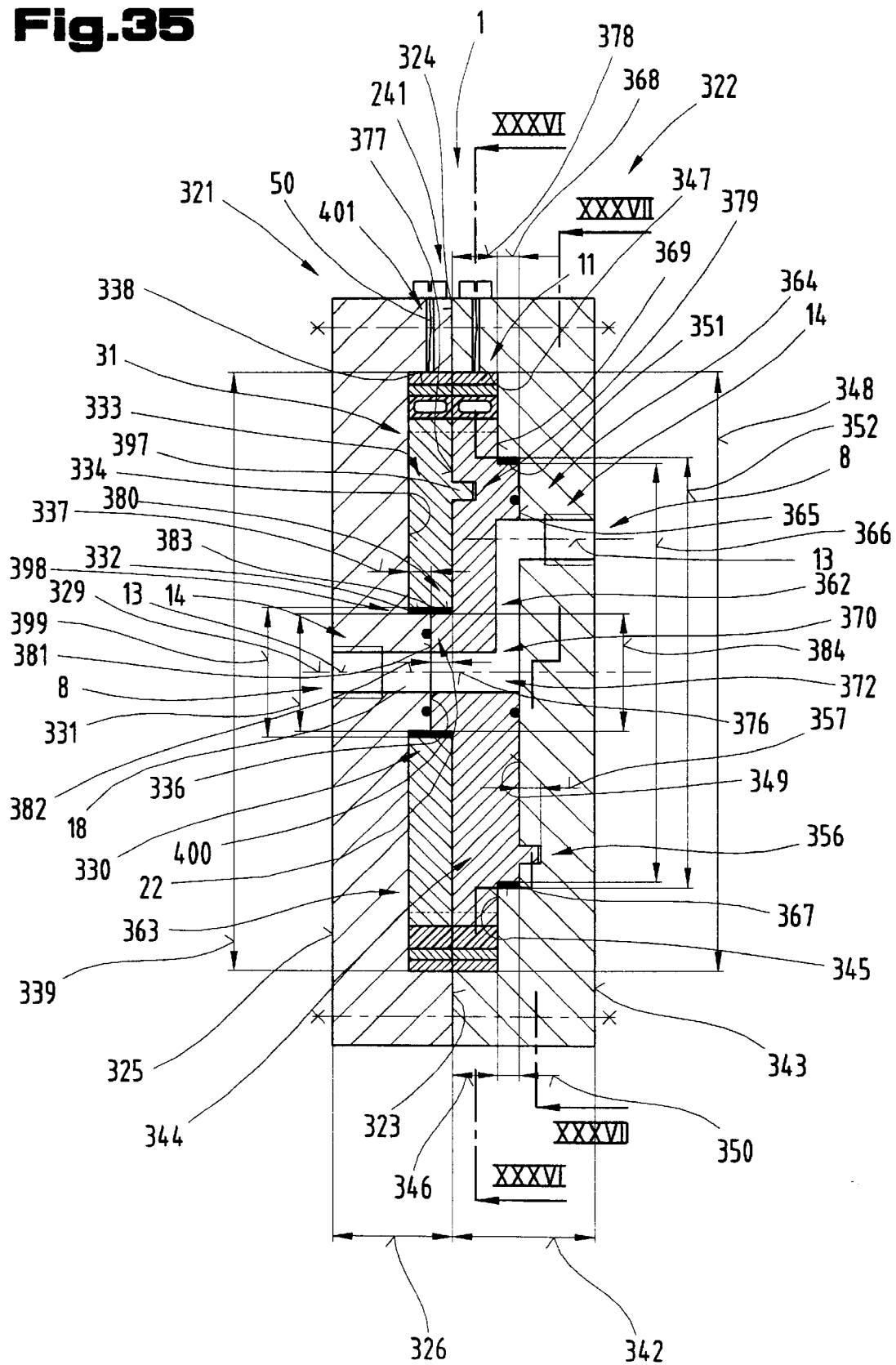
FIG. 35 shows a sectional side view of another design variation of the control element as defined by the invention.
Figure 36:
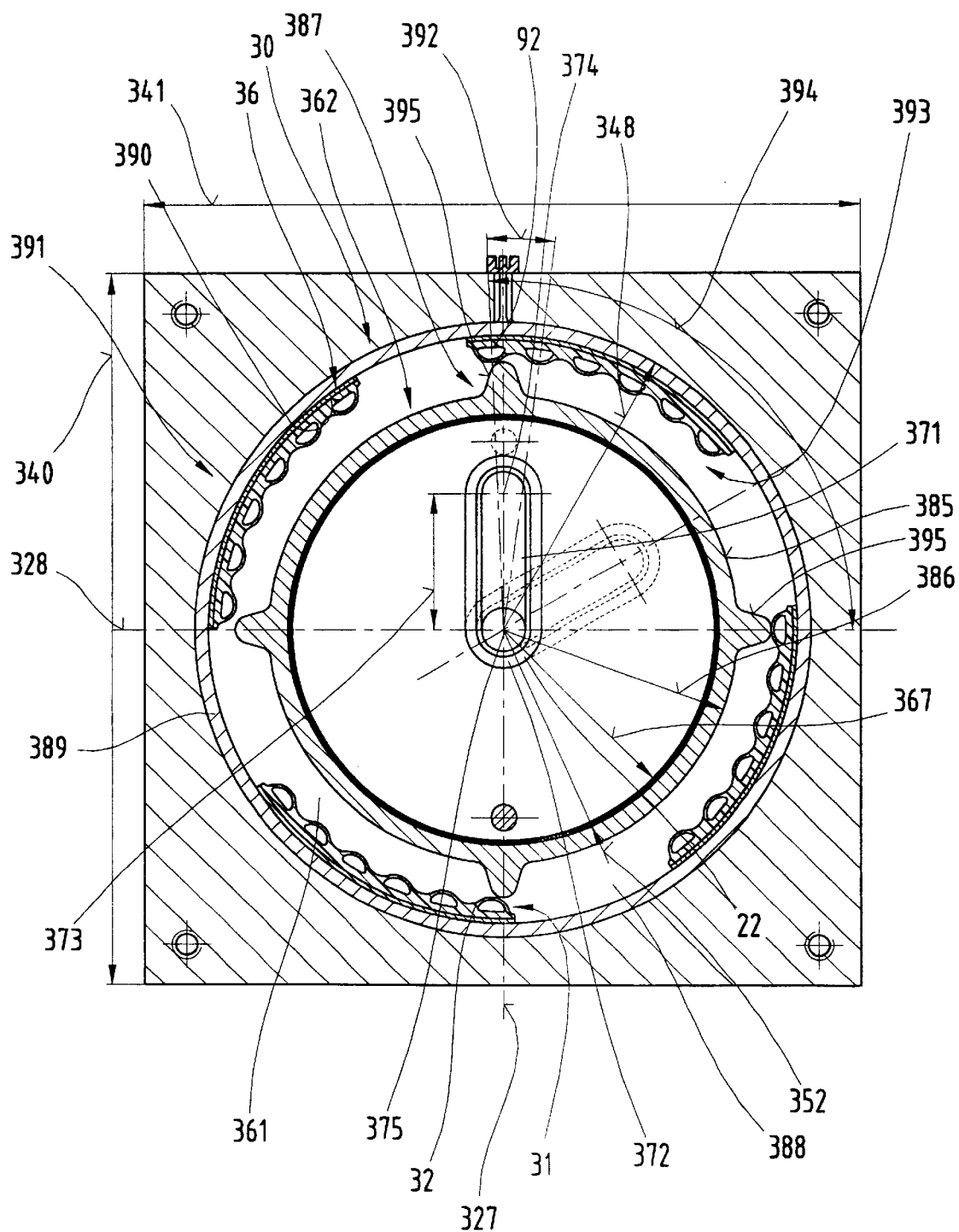
FIG. 36 shows the control element with a section along lines XXXVI—XXXVI in FIG. 35.
Figure 37:
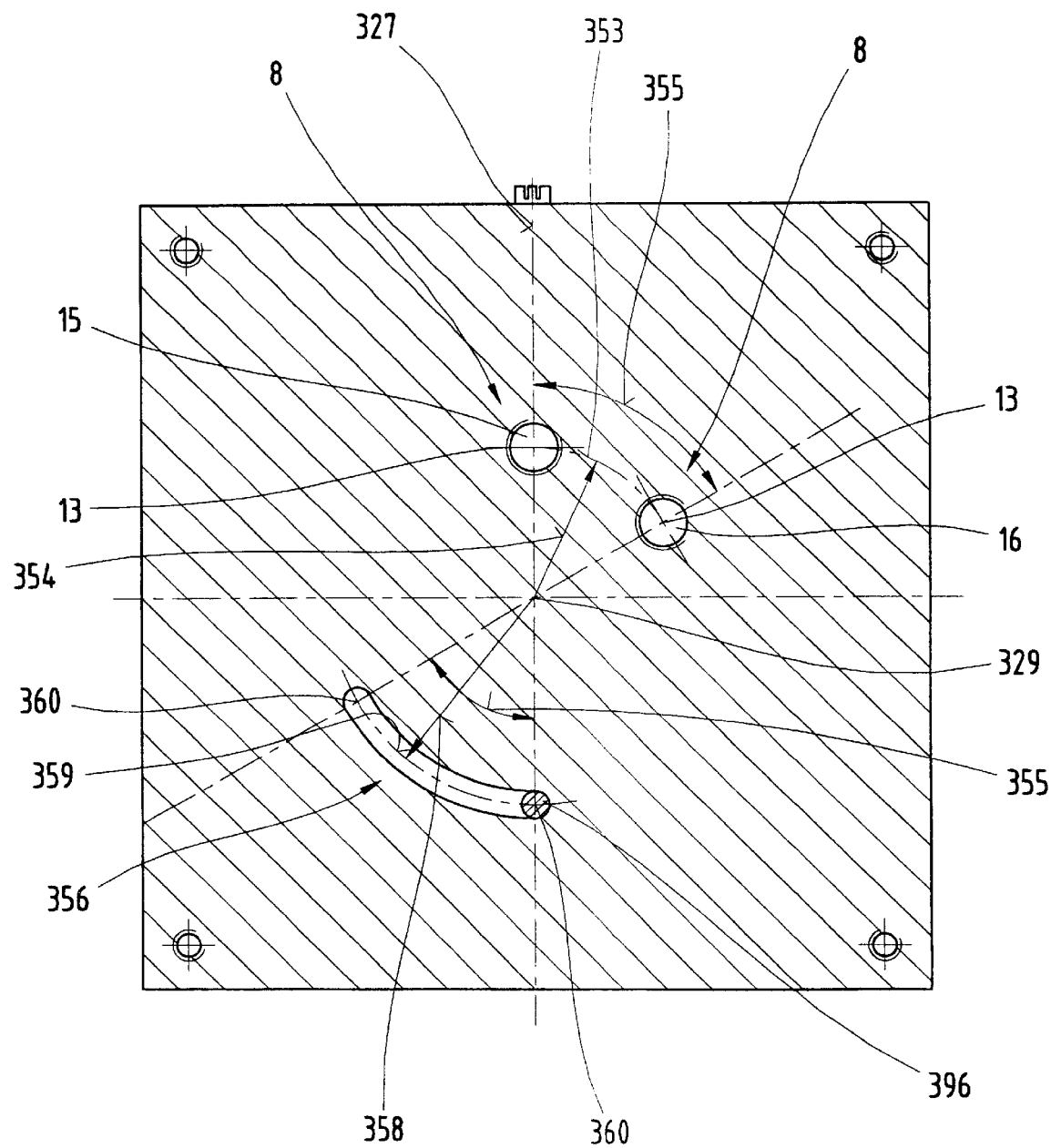
FIG. 37 shows the control element with a section according to lines XXXVII—XXXVII in FIG. 35.

The jointly described FIGS. 35 to 37 show another embodiment of the control element 1 as defined by the invention. The control element 1 has a housing part 321 that is detachably or undetachably connected with another housing part 322 in the inner surfaces 323, 324 facing each other. In the opposite direction to the housing part 322, the housing part 321 is defined by an outer surface 325 extending parallel with the inner surface 323, said outer surface being spaced from the inner surface 323 in the opposite direction of the housing part 322 by a housing part depth 326. The housing parts 321, 322 have the center planes 327 328 that are arranged at right angles in relation to the inner surface 323 and at right angles in relation to each other. The zone of intersection of the two center planes 327, 328 forms a center axis 329. The housing part 321 has an attachment 330 extending concentrically around the center axis 329 in a zone facing away from the outer surface 325. Said attachment is defined by an attachment diameter 331 that defines on the outside an attachment surface 332 extending concentrically around the center axis 329. An inward molding 333 extends circularly around the center axis 329 extends from the attachment surface 332 in the opposite direction relative to the center axis 329. Located in a plane that is disposed at a right angle in relation to the center axis 329, said inward molding has a face 334 that is spaced from a plane surface 336 of the attachment 330 by a molding depth 337 in the direction of the outer surface 325, said plane surface defining the attachment surface 332 in the opposite direction relative to the outer surface 325 and extending parallel with said outer surface. Said inward molding 333 is defined by an inner surface 338 in the opposite direction relative to the center axis 329, said inner surface extending concentrically around the center axis 329 and facing the attachment surface 332, and extending over a molding diameter 339 concentrically around the center axis 329. The housing parts 321, 322 have a housing part height 340 and a housing part width 341. The molding diameter 339 is in this connection smaller than the housing part height 340 or the housing part width 341, which, for example, have the same dimension. A channel 8 extends along the center axis 329, whereby the center axis 329 forms the bore axis 13 of the channel 88, the latter being realized as a secondary channel 8. The latter has the connection thread 14 in the zone of the outer surface 325. A sealing element 336 is arranged in the zone of the plane surface 336, said element preferably extending concentrically around the center axis 329.

The housing part 322 has an outer surface 343 that extends from the inner surface 324 spaced by a housing part depth 342 in the opposite direction relative to the housing part 321 and parallel with the outer surface 325. Furthermore, said housing part has an inward molding 344 extending rotation-symmetrically around the center axis 329, said molding having a first face 345 extending at a right angle in relation to the center axis 329, and being spaced from the inner surface 324 by a face depth 346 in the opposite direction relative to the housing part 321. Said first face is bound by a inner surface 347 in the opposite direction in relation to the center axis 329, said inner surface extending-rotation-symmetrically around the center axis 329, said inner surface 347 extending over a first molding diameter 348 concentrically around the center axis 329. The first molding diameter 348 corresponds in this connection with the molding diameter 339 of the molding 333 located in the housing part 321. The molding 344 has a second face 349 extending parallel with the first face 345, said second face being spaced from the first face 345 in the opposite direction relative to the inner surface 324 by a face depth 350 in the direction 350 in the direction of the outer surface 343. Said second face 349 is defined by an inner surface 351 that has a second molding diameter 352 concentrically extending around the center axis 329, said second molding diameter being smaller than the first molding diameter 348, and being arranged concentrically in relation to the first molding diameter and concentrically with respect to the center axis. The channels 8 extend from the outer surface 343 up to the second face 349, and their bore axes 13 extend parallel with the center axis 329 and at right angles in relation to the outer surface 343. The bore axes 13 are disposed in a hole circle 353 extending concentrically around the center axis 329, with a hole circle radius 354 measured from the center axis 329. One channel 8 is realized in this connection as a feed channel 15 whose bore axis 13 is disposed, for example in the center plane 327. The other channel 8 is realized, for example as an exhaust channel 16 whose bore axis 13 is spaced from the bore axis 13 of the feed channel 15 by an angle 355 of, for example 60 degrees. In the zone of the outer surface 3.43, said channels 8 again have a connection thread 14.

Furthermore, the housing part 322 has a deepening groove 356 that projects from the second face 349 in the direction of the outer surface 341. The deepening groove 356 has a groove depth 357 measured at a right angle in relation to the second face 349, and it is arranged in the form of a circle around the center axis 329, whereby it has a circular center line 359 extending around the center axis 329 with a radius 358. In the end zones, the deepening groove 356 extends in the form of a semi-circle with the center points 360, which are disposed on the center line 359 and are spaced from each by the angle 355 as well.

An inner space is created by the inward molding 333 of the housing part 321 and the inward molding 344 of the housing part 322. Said interior space contains, for example two moving elements 11 rotatably arranged therein as the rotational bodies 362, 363, whereby for example the rotational body 362 is associated with the housing part 322 and the rotational body 363 with the housing part 321. The rotational body 362 has an attachment 364 that has a plane attachment surface 365 that is facing the second face 349, and which defined by an attachment diameter 366 that defines an attachment jacket surface 367 extending concentrically around the center axis 329. The attachment jacket surface 367 projects in the opposite direction of the second face 249 of the plane attachment surface 365 by an attachment length 368 in the direction of the housing part 321 and is defined by a plane surface 369 extending parallel with the plane attachment surface 365.

The rotational body 362, furthermore, has a distribution channel 370 that consists of a longitudinal groove 371 arranged in the zone of the plane attachment surface 365, and a bore 372. The longitudinal groove 371 is realized in the form similar to an oblong hole and has two center axes 374, 375 that are spaced from one another by a length 373, whereby the center axis 375 forms at the same time a bore axis 376 of the bore 372, which in turn coincides with the bore axis 13 of the secondary channel 18 arranged in the housing part 321. The length 373 of the longitudinal groove 371 corresponds in this connection with the hole circle radius 354 of the channels 8 arranged in the housing part 322. The longitudinal groove 371, furthermore, is bound on the outside by a sealing element 22.

Facing away from the plane surface 369 and extending parallel with the latter, the rotational body 362 has another plane surface 377 that is spaced from the plane surface 369 by a width 378 in the direction of the housing part 321. The plane surface 377 has a cylindrical deepening 379 that is arranged eccentrically in relation to the center axis 329. Furthermore, the plane surface 377 is overtopped in the direction of the housing part 321 by an attachment 380 extending cylindrically around the center axis 329. Said attachment has a plane attachment surface 381 disposed in a plane disposed at a right angle in relation to the center axis 329, said plane attachment surface 381 being spaced from the plane surface 377 by an attachment length 382 in the direction of the housing part 321. Furthermore, the plane attachment surface 381 is defined by an attachment jacket surface 383 extending concentrically around the center axis 329 and being defined by an attachment diameter 384. Said diameter corresponds in this connection with the attachment diameter 331 of the attachment 330 of the housing part 321. The plane surfaces 369 and 377 are defined by a face 385 extending concentrically around the center axis 329, said face 385 extending around the center axis 329 with a face diameter 386. Furthermore, in the opposite direction in relation to the center axis 329, the face 385 is overtopped by the tooth-shaped projections 387. The latter are spaced from one another by 90 degrees, so that the rotational body 362 has a total of four tooth-like projections 387.

The face 385 and the inner surface 347 of the inward molding 344 of the housing part 322 define an intermediate space 388 extending circularly around the center axis 329. The means 30 and the transmission element 31 formed by the covers 32 are arranged in said intermediate space. The means 30 are preferably undetachably connected with a ring-shaped basic body 389 that concentrically extends around the center axis 329, and have the heating surfaces 390 facing the rotational body 362, said heating surfaces being overtopped by the covers 32 in the direction of the center axis 329. Six heating elements 36, for example, are combined to form a heating device group 391, whereby four of such heating device groups 391 are present in the interior space 361. A chamber 92 of the cover 32 is associated in each case with one heating element 36. One chamber 92 is offset in this connection from an adjacent chamber 92 by an angle 392, which, for example, amounts to 10 degrees. For example one cover 32 having six chambers 92 is combined in each case to form a transmission element group 393, whereby the chambers 92 of said transmission element group 393 correspond with the heating elements 36 of the heating device group 391 associated with said transmission element group.

The transmission element groups 393 and thus also the heating device groups 391 are arranged in relation to each other in such a way that viewed clockwise, a first chamber 92 of a first transmission element group 393 is spaced from a first chamber 92 of the second transmission element group 393 by an angular offset 394 of 92.5 degrees. The layout is the same with the first chambers of the third and fourth transmission element groups 393. The first chamber 92 of the fourth transmission element group 393 is offset from the second chamber 92 of the first transmission element group 393 by the angular offset 394 as well. One projection 387 of the rotational body 362 is associated with each transmission element group 393.

Now, when the flow path from the feed channel 15 to the secondary channel 18 is to be changed in such a way that a flow path is made available between the exhaust channel 16 and the secondary channel 18, the longitudinal groove 371 of the distribution channel 370 has to be moved into a position in which it coincides with the exhaust channel 16.

For this purpose the rotational body 362 is put into rotation clockwise around the center axis 329. This is accomplished in that the first chamber 92 of the first transmission element group 393, i.e. the high-boiling liquid contained in said chamber is now thermally acted upon by means of the heating element 36 associated with that chamber. This causes the cover 32 defining said chamber 92 to expand and to exert a force of pressure on the flank 395 defining the projection 387. This then turns the rotational body 362 clockwise, for example by 2.5 degrees, with the effect that the projection 387 associated with the second transmission element group 393 is moved by 2.5 degrees as well, with the result that the first chamber 92 of the second transmission element group 393, i.e. a center axis of said chamber 92 has an angle of 2.5 degrees in relation to a center axis of the second projection 387.

Now, when the liquid contained in the first chamber 92 of the second transmission element group 393 expands, the projection 387 associated with said chamber is acted upon by a force of pressure that moves the rotational body 362 by 2.5 degrees, so that the third projection 387 has an angular offset of 2.5 degrees with respect to the first chamber of the third moving group. Upon expansion of the first chamber 92 of the third transmission element group 393, said angular offset is increased to 5 degrees, so that the fourth projection 387, in the non-expanded position, has an angular offset of 2.5 degrees as well in relation to the first chamber 92 of the fourth transmission element group 393, which is increased then to 5 degrees when said first chamber 92 of the fourth transmission element group 393 is expanded. This, then, in turn causes the first projection 387 to be moved by 2.5 degrees, so that said projection then has an angular offset of 2.5 degrees in relation to the second chamber 92 of the first transmission element group 393. This now makes it possible for the rotational body 362 to be rotated in each case by a fraction of the angular offset 394, whereby a pin 396, the latter overtopping the plane attachment surface 356 in the direction of the basic housing part 322, and being arranged in the deepening groove 356, is moved on in the deepening groove 356 that is forming a stop, so that when the distribution channel 370, in particular the longitudinal groove 371, is in a position coinciding with the exhaust channel 16, any further rotational motion of the rotational body 362 is prevented.

For the purpose of rotational motion of the rotational body 362, anti-clockwise, i.e. for restoring the flow connection between the secondary channel 18 and the feed channel 15, another rotational body 363 is arranged in the inner space 361. Said rotational body has a driver pin 397 that projects into the rotational body 362. Said second rotational body 363 also has the means 30 and the transmission elements 31 formed by the covers 32 as described above, which, however, function in the reverse direction. The rotational body 363 has a bore 398 arranged rotation-symmetrically in relation to the center axis 329. Said bore has a bore diameter 399 that is larger than the attachment diameter 331, whereby an intermediate space is arranged between the attachment diameter 331 and the bore diameter 399. Said intermediate space contain, for example a sliding bearing 400 that is supported both on the attachment 380 and on the attachment 330. Furthermore, the housing parts 321, 322 have the line ducts 401, via which the lines 50 lead from the multiple plug 241 to the basic body 389, in which, for example the conductor paths 134 (not shown) are arranged that lead to the individual heating elements 36 of the individual heating device groups 391. Of course, the values for the angle 392 or the angular offset 394 or for the number of the chambers 92 of the transmission element group 393 as well as for the number of the projections 387 can be selected differently.

FIG. 38 is a schematic representation of a controlling device 402 for a medium-actuated consumer 403, in particular for a pneumatic cylinder 404. The pneumatic cylinder 404 is designed, for example as a double-action medium-actuated cylinder and has the two medium connections 405, from which the connection lines 406, in particular the compressed air lines 407 lead to the secondary channels 18 of the control elements 1. The feed channels 15 of the control elements 1 are, for example, combined to form a common medium feed line 181. The latter is connected with a pressure source 408, for example a compressor. The exhaust channels 16 of the control elements 1 are, for example, combined to form a common medium exhaust line 182 as well, whereby the medium is exhausted into the environment, for example via a sound damper 409. The holding or locking devices 59 as well as the pre-control valves 248, in particular their heating devices 35 are connected via the lines 50 or the conductor paths 134 (shown by dashed lines) to a controlling unit 410, for example a microprocessor. The latter controls the control elements 1 as required for the purposes or functions of the consumer 403, whereby the control elements 1 or the controlling unit 410 can be directly integrated in the medium connection 405, so that the connection lines 406 as well as the lines 50 or the conductor paths 134 can be omitted.

However, the pneumatic cylinder 404 can be designed also in such a way that a cylinder jacket 411 has the internally extending medium channels 412 that extend, for example from a connection zone 414 on the face side, to an inner zone 414 defined by the cylinder jacket 411. The connection zone 413 contains, for example a control element group 415 that is formed by one or a plurality of the described control elements 1, and which has the central connections 416 for the feed air and the exhaust air. Said connections are in turn connected to the medium feed line 181 and the medium exhaust line 182.

Figure 40:
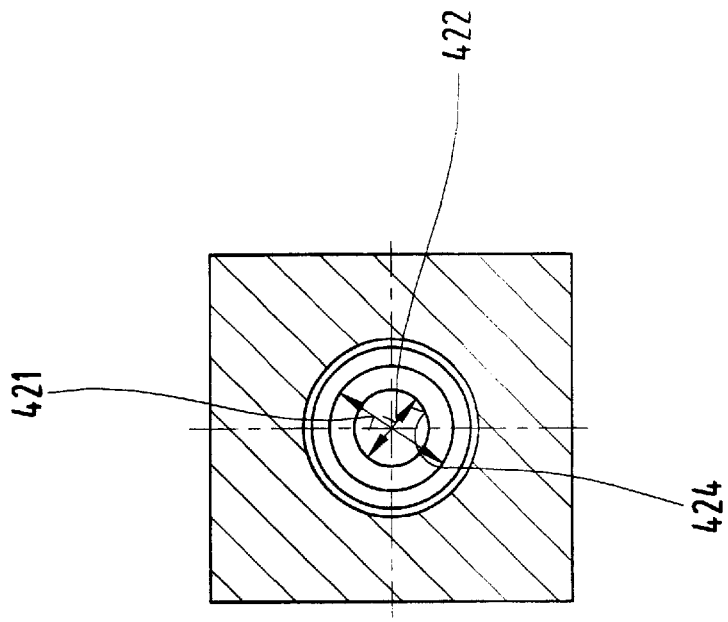
FIG. 40 shows the control element with a section according to lines XXXX—XXXX in FIG. 39.
Figure 39:
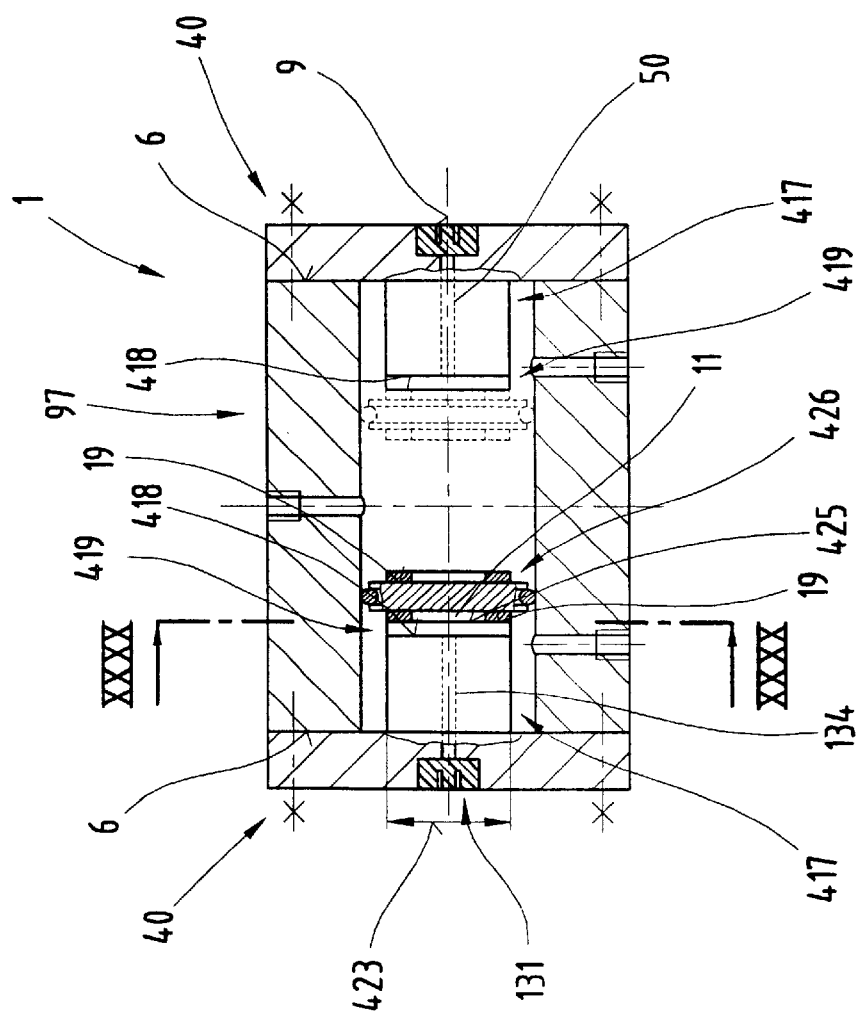
FIG. 39 is another embodiment of the control element as defined by the invention, by a sectional side view.

The jointly described FIGS. 39 and 40 show another embodiment of the control element 1 as defined by the invention. Said control element consists of a basic body 97 that has the closing elements 40 on the side surfaces 6. The closing elements 40, furthermore, have the cylindrical projections 417 extending preferably concentrically around the center axis 9. Said projections have the end surfaces 418, which are acing each other and which extend parallel with each other and parallel with the side surfaces 6. The end surfaces 418 are overtopped by an electromagnetic element 419 in directions facing one another, said element 419 being line-collected via the lines 50 or the conductor paths 134 with a coupling device 131 arranged in the closing element 40. The moving element 11 has the permanent-magnetic elements 420 on the faces 19 facing away from each other, said elements 420 having the outside diameters 421 and the inside diameters 422 extending concentrically around the center axis 9. The outside diameter 421 corresponds in this connection, for example with a projection diameter 423 that extends concentrically around the central axis 9, said projection diameter also defining the electromagnetic element 419. The inside diameter 422 defines an inner face 424 of the permanent-magnetic element 420, said face extending concentrically around the center axis 9 and being arranged at a right angle in relation to the face 19. The inner face 424 and the face 19 and a contact surface 425 defining the electromagnetic element 419 in the opposite direction relative to the projection 417 define an inner zone 426. Now, when the moving element 11 is to be displaced along the center axis 9, current is admitted to an electromagnetic element 419 via the lines 50 or conductor paths 134 and to the coupling device 131, and an electromagnetic force is exerted on the permanent-magnetic element 420 that is facing said electromagnetic element 419. This attracts the moving element 11 and a detachable connection is made on the contact surface 425. Now, when the moving element 11 is to be moved in the other direction, the other electromagnetic element 419 exerts an electromagnetic force on the other electromagnetic element 420 facing said electromagnetic element 419. What is achieved in this connection by means of the inner zone 426 is that after the feed of current has been cancelled, the permanent-magnetic element 420 will not longer adhere to the electromagnetic element 419 due to electromagnetic attraction, so that this connection can be easily cancelled and mobility of the moving element 11 is made possible in the other direction.

Of course, the individual variations and details described herein can be realized in the form of standardized components that can be assembled to produce a modular entity. It is made possible in this way, for example to produce valve blocks with field bus connections, as they are offered in the market by manufacturers of pneumatic equipment at the time of the present application. In particular, the switching modules and, if necessary, the control modules for producing the valve blocks can be formed by using pneumatic distributor strips and/or electric distributor rails, as this has been described in detail in DE 30 42 205 C3 by the same Applicant. The content of said patent is wholly incorporated herein by reference as a disclosure of the present application.

For the sake of good order it is finally pointed out that for the purpose of better understanding of the structure of the control element 1, the latter or its components are partly shown untrue to scale and/or enlarged and/or scaled down.

Most of all, the individual embodiments shown in FIGS. 1 to 40 may form the object of independent inventive solutions as defined by the invention. The respective problems and solutions are disclosed in the detailed descriptions of said figures.

List of Reference Numerals

1 Control element
2 Pneumatic valve
3 Top side
4 Height
5 Bottom side
6 Side surface
7 Length
8 Channel
9 Center axis
10 Guide device
11 Moving element
12 Distribution channel 13 Bore axis
14 Connection thread
15 Feed channel
16 Exhaust channel
17 Spacing
18 Secondary channel
19 Face
20 Collar
21 Deepening
22 Sealing element
23 Inside diameter
24 Spacing
25 Channel diameter
26 Intermediate element
27 Diameter
28 Collar diameter
29 Spacing
30 Means
31 Transmission element
32 Cover
33 Inner space
34 Outer surface
35 Heating device
36 Heating elements
37 Heating resistor
38 Distance
39 Receptacle
40 Closing element
41 Threaded section
42 Outside diameter
43 Core diameter
44 Female thread
45 Surface
46 Projection
47 Projection diameter
48 Projection length
49 Front surface
50 Line
51 Hexagonal receptacle
52 Spacing
53 Monitoring element
54 Approximation switch
55 Distance
56 Receiving groove
57 Spacing
58 Holding groove
59 Holding and/or locking device
60 Inner surface
61 Inner side
62 Surface
63 Spacing
64 Back side
65 Housing
66 Jacket
67 Face parts
68 Width
69 Width
70 Opening
71 Wave energy source
72 Wave generator
73 Microwave generator
74 Axis
75 Connection line
76 Plug
77 Threaded bore
78 Length
79 Back surface
80 End length
81 Spacing
82 Deepening edge
83 Distance
84
85
86 Jacket line
87 Channel height
88 Surface
89 Side surface
90 Length
91 Opening
92 Chamber
93 Main blocking element
94 Width
95 Width
96 Bus-plug
97 Basic body
98 Additional body
99 Collecting element
100 Width
101 Transverse plane
102 Longitudinal plane
103 Opening
104 Deepening
105 Inner surface
106 Groove depth
107 Inner side surface
108 Groove width
109 Sealing element
110 Height
111 Outer side
112 Connection opening
113 Connection thread
114 Base plate
115 Width
116 Longitudinal plane
117 Length
118 Transverse side surface
119 Longitudinal side surface
120 Bottom side
121 Height
122 Top side
123 Longitudinal plane
124 Transverse plane
125 Spacing
126 Spacing
127 Face element
128 Face height
129 Face
130 Coupling receptacle
131 Coupling device
132 Plug socket
133 Line
134 Conductor path
135 Motherboard
136 Coupling projection
137 Coupling element
138 Plug element
139 Line
140 Lifting piston
141 Sealing section
142 Cylinder jacket
143 Cone jacket
144 Jacket diameter
145 Diameter
146 Cone part 147 Bar
148 Spacing
149 Collard
150 Collar diameter
151 Tie rod
152 Threaded section
153 Opening
154 Spring element
155 Dish element
156 Sealing seat
157 Front side
158 Multi-layer element
159 Element
160 Base plate
161 Recess
162 Top side
163 Sealing layer
164 Layer
165 Layer
166 Sealing surface
167 Spacing
168 Release
169 Deformation zone
170 Bending edge
171 Base plate thickness
172 Hydraulic valve
173 Intermediate element length
174 Coil
175 Spacing
176 Inside diameter
177 Outside diameter
178 Distribution section
179 Sealing partition
180 Medium main line
181 Medium feed line
182 Medium exhaust line
183 Distance
184 Spacing
185 Groove
186 Groove bottom
187 Inner surface
188 Bolt
189 Bolt length
190 Bolt diameter
191 Recess diameter
192 Recess
193 End zone
194 Depth
195 Bearing element
196 Sliding bearing bush
197 Transverse bridge
198 Circumferential bridge
199 Height
200 Width
201 Groove side
202 Intersection edge
203 Surface
204 Axis spacing
205 Inward molding
206 Plane of symmetry
207 Surface line
208 Inward molding depth
209 Spacing
210 Height
211 Segment
212 End edge
213 Spacing
214 Spacing
215 Lateral offset
216 End edge
217 Stop
218 Stop surface
219 Face
220 Alignment
221 End edge
222 Flange plate
223 Outer surface
224 Deepening groove
225 Groove width
226 Groove depth
227 Spacing
228 Distance
229 Spacing
230 Contact element
231 Contact bridge
232 Groove bottom
233 Inner bore
234 Outer surface
235 Bore depth
236 Flange thickness
237 Bore diameter
238 Line element
239 Line
240 Coupling device
241 Multiple plug
242 Contact element
243 Coupling device
244 Receptacle opening
245 Device axis
246 Projection
247 Collar
248 Pre-control valve
249 Damping element
250 Spacing
251 Locking groove
252 Locking element
253 Distance
254 Width
255 Center axis
256 Width
257 Stroke
258 Locking pin
259 Bore
260 Plane surface
261 Recess
262 Inside thread
263 Plate
264 Face
265 Closing element
266 Face
267 Face
268 Spring element
269 Surface
270 Point
271 Piezo-element
272 Diaphragm
273 Face
274 ' Flat coil
274 Opening
275 Lifting piston axis
276 Lifting piston receptacle
277 Sealing surface
278 Plane surface
279 Lifting piston bore 280 Height
281 Diameter
282 Sealing diameter
283 Spacing
284 Guide bore
285 Bore diameter
286 Guide sleeve
287 Inside diameter
288 Bottom side
289 Ring surface
290 Thickness
291 Top side
292 Ring surface
293 Ring surface
294 Sleeve height
295 Depth
296 Projection
297 Inner side
298 Cover plate
299 Inward molding
300 Outside diameter
301 Inside diameter
302 Inner face
303 Slot
304 Angular offset
305 Slot depth
306 Spring projection
307 Projection
308 Projection diameter
309 Sealing diameter
310 Plane surface
311 Width
312 Locking collar
313 Collar diameter
314 Collar surface
315 Connecting element
316 Diameter
317 Guide piston
318 Intermediate element
319 Outer side
320 Sliding element
321 Housing part
322 Housing part
323 Inner surface
324 Inner surface
325 Outer surface
326 Housing part depth
327 Center plane
328 Center plane
329 Center axis
330 Attachment
331 Attachment diameter
332 Attachment surface
333 Inward molding
334 Face
335
336 Plane surface
337 Molding depth
338 Inner surface
339 Molding diameter
340 Housing part height
341 Housing part width
342 Housing part depth
343 Outer surface
344 Inward molding
345 Face (first)
346 Face depth
347 Inner surface
348 (first) molding diameter
349 (second) face
350 Face depth
351 Inner surface
352 (second) molding diameter
353 Hole circle
354 Hole circle radius
355 Angle
356 Deepening groove
357 Groove depth
358 Radius
359 Center line
360 Center point
361 Inner space
362 Rotational body
363 Rotational body
364 Attachment
365 Plane attachment surface
366 Attachment diameter
367 Attachment jacket surface
368 Attachment length
369 Plane surface
370 Distribution channel
371 Longitudinal groove
372 Bore
373 Length
374 Center axis
375 Center axis
376 Bore axis
377 Plane surface
378 Width
379 Deepening
380 Attachment
381 Plane attachment surface
382 Attachment length
383 Attachment jacket surface
384 Attachment diameter
385 Face
386 Face diameter
387 Projection
388 Intermediate space
389 Basic body
390 Heating surface
391 Heating device group
392 Angle
393 Transmission element group
394 Angular offset
395 Flank
396 Pin
397 Driver pin
398 Bore
399 Bore diameter
400 Sliding bearing
401 Line channel
402 Controlling device
403 Consumer
404 Pneumatic cylinder
405 Media connection
406 Connection line
407 Compressed air line
408 Pressure source
409 Sound damper
410 Controlling unit
411 Cylinder jacket
412 Media channel
413 Connection zone 414 Inner zone
415 Control element group
416 Connection
417 Projection
418 End surface
419 Element
420 Element
421 Outside diameter
422 Inside diameter
423 Projection diameter
424 Inner face
425 Contact surface
426 Inner zone.

What is claimed is:

1. A pressure fluid control valve comprising
   (a) a valve body having
      (1) a distribution channel and
      (2) at least two further channels, the further channels leading to the distribution channel, and
   (b) at least one elastically deformable element arranged in at least one of said channels, the element having
      (1) an elastically deformable bladder completely enclosing a liquid which evaporates rapidly upon heating and
      (2) means for heating the liquid to cause the liquid to evaporate rapidly, the element assuming a first position with the liquid filling the interior space and a second position with the evaporated liquid expanding the interior space to open and close communication between respective ones of the further channels and the distribution channel.

2. The pressure fluid control valve of claim 1, further comprising at least one moving element arranged in the distribution channel, the at least one elastically deformable element transmitting a sliding movement to the at least one moving element when it changes from the first to the second position whereby the at least one moving element opens and closes the communication between the further channels and the distribution channel.

3. The pressure fluid control valve of claim 2, wherein the moving element is a piston.

4. The pressure fluid control valve of claim 3, wherein the piston has at least one sealing element.

5. The pressure fluid control valve of claim 2, wherein two of said moving elements are slidable in the distribution channel in relation to each other.

6. The pressure fluid control valve of claim 2, wherein the moving element comprises a bolt extending through a bore in the moving element.

7. The pressure fluid control valve of claim 6, wherein the bolt has grooves extending concentrically about a center axis of the bolt and axially spaced from each other, and further comprising contact elements arranged in the grooves.

8. The pressure fluid control valve of claim 7, wherein the contact elements have contact bridges projecting into an inner bore of the bolt, and further comprising a flange plate closing one end of the distribution channel, a multiple plug arranged on the flange plate and line elements connecting the contact bridges to the multiple plug.

9. The pressure fluid control valve of claim 8, further comprising contact elements arranged on an inner surface of the flange plate for contacting the heating means.

10. The pressure fluid control valve of claim 1, wherein the heating means is a heating device arranged in the interior space.

11. The pressure fluid control valve of claim 1, wherein the heating means is a heating device arranged on an outer surface of the bladder of the elastically deformable element.

12. The pressure fluid control valve of claim 1, wherein the heating means is a heating device comprised of at least one heating resistor.

13. The pressure fluid control valve of claim 1, further comprising a closing element closing one end of the distribution channel and being detachably mounted in the valve body with torsional strength, the elastically deformable element being connected to the closing element.

14. The pressure fluid control valve of claim 1, wherein a respective one of the elastically deformable elements is arranged in the distribution channel adjacent an opening of a respective one of the further channels leading to the distribution channel, the opening being open in the first position of the elastically deformable element and being closed in the second position thereof.

15. The pressure fluid control valve of claim 1, wherein a respective one of the elastically deformable elements is arranged in a respective one of the further channels, and the heating means is a heating device projecting from the distribution channel into the further channels.

16. The pressure fluid control valve of claim 1, wherein the heating means is a source of wave energy.

17. The pressure fluid control valve of claim 1, wherein the elastically deformable element is arranged in a groove in the distribution channel.

18. The pressure fluid control valve of claim 17, further comprising at least one moving element having concave moldings. arranged to face the groove, the moving element being actuated by the elastically deformable element.

19. The pressure fluid control valve of claim 1, further comprising at least one moving element arranged in one of the channels, the moving element being actuated by the elastically deformable element, and a locking device for the moving element.

20. The pressure fluid control valve of claim 19, wherein the moving element has locking grooves engaged by locking elements of the locking device.

21. The pressure fluid control valve of claim 20, wherein the locking elements have locking pins enveloped by the bladder of the elastically deformable element and having a plate spacing the elastically deformable element from a spring element.

22. The pressure fluid control valve of claim 21, wherein the plate spaces a piezo-element from the spring element.

23. The pressure fluid control valve of claim 14, wherein the heating means is a heating device arranged on the locking device and extending concentrically around a center axis thereof, the heating device consisting of a plurality of heating elements arranged successively in a circumferential direction of an inner surface of the distribution channel, the interior space of the elastically deformable element being associated with the heating elements.

24. The pressure fluid control valve of claim 1, wherein the channels form a grid in the valve body, the channels having openings in a top side of the valve body, further comprising at least one collecting element covering the openings and the collecting elements having at least one connection opening.

25. The pressure fluid control valve of claim 24, wherein the connection opening reaches to a groove in the collecting element.

26. The pressure fluid control valve of claim 1, wherein the heating means is a heating device comprising a base plate and heating elements arranged on a top side of the base plate.

27. The pressure fluid control valve of claim 26, wherein the base plate comprises a face element having at least one coupling receptacle of a coupling device.

28. The pressure fluid control valve of claim 27, further comprising lead lines leading from the coupling receptacle to the heating elements and forming conductor paths in the top side of the base plate.

29. The pressure fluid control valve of claim 1, further comprising at least one moving element arranged in at least one of the channels, the moving element being a piston arranged in at least one of the further channels and actuated by the elastically deformable element, the piston having a sealing selection formed by a cone jacket and associated with a sealing seat arranged in the further channel.

30. The pressure fluid control valve of claim 29, wherein the piston has a tie rod defined by the elastically deformable element, and the tie rod projects through a spring element biasing a dish element connected to the tie rod.

31. The pressure fluid control valve of claim 30, wherein the elastically deformable element in the second position thereof exerts a pressure force on a collar connected to the piston, the pressure forced being exerted in a direction opposite to the biasing force of the spring element.

32. The pressure fluid control valve of claim 1, further comprising at least one moving element arranged in one of the channels, the moving element being a piston actuated by the elastically deformable element, and a locking element engaging a locking collar on the piston for the same, the locking element having slots arrange in the form of a star around an axis of the piston and the slots being spaced from each other by spring projections.

* * * * *